(12) United States Patent
Abendroth et al.

(10) Patent No.: US 12,020,262 B2
(45) Date of Patent: *Jun. 25, 2024

(54) METHOD AND SYSTEM WITH MULTI-TIER CLUB MEMBERSHIPS FOR DISCOUNTED BUYING ON THE INTERNET AND AT STORE LOCATIONS

(71) Applicants: John C. Abendroth, Menomonee Falls, WI (US); Marc B. Abendroth, Menomonee Falls, WI (US)

(72) Inventors: John C. Abendroth, Menomonee Falls, WI (US); Marc B. Abendroth, Menomonee Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,886

(22) Filed: Oct. 4, 2021

(65) Prior Publication Data

US 2022/0215404 A1 Jul. 7, 2022

Related U.S. Application Data

(63) Continuation of application No. 12/842,283, filed on Jul. 23, 2010, now Pat. No. 11,138,613, which is a continuation-in-part of application No. 11/376,951, filed on Mar. 16, 2006, now abandoned, which is a continuation-in-part of application No. PCT/US2004/030762, filed on Sep. 17, 2004.

(60) Provisional application No. 60/534,236, filed on Jan. 5, 2004, provisional application No. 60/503,599, filed on Sep. 17, 2003.

(51) Int. Cl.
*G06Q 30/00* (2023.01)
*G06Q 30/02* (2023.01)
*G06Q 30/0207* (2023.01)

(52) U.S. Cl.
CPC ......... *G06Q 30/02* (2013.01); *G06Q 30/0222* (2013.01)

(58) Field of Classification Search
CPC .......................... G06Q 30/02; G06Q 30/0222
See application file for complete search history.

(56) References Cited

U.S. PATENT DOCUMENTS 6,415,262 B1 * 7/2002 Walker ............... G06Q 30/0226
705/14.27

OTHER PUBLICATIONS

TeleCheck provides check acceptance service for internet merchants and shoppers; service provides a smart business solution for merchants looking to tap the internet shopping market. (Sep. 28, 1999). PR Newswire (Year: 1999).*

* cited by examiner

*Primary Examiner* — Matthew L Hamilton
(74) *Attorney, Agent, or Firm* — Boyle Fredrickson S.C.

(57) ABSTRACT

This invention relates to a method and system as a branded club product (goods and services) discounting membership, universal discount card technology, hardware infrastructure, operational and software corporate team amalgamation, seller and buyer critical mass, essential implementation and real-time operational approach to integrate internet e-commerce with in-store commerce in physical store locations, at the point of sale (POS) checkout at store registers, of initially hundreds and eventually thousands of sellers, electronically and operationally, launching and igniting a whole new generation of advertising, buying and selling.

14 Claims, 79 Drawing Sheets

Fig. 1  NOTE: This Figure is Prior Art from earlier submittals by applicants.
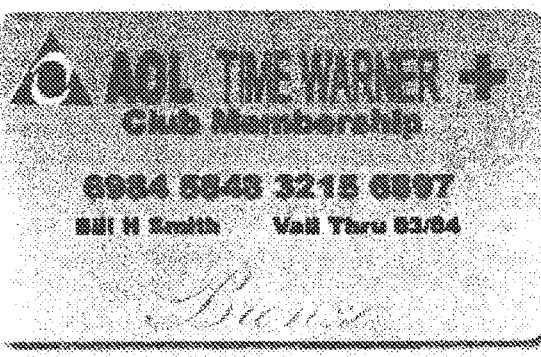

AOL Time Warner + Club Memberships
Bronze / Silver / Gold / Platinum
(In Addition to & Separate from AOL Netmarket & AOL Travelers Advantage Offerings)

AOL Anywhere (Basic Plan)
($23.90 / Month) or
($19.95 / Month 1 year prepaid) or
($14.95 / Month Bring-Your-Own-Access)

Standard Services
Premium Services (Additional Cost – $19.95 / Year)
    Other Services      Advertised

AOL Time Warner + Bronze Club Membership
($23.90 / Month + $9.95 / Month =
$33.85 / Month Total)

Standard Services
Premium Services (Additional Cost – $19.95 / Year)
+ Discounted Offerings (AOL Time Warner Only)
    Books      AOL Time Warner
    Books      Advertised 1
    Magazines      AOL Time Warner
    Magazines      Advertised
    Music      AOL Time Warner
    Music      Advertised 2
    Cards / Gifts / Flowers / Gourmet      Advertised 3
    Other Services      AOL Time Warner
    Other Services      Advertised Special:
AOL Netmarket (New / Existing Account)
($79.95 / Year = $6.66 / Month) or
(Discount with Bronze Club Membership
$59.95 / Year = $5.00 / Month)
    10% to 50% Off Retail
    3.5% AOL Netmarket Cash Back
    200% Price Guarantee + Super Discounted Offerings (AOL Time Warner Only)      AOL Time Warner / Advertised
    See Itemized Areas Above

AOL Time Warner + Silver Club Membership
($23.90 / Month + $9.95 / Month +
$9.95 / Month = $43.80 / Month Total)

Standard Services
Premium Services (Additional Cost $19.95 / Year)
+ AOL Time Warner + Bronze Services + Discounted Offerings (AOL Time Warner Only)
    Cable      AOL Time Warner
    Movies (Cable Cinema, iControl)      AOL Time Warner
    Tickets (Movies / Events)      Advertised 4
    Toys / Games      Advertised 5
    Resturants (Local Dining)      Advertised
    Food / Cooking      Advertised 6
    Other Services      AOL Time Warner
    Other Services      Advertised Special:
AOL Netmarket (New / Existing Account)
($79.95 / Year = $6.66 / Month) or
(Discount with Silver Club Membership
$39.95 / Year = $3.33 / Month)
    10% to 50% Off Retail
    3.5% AOL Netmarket Cash Back
    200% Price Guarantee + Super Discounted Offerings (AOL Time Warner Only)      AOL Time Warner / Advertised
    See Itemized Areas Above

AOL Time Warner + Gold Club Membership
($23.90 / Month + $9.95 / Month +
$9.95 / Month + $9.95 / Month =
$53.75 / Month Total)

Standard Services
Premium Services (Additional Cost – $19.95 / Year)
+ AOL Time Warner + Bronze Services
+ AOL Time Warner + Silver Services + Discounted Offerings (AOL Time Warner Only)
    Broadband      AOL Time Warner
    Broadband (Roadrunner)      AOL Time Warner
    Broadband / Dial-in (Bring-Your-Own-Access)      Advertised 7
    Computer (Hardware & Software)      Advertised 8
    Electronic Equipment      Advertised
    Jewelry / Watches      Advertised 9
    Sport Equipment      Advertised 9
    Clothing / Shoes / Purses      Advertised 9
    Cosmetics / Perfume      Advertised 9
    Pharmaceuticals      Advertised 10
    Health      Advertised
    Office Supplies      Advertised 11
    Movies (Pay Per View)      AOL Time Warner
    Cameras      Advertised 12
    Other Services      AOL Time Warner
    Other Services      Advertised Special:
AOL Netmarket (New / Existing Account)
($79.95 / Year = $6.66 / Month) or
(Discount with Gold Club Membership
$19.95 / Year = $1.66 / Month)
    10% to 50% Off Retail
    3.5% AOL Netmarket Cash Back
    200% Price Guarantee + Super Discounted Offerings (AOL Time Warner Only)      AOL Time Warner / Advertised
    See Itemized Areas Above

Fig. 2
NOTE: This Figure is Prior Art from earlier submittals by applicants.

AOL Time Warner + Platinum
Club Membership
($23.90 / Month + $9.95 / Month +
$9.95 / Month + $9.95 / Month +
$9.95 / Month = $63.70 / Month Total)

Standard Services
Premium Services (Additional Cost -- $19.95 / Year)
+ AOL Time Warner + Bronze Services
+ AOL Time Warner + Silver Services
+ AOL Time Warner + Gold Services Special:
AOL Travelers Advantage (New / Existing)
($79.95 / Year = $6.66 / Month) or
(Discount with Platinum Club Membership
$19.95 / Year = $1.66 / Month)
    50% Off Full Rates
    5% Cash Back
    Low Price Guarantee + Discounted Offerings (AOL Time Warner Only)

| | |
|---|---|
| Events (Pay Per View) | AOL Time Warner |
| Hotels / Air / Ship / Auto (Rental) -- Direct Booking | Advertised 13 |
| Hotels / Air / Ship / Auto (Rental) | Advertised 14 |
| Long Distance Services | AOL Time Warner |
| Appliances | Advertised |
| Furniture (Home & Office) | Advertised |
| Automobiles | Advertised |
| Insurance (Auto) | AOL Time Warner |
| Insurance | Advertised |
| Moving | Advertised 15 |
| Other Services | AOL Time Warner |
| Other Services | Advertised |

+ Super Discounted Offerings (AOL Time Warner Only)    AOL Time Warner / Advertised
   See Itemized Areas Above

---

Advertised 1: Amazon / Borders / Barnes & Noble / VarsityBooks / Other

Advertised 2: Columbia House / Other

Advertised 3: 800 Flowers / American Greetings / Art / eBay / Godiva Chocolatier / RedEnvelope / Other
    (FTD / Express / Teleflora)

Advertised 4: Ticketmaster / Movietickets / Other

Advertised 5: Toys-R-Us / eToys / KBToys / Other

Advertised 6: General Mills / Kraft / Hickory Farms / Coca Cola / Chef's Catalog / Other Advertised 7: MSN / EarthLink / SBC - Yahoo / AT&T / NetZero / Other Advertised 8: Circuit City / Dell / Hewlett-Packard / Other Advertised 9: QVC / HSN / America Store / Shop NBC / JCPenney / Gap / Walmart / Sears / Target / Zales / Other Advertised 10: Drugstore / Avon / Men's Health / Other Advertised 11: Office Depot / Office Max / Other Advertised 12: Ritz Camera / Other NOTE: This Figure is Prior Art from earlier submittals by applicants.

Fig. 3

Advertised 13: Hotels -- Best Western / Comfort Inn / Days Inn / Exel / Hilton / Holiday Inn / Howard Johnson / Marriott /
    Quality / Radisson / Ramada / Red Roof Inn / Renaissance / Sheraton / Westin / Other Air -- American / Continental / Delta / Jet Blue / Midwest / Northwest / United / US Airways / Other Cruise -- Carnival / Celebrity / Holland America / Norwegian / NCL / Princess / Royal Caribbean / Other Auto -- Avis / Alamo / Budget / Dollar / Enterprise / Hertz / National / Payless / Thrifty / U-Save / Other Advertised 14: Expedia / Hotels / Orbitz / Priceline / Travelocity / Other Advertised 15: Ace / Mayflower / National / United Van / Other Advertised : Other

INTERNET SERVICE PROVIDER (ISP)

ISP + Club Memberships (Bronze, Silver, Gold & Platinum) and the Discounts (i.e.: 20% to 55% plus Free Shipping) and/or Super Discounts (i.e.: Over 55% to 90% plus Free Shipping) from the Manufacturers' Suggested Retail Prices (MSRP), on the Internet, at Participating Vendor Stores, on Television and Phone.

Few Steps to Discount Benefits by Being an ISP + Club Member:

A. LOG ON TO: Internet and/or SHOP AT: ISP + Club Vendors' Store Locations and/or SHOP: Television Promotions and/or PHONE IN: Shopping Requests B. GO TO: ISP.com Home Page (Fig. 9)

C. GO TO: ISP.com Home Page with + Club Site Link (Fig. 10)

Describes the memberships along with benefits and services of all four (4) memberships (If Multiple Types are Offered): Bronze, Silver, Gold & Platinum THEN: Being an ISP Subscriber or using BRING-YOUR-OWN-ACCESS &

Following Just "One" Individual Scenario for the Purpose of Example:

D. ENTER: ISP Personal + Club Member Number & Password (Fig. 10)

E. GO TO: ISP + Gold Club Home Page (Or Bronze, or Silver, or Platinum)

(Fig. 13)

E. SELECT: Super Discounts Area to View Individual Company Logos (Fig. 11, 12, 13 & 22)

Or

GO TO: Item and Service Description Area – Super Discounts (Fig. 14, 15, 16 & 21)

Fig. 4
NOTE: This Figure is Prior Art from earlier submittals by applicants.

F. CLICK ON: A Company Logo which may or may not be "Flashing" and which (Fig. 13 & 22)   may or may not have information date(s) below it as follows:

Most recent discount entry (LATEST: 5/22/03, 18 Items)

Discount good through (UNTIL: 5/24/03, 40% to 50%)

Discount good on one day (ONLY: 5/30/03, 10 AM to Noon)

Or

CLICK ON: Individual Item or Service in Description Area and a "DROP
(Fig. 16 & 21) DOWN" Box will appear with names of Individual Companies
offering Super Discounts in a particular Item, Area or Service.
Then SELECT: An Individual Company Name G. FINDS: ISP + Platinum Club / Vendor Company's Super Discount Page
(Fig. 17)

H. SELECT: A Super Discount Item or Service
(Fig. 19)

I. FINDS: Item Description with Manufacturer's Suggested Retail Price (MSRP)
(Fig. 20)  along with the Super Discounted Price, Percentage and Savings J. GO TO: Purchase Alternatives and/or Item or Service Types
        INDIVIDUAL ITEM or SERVICE (Even ONE-OF-A-KIND)
        MORE THAN ONE of the ITEM or SERVICE (Increase Discount)
        COMBINED with OTHER ITEMS or SERVICES (Increase Disc.)
        OUT-OF-STOCK ITEMS to be reordered within a time period
        WAIT-LIST ITEMS becoming available within short time period
    PAYING: FULL AMOUNT (Paid immediately at time of purchase)
        TIME PAYMENTS (Specified amount per month until total paid)
        LAYAWAY (Item sent or picked-up when full amount is reached)

K. SELECT: Place in Your Basket for Purchase or Buy Item or Service ON-LINE
   BASKET: Return to View Other Items or Service to Basket and Buy. THEN:
      USING: MONEY ORDER
           CHECK
           ISP VISA Card (If Available)
           Other VISA, MasterCard, American Express, Discover, etc. Card
                  Or SELECT: At Register in Participating Vendor's Store -- AUTOMATICALLY
(Fig. 8)  receiving same Super Discount, whether or not purchaser was
        aware of the Super Discount on the Vendor's ISP + Platinum
        Club Internet Site (Integrates the internet with the day-to-day world)
    USING: CASH
          MONEY ORDER
          CHECK NOTE: This Figure is Prior Art from earlier submittals by applicants.

Fig. 5

ISP VISA (If Available)

Other VISA, MasterCard, American Express, Discover, etc. Card

L.  RETURN TO: Any of the STEPS "A." THROUGH "L." for additional viewing
or purchasing from same or other participating vendors Or GO TO: The Individual Vendor's Home Page (See the other vendor's offers)
Vendors have the opportunity to draw a huge audience to their site.

Or

GO TO: Any Other Internet Site on the World Wide Web or LOG OFF

Fig. 6

NOTE: This Figure is Prior Art from earlier submittals by applicants.

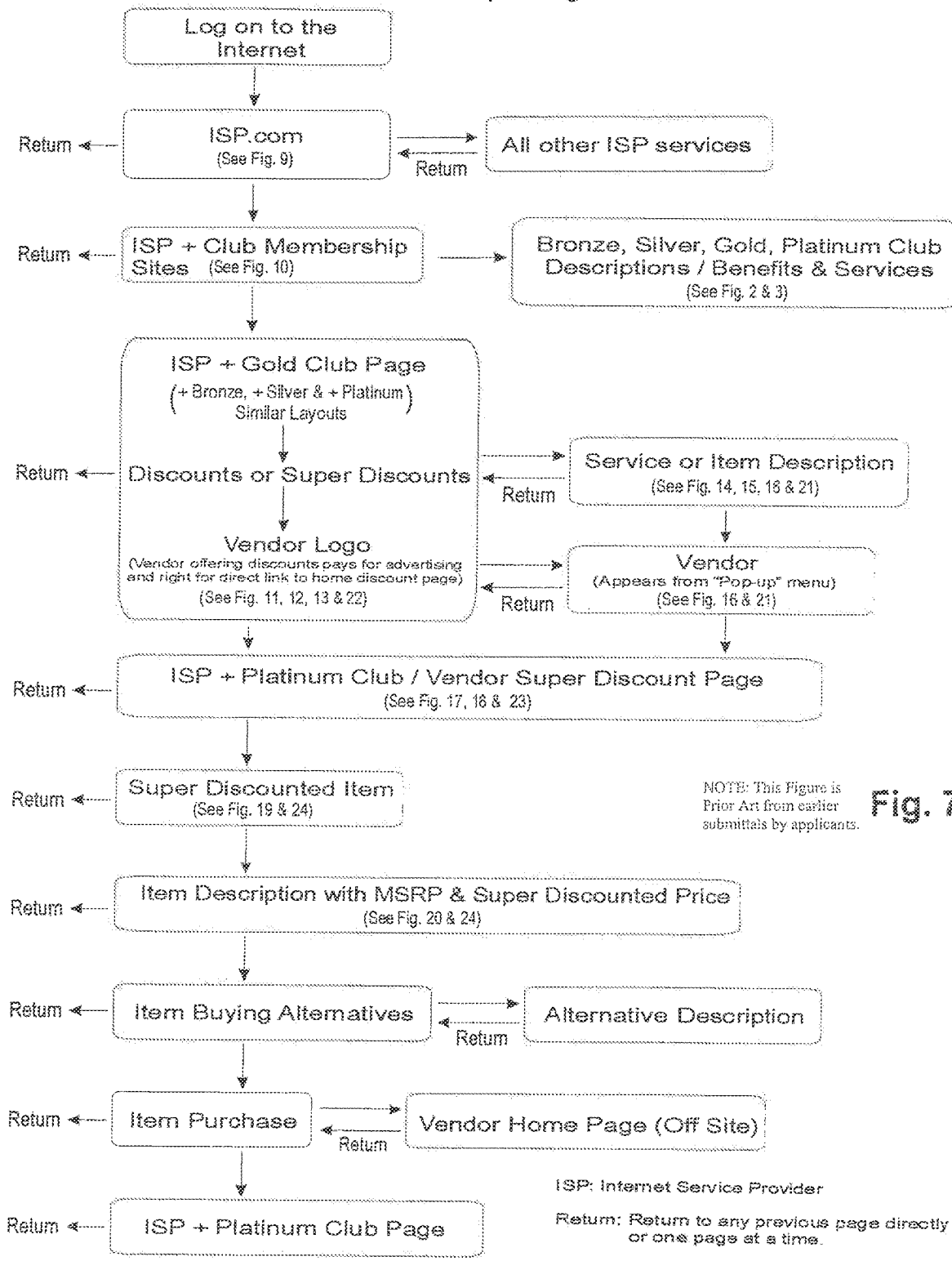

One ISP + Club Membership Diagrammatic "Physical" Scenario

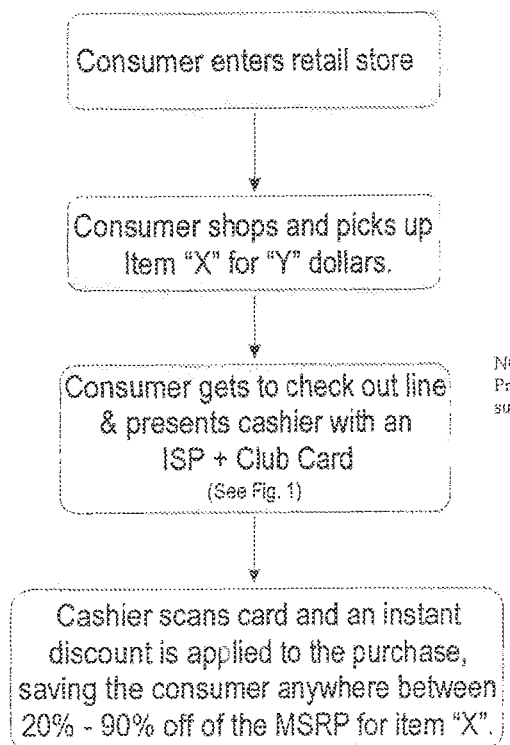

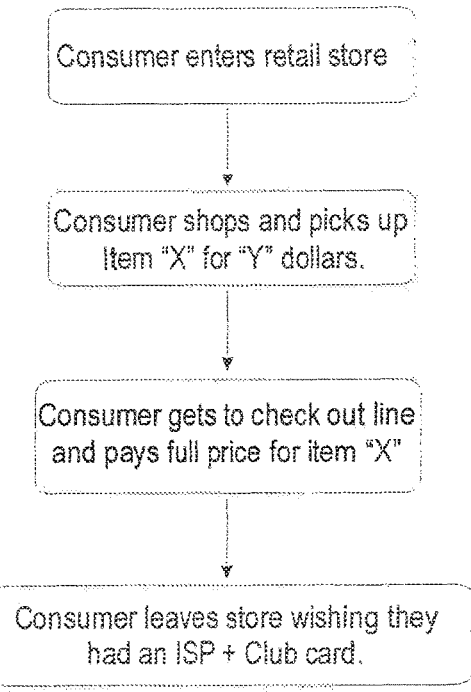

Fig. 8

NOTE: This Figure is Prior Art from earlier submittals by applicants.

The above diagrammatic illustration provides a visual comparison between a consumer with an ISP + Club Membership Card and one without for a most basic store transaction. The four different club cards: Bronze, Silver, Gold, and Platinum (See Fig. 1) offer discounts and super discounts in different markets. In addition to the new benefits of each membership type are all of the discounts / advantages that come with the preceding membership.

Ultimately there will be many thousands of retailers nationwide that will provide discounted items ONLY to ISP + Club Members. These retailers will decide which store items to discount and for what percentage off the manufacturer's suggested retail price.

The convenience for shoppers to receive these special discounts by simply scanning a card at the check out line is priceless. Ideally it will eventually become a habit for consumers to hand their card to cashiers where ever they are to see if there are any discounts to be had.

ISP: Internet Service Provider
MSRP: Manufacturer's Suggested Retail Price

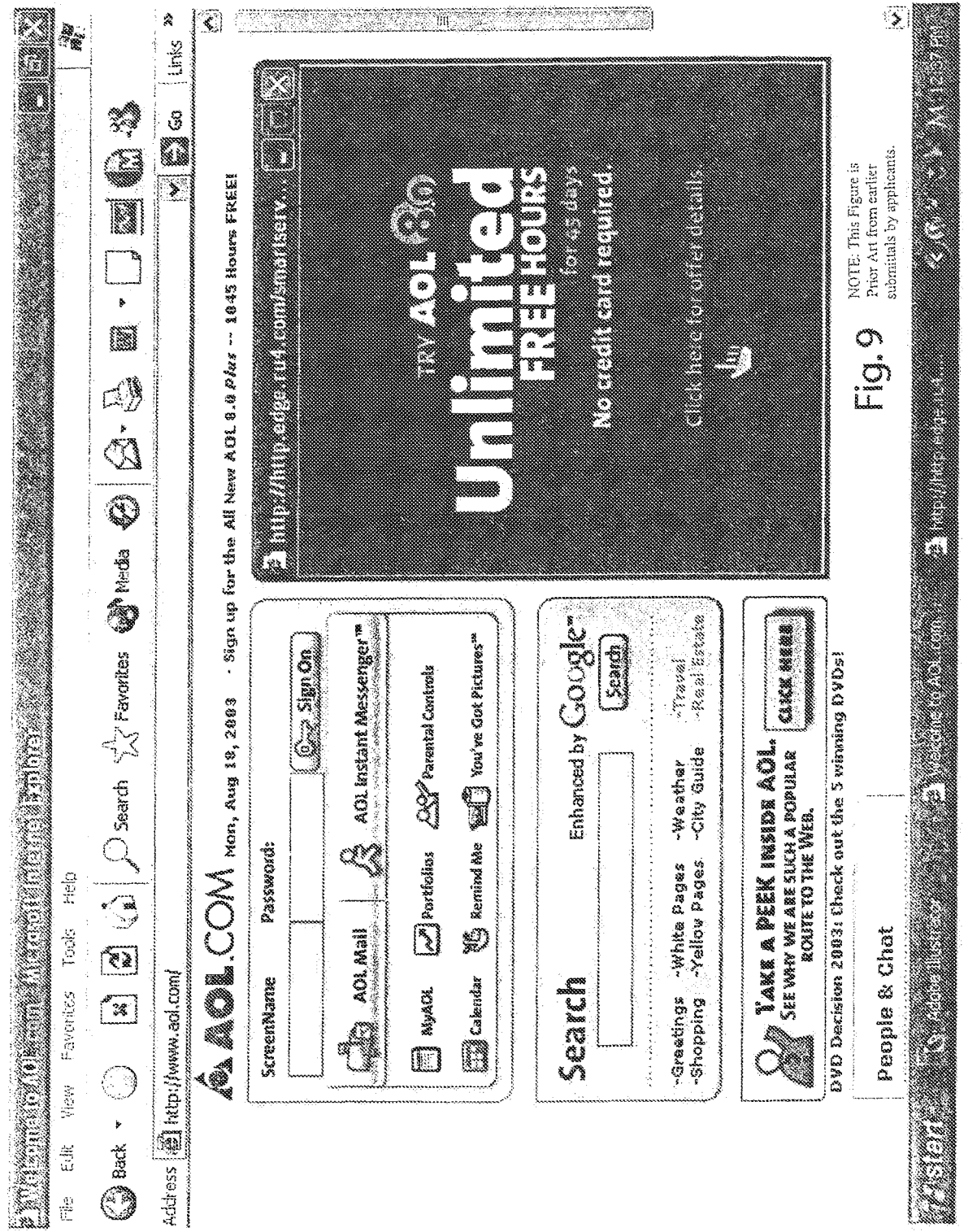
Fig. 9  NOTE: This Figure is Prior Art from earlier submittals by applicants.

NOTE: This Figure is Prior Art from earlier submittals by applicants.

VISA + Club Memberships
(Bronze, Silver, Gold and Platinum)

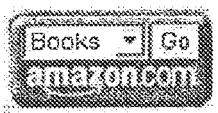 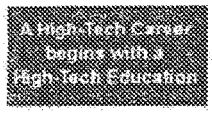 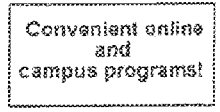 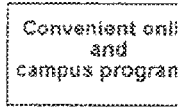

Upgrade to /

AOL Members Sign On

Check Mail for any of your AOL Screen Names.

Screen Name     Enter Password:

NOTE: This Figure is Prior Art from earlier submittals by applicants.

Fig. 11

Sing in above to get your :

   

Search

white pages    yellow pages    e-mail finder    maps

DISCOUNTED
AOL TIME WARNER + GOLD CLUB MEMBER

   SONY 

QVC    ROLEX

  Tiffany & Co. Nikon 

SUPER DISCOUNTED

000 TIME WARREN + GOLD CLUB MEMBER

Download 000
Pricing Plans
Access Numbers
Affiliate Network

000@SCHOOL
Network for Good
Careers@000

Link to Us
Advertise With Us

Webmaster Info
Postmaster Info
Site Index
Feedback

Fig. 14 NOTE: This Figure is Prior Art from earlier submittals by applicants Don't forget to take advantage of your AOL Gold card and save big money around the globe on purchases from tens of thousands of discounted offers found nowhere else in the world. These exclusive offerings are provided only to AOL Gold members.

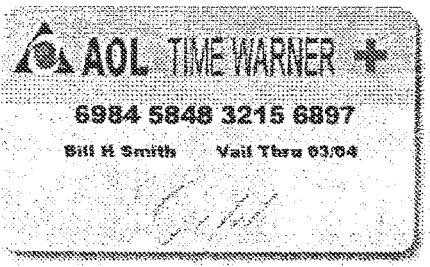

Below you will find a list of discounted offerings provided to different AOL club members. These club memberships are divided into four groups: Bronze / Silver / Gold / and Platinum. Each group offers discounts in separate markets. Remember in addition to the new benefits of each membership type are all of the discounts / advantages that come with the preceding membership.

| Bronze Club Membership | Discounted Offerings |
|---|---|
| AOL Anywhere (Basic Plan) | Books |
| AOL Time Warner + Bronze Club Membership | Magazines |
|  | Music |
| Special | Videos/DVDs |
|  | Gifts |
|  | Flowers |
| Siler Club Membership | Discounted Offerings |
| AOL Anywhere (Basic Plan) | Cable |
| AOL Time Warner + Silver Club Membeship | Movies |
|  | Tickets |
| Special | Toys / Games |
|  | Resturants (local dining) |
|  | Food / Cooking |
| Gold Club Membership | Discounted Offerings |
| AOL Anywhere (Basic Plan) | ISP Broadband |
| AOL Time Warner + Gold Club Membership | Computers |
|  | Electronic Equipment |
| Special | Jewelry / Watches |
|  | Sport Equipment |
|  | Clothing / Shoes / Purses |
|  | Pharmaceuticals |
|  | Health |
|  | Office Supplies |

| | |
|---|---|
| | Movies (pay per view) |
| | Cameras |
| Platinum Club Membership | Discounted Offerings |
| AOL Anywhere (Basic Plan) | Events (pay per view) |
| AOL Time Warner + Platinum Club Membership | Hotels |
| | Airfare |
| Special | Cruises |
| | Auto Rental |
| | Cell Phones |
| | Appliances |
| | Furniture (home & office) |
| | Automobiles |
| | Insurance |
| | Moving |

NOTE: This Figure is Prior Art from earlier submittals by applicants.

SEARS Welcomes AOL Time Warner Club Members

Search by Keyword or Item #

 Find a Sears Store Near You

 Buy a Gift Card

Below you will find special discounts provided only to AOL Time Warner Club Members. You can browse through and order here online, or stop by a Sears store near you and show us you Club Member card and receive the same low price offers. Some "Super" discounted items are marked down as low as 90% off the suggested manufacturer's retail price.

More from Sears

- Parts
- Home Services
- Product Repair
- Kenmore.com
- Craftsman.com
- As Seen on TV
- Sears En Espanol
- Specialty Shops
- Order a Catalog
- Send Me E-mail Specials
- Weekly Store Ads

Sears Information

- About Sears
- Careers with Sears
- Investor Relations
- Product Safety
- Site Index

 Appliances
Accessories - Air Cleaners - Compactors & Disposers - Cooking - Dehumidifiers - Dishwashers - Fans - Floor Care - Freezers - Heaters - Humidifiers - Laundry Care - Microwaves - Refrigeration - Room Air Conditioners - Sewing Center - Water Heaters - Water Pumps & Tanks - Water Treatment

 Automotive
Batteries - Tires

 Clothing
Women's - Men's - Kids'

 Computers & Office
Accessories - Computers - Offiece & Communications - Software

 Electronics
Accessories - Cameras & Camcorders - Car Electronics - Home Audio - Movies - Music - Portable Electronics - TVs & TV Stands - DVD, VCR & Other Video

 Fitness & Recreation
Fitness - Game Room - Camping

 Housewares
Cookware - Cutlery - Gearge Foreman Grills - Ironing Products - Mattresses - Personal Appliances - Small Kitchen Appliances

 Jewelry & Watches
Bracelets - Bridal - Cubic Zirconia - Earrings - Fashion Diamonds - Gemstones - Gold Jewelry - Mens - Jewelry - Pendants and Necklaces - Personalized and Family Jewelry - Religious - Rings - Sterling Silver - Tradition Certified Diamonds - Watches

 Kids
Baby Care - Feeding & Gift Sets - Infant Bedding - Euro Graco Collections - Nursery Funiture - On the Go - Play Equipment - Bedding and Decor - Toys, Action - Toys, Creative - Toys, For Little Ones - Video Games

 Lawn & Garden
Garden Tools - Grills - Lawn Mowers - Tractor Attachments - Lawn Tractors - Patio Funiture - Power Lawn Equipment - Pressure Washers - Snow Equipment - Yard Care

 Tools
Bench Power Tools - Compressors

Fig. 17

NOTE: This Figure is Prior Art from earlier submittals by applicants.

Gift
Toys- Gifts- Our
Recommendations - and More!

& Air tools - Electric Shop - Home
Security & Garage Door Openers -
Hand Tools, General Purpose -
Mechanics Tools - Portable Power
Tools - Power Tools Accessories -
Storage, Chests & Cabinets - Tool
Sets - Wet/Dry Vacs - Workboots 000 Appliances / Refrigeration From Kitchen to laundry room, 000 has top brand appliances

Related Offerings

Glossary
Kenmore.com
Commercial Sales
Product Repair
As Seen on TV
Parts
000 En Espanol
Weekly Store Ads Accessories
Bottom Freezer Refrigerators
Compact Refrigerators
Freezerless Refrigerators Ice Makers
Side-by-Side Refridgerators
Top Freezer Refrigerators
Wine Cellars 000 Time Warren Club membership 000 Time Warren Platinum Club members can take advantage of the "Super" discounted items featured below. These discounts offer additional savings on top of the already low prces available only to club members Featured "Super" Disclounted Items for 000 Tim Warren Platinum Club Members Store Locator

BUYING GUIDE

Lorem ipsum

KitchenAid
20.3 Cubic ft.
Bottom Freezer
Refrigerator, Stainless
Steel w/ Black

Ken Elite
21.6 Cubic ft.
Top Freezer
Refrigerator, w/
Internal Water
Dispenser
Stainless Steel w/
Graphite

Frigid
26 Cubic ft.
Side by Side
Refrigerator, w/ Thru-
the-Door Ice & Water
Stainless Steel w/
Black

Fig 19

 AOL Time Warner + Platinum Club Membership
(In Addition to & Separate from AOL Netmarket & AOL Travelers Advantage Offerings)

ITEM:

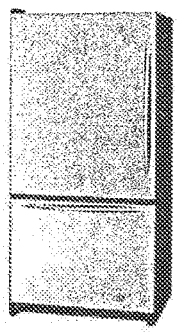

KitchenAid 20.3 Cubic ft.
Bottom Freezer Refrigerator

Stainless Steel w/Black.

Manufacturer's Suggested Retail
Price: $2,100.00

|  | Percent Discount From MSRP* | Price | Shipping & Handling | Sales & Other Taxes | Total Price |
|---|---|---|---|---|---|
| AOL Shopping Listed Price | 10% | $1,890.00 | $60.00 |  | $1,950.00 |
| AOL Time Warner + Platinum Club Membership Discount Price | NA** |  |  |  |  |
| AOL Time Warner + Platinum Club Membership Super Discount Price | 62% | $798.00 |  |  | $798.00 |
| Total AOL Time Warner + Platinum Club Member Savings from MSRP*: |  |  |  |  | $1,302.00 |

*Manufacturer's Suggested Retail Price
**Not Available

Buy It

NOTE: This Figure is Prior Art from earlier submittals by applicants

Women's > Shirts & Blouses

Easy care Blends

We have 7 offerings: View them all

| | MSRP | % Discount | AOLTW Club Price | Color & Sizes |
|---|---|---|---|---|
| ◀Big Shirt | $29.00 | 50% | $14.50 | Add to cart |
| Stripe Big Shirt | $22.00 | 50% | $11.00 | Add to cart |
| Check Big Shirt | $32.00 | 50% | $16.00 | Add to cart |
| Stripe Broadcloth | $32.00 | 50% | $16.00 | Add to cart |

Stretch

We have 3 offerings: View them all

| | MSRP | % Discount | AOLTW Club Price | Color & Sizes |
|---|---|---|---|---|
| ◀Solid | $39.00 | 50% | $19.50 | Add to cart |
| Pattern | $44.00 | 50% | $22.00 | Add to cart |
| Striped | $44.00 | 50% | $22.00 | Add to cart |

NOTE: This Figure is Prior Art from earlier submittals by applicants.

All Cotton

We have 3 offerings: View them all

| | MSRP | % Discount | AOLTW Club Price | Color & Sizes |
|---|---|---|---|---|

ITEM:

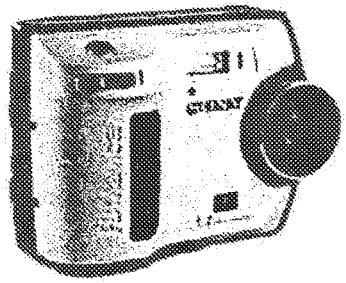

Sony Digital Zome Still Camara, Mavica®
Camara stores images directly on 3-1/2 in, 2HD floppy disks

* 3X optical zoom lens, 6X precision digital zoom
* 2-1/2 in. 123K pixel LCD viewfinder with Solar Window™ and AccuPower™ meter
* File/disk/Memory Stick® copy functions Manufacturers Suggested Retail Price: $299.99

|  | Percent Discount From MSRP* | Price | Shipping & Handling | Sales & Other Taxes | Total Price |
|---|---|---|---|---|---|
| AOL Shopping Listed Price | 10% | $270.00 | $9.95 |  | $279.95 |
| AOL Netmarket Guest Price | 20% | $240.00 | $9.95 |  | $249.95 |
| AOL Netmarket Member Price | 30% | $210.00 | $9.95 |  | $219.95 |
| Total AOL Netmarket Guest Savings: | | | | | $30.00 |
| Total AOL Netmarket Member Savings: | | | | | $50.00 |

* Manufacturer's Suggested Retail Price

Buy It

NOTE: This Figure is Prior Art from earlier submittals by applicants.

Fig. 25

METHODS OF PAYMENT
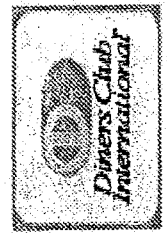
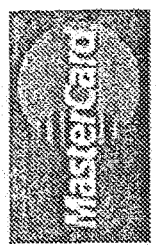
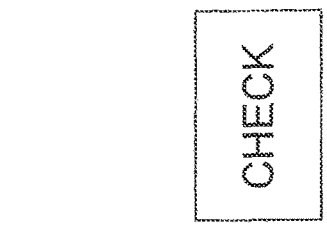
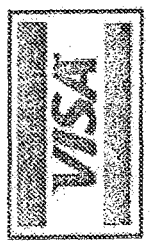
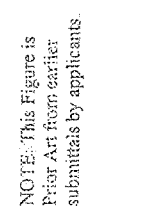
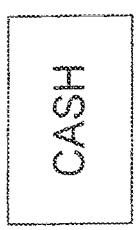
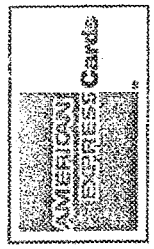
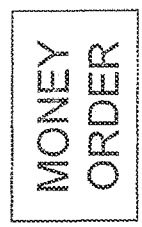
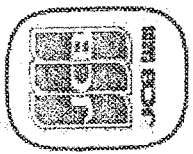
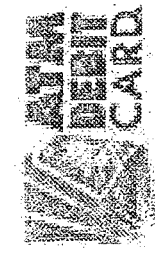
NOTE: This Figure is Prior Art from earlier submittals by applicants.
FIG. 26

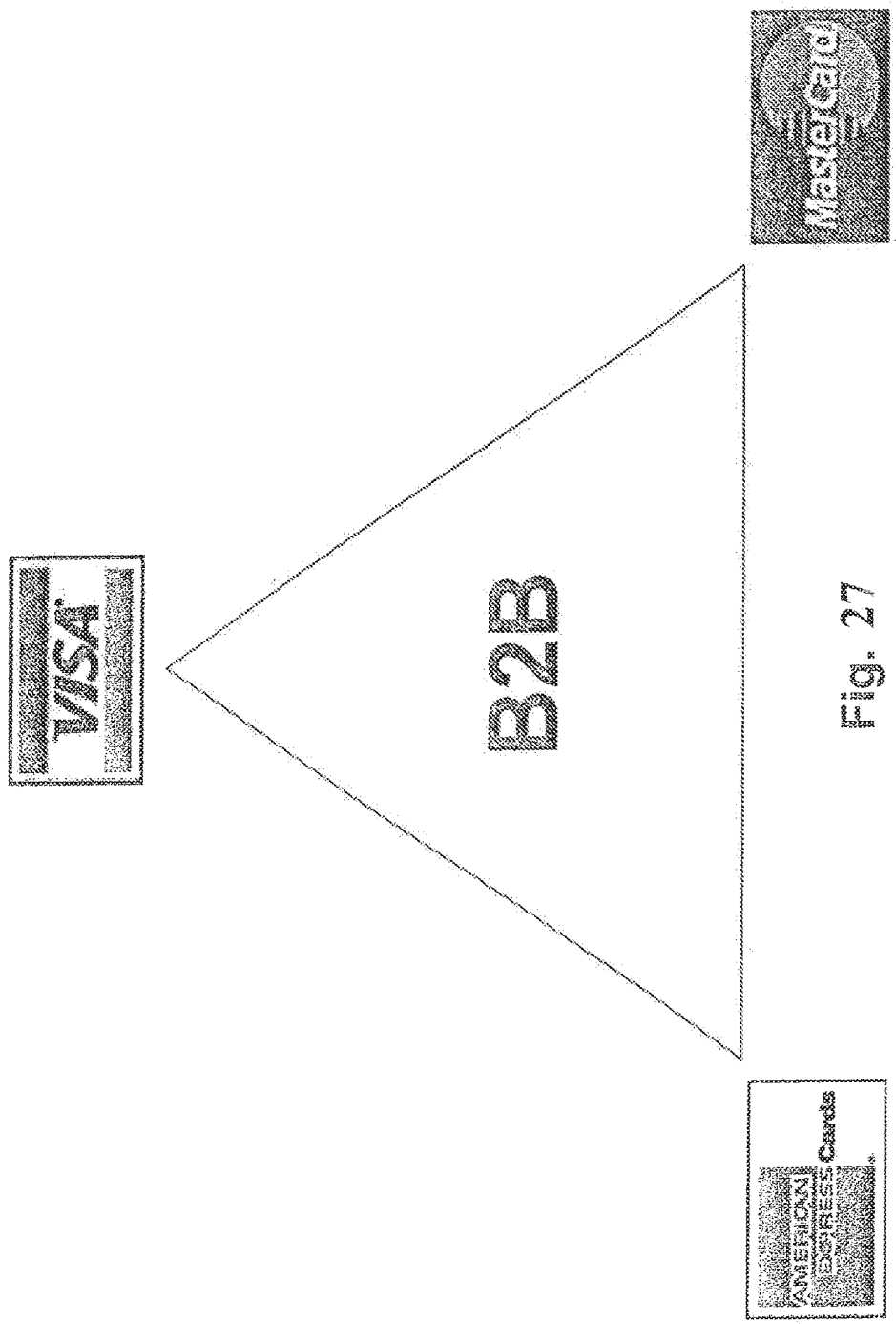

Fig. 28

SAMPLES OF AVAILABLE CREDIT AND DEBIT CARDS

NOTE: This Figure is Prior Art from earlier submittals by applicants.

| | | | | | | |
|---|---|---|---|---|---|---|
| CLASSIC | REWARD | SMART | CASH BUILDER | PERFECT | PLATINUM | SIGNATURE |
| | | MERCHANT | MERCHANT | MERCHANT | ISP MERCHANT | VISA |
| | PLATINUM | PERFECT | CASHBUILDER | MERCHANT | BUSINESS ADVANTA | |
| | MERCHANT | MASTERCARD | GREEN, GOLD, BLUE | MERCHANT | BUSINESS BLUE / GOLD | |
| GOLD | PLATINUM | | | MERCHANT CREDIT CARD | 100'S WORLDWIDE | |

GIFT, BUXX, TRAVEL $

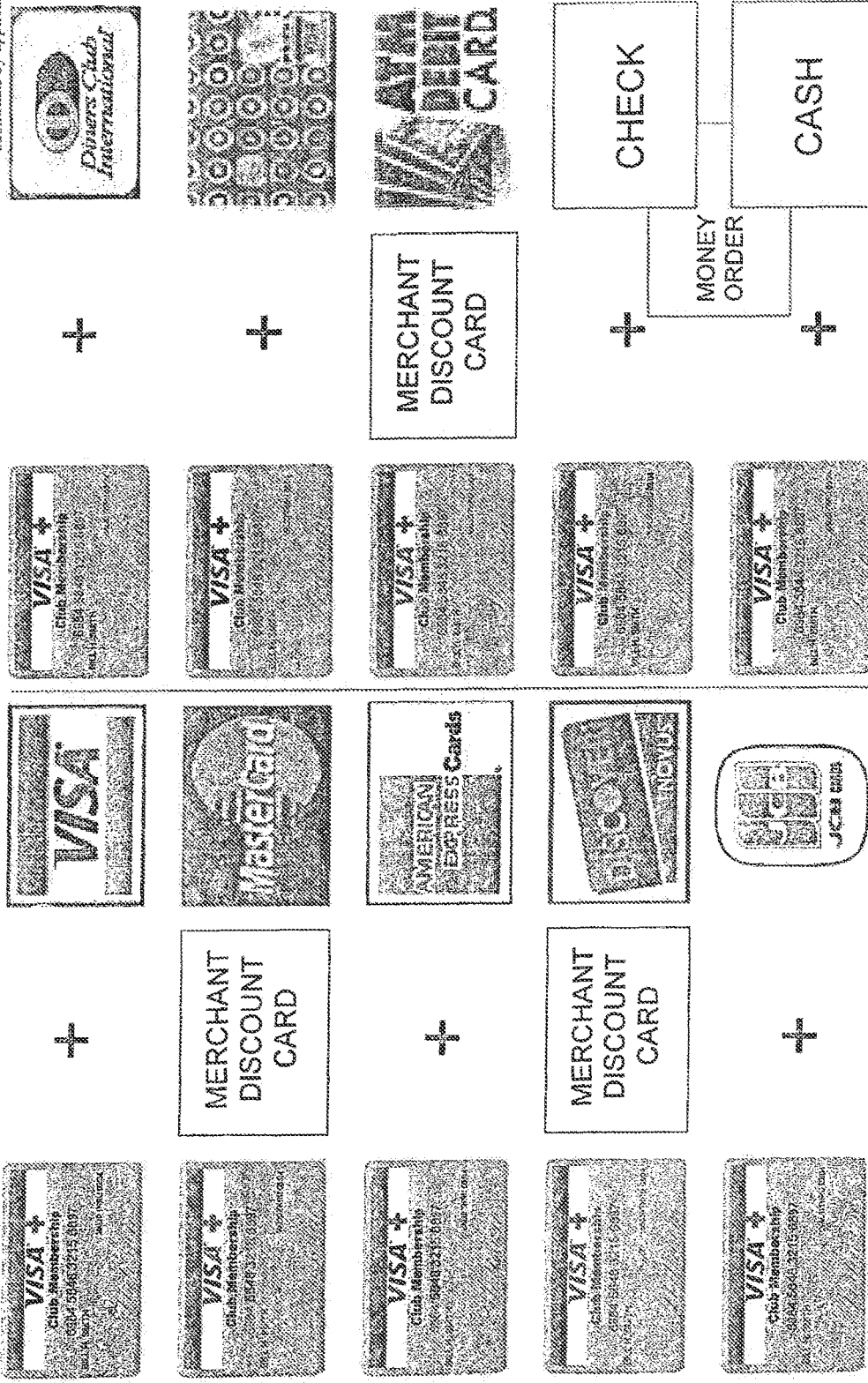

ONLINE / OFFLINE INITIAL CONCEPT LAUNCH

Magnetic Stripe Cards

Temporary Initial Card    Previously Issued    Previously Issued    Alternative Smart Card 25 ¢    25 ¢    25 ¢    $1 to $5

⟵ Manufacturing Cost per Card ⟶

Initially, to expedite the concept launch, Discount & Super Discount Visa + Club Card barcode technology will be used with available physical store register and backroom operations. With this simple technology already available at over 60% of retailers, addressing approximately 90% of the retail marketplace across the nation, there could be immediate widespread use of a VISA + Club Membership Card.

The magnetic stripe on each card would provide the identification of the card holder. At the register, after swiping the card, the card holder would enter his or her "password" (much like a debit card). This would ensure authenticity for the merchant that this is in fact a true Visa + Club Member. After approved, the card holder would have their card's barcode scanned and automatically discounts would be applied and deducted from the regular price of the item(s) being purchased. Eventually, these club cards would all have "smart" technology installed.

VISA + Club Membership Permanent
Smart Cards with microprocessors
Cost per Card $1 to $5

NOTE: This Figure is Prior Art from earlier submittals by applicants.

Presently 1,000's of individual merchant discount cards worldwide

Merchant Discount Card

Fig. 30

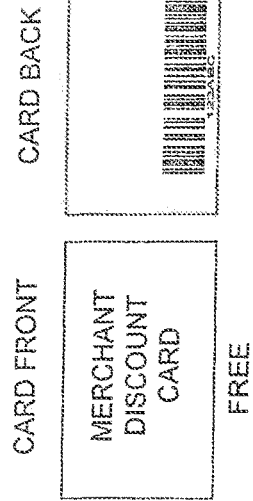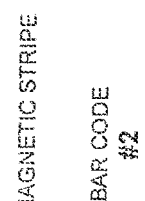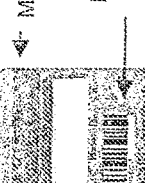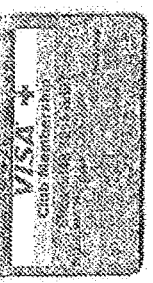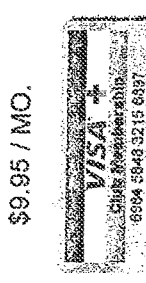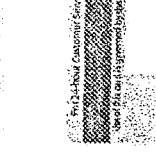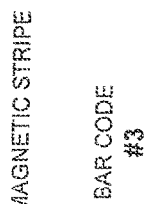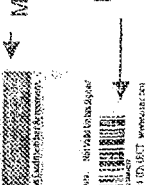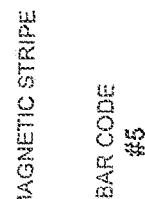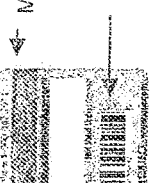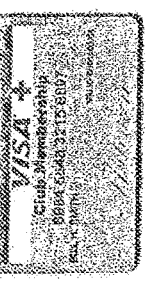
Fig. 31

VISA + CLUB MEMBERSHIP CARDS
BRONZE, SILVER, GOLD & PLATINUM OR ONE LEVEL OPTION

VISA CREDIT OR DEBIT & DISCOUNT CARD AS ONE  OR  VISA CREDIT OR DEBIT CARD & SEPARATE VISA + CLUB DISCOUNT CARD
WITH
INITIAL "SMART" CARD TECHNOLOGY AT LAUNCH     INITIAL MAGNETIC STRIP & "BAR CODE" CARD TECHNOLOGY AT LAUNCH

ONE CARD -- "OK, BUT"

| FEW ADVANTAGES | | MANY BIG DISADVANTAGES |
|---|---|---|
| JUST ONE CARD NEEDED TO RECEIVE DISCOUNTS & TO MAKE PURCHASES. | 1 | MUST BE A VISA CREDIT OR DEBIT CARDHOLDER TO GET A VISA + CLUB CARD -- CREDIT WORTHINESS & LIMITS APPLY. |
| | 2 | IF CREDIT CARD MAXED OUT, VISA + CLUB CARD IS VOID & NO DISCOUNTS ALLOWED -- SO PURCHASER MUST THEN PAY FULL PRICES. |
| | 3 | CONVINCING OTHER CARD HOLDERS TO SWITCH OR TO ALSO GET A VISA CREDIT CARD PRIOR TO THE NEW VISA + CLUB MEMBERSHIP CARDS BEING WELL KNOWN IS AN ADDITIONAL HURDLE DURING THE INITIAL LAUNCH. |
| "SMART" TECHNOLOGY LETS GREATER AMOUNTS OF INFO STORED ON CARD & ALLOWS ENHANCED TRACKING OF CARDHOLDER PURCHASING. (INFORMATION FROM 1,000'S MERCHANT DISCOUNT CARDS ALL ON ONE VISA "SMART" CARD CHIP -- HOW WOULD A CARDHOLDER EVEN KNOW?) | 4 | IMPLEMENTATION OF THE "SMART" CHIP CARDS SLOW / TIME CONSUMING IN THEIR DEVELOPMENT, COSTLY TO THE MEMBER PARTNER FINANCIAL INSTITUTIONS ($1 TO $5 PER INDIV. CARD), & COSTLY TO THE INDIVIDUAL MERCHANTS IN SOFTWARE / HARDWARE AT REGISTERS, ALL PRIOR TO LAUNCH. |
| | 5 | FEW MERCHANTS ARE CHIP READY MAKING THE INITIAL LAUNCH MARGINAL IN SCALE POTENTIALLY DERAILING AN OTHERWISE SUCCESSFUL VENTURE. |
| | 6 | SMALL AND SLOW GROWING CLUB MEMBERSHIP TOTAL BY RESTRICTING ONLY TO VISA. |

TWO CARDS -- "PHENOMENAL"

| MANY BIG ADVANTAGES | | FEW DISADVANTAGES |
|---|---|---|
| | 1 | TWO CARDS NEEDED TO RECEIVE DISCOUNTS & TO MAKE PURCHASES. |
| ANY CREDIT, DEBIT OR NO CARDHOLDER CAN GET A VISA + CLUB CARD -- CREDIT LIMITATIONS NOT APPLICABLE. | | |
| MULTIPLE VISA OR OTHER CREDIT CARDS, CHECKS, MONEY ORDERS OR CASH USED FOR PURCHASES -- UNIVERSAL DISCOUNT CARD. | 2 | |
| AFTER VISA + CLUB CARDS BECOME WELL KNOWN, VISA CAN ENTICE OTHER CARD HOLDERS TO SWITCH TO VISA THROUGH PRICE INCENTIVES UNMATCHABLE BY ANY OTHER CARD PROVIDER -- VISA WILL BE ABLE TO DRAW FROM THE LARGE CLUB MEMBERSHIP & MERCHANT ADVERTISING FEES. | 3 | |
| IMPLEMENTATION OF THE "BAR CODE" CARDS CAN BE DONE IMMEDIATELY AND AT LOW COST ($0.25 OR LESS / INDIVIDUAL DISCOUNT CARD) FOR THE MEMBER PARTNER FINANCIAL INSTITUTIONS & MERCHANT HARDWARE IN PLACE AT REGISTERS & IN BACK ROOM OPERATIONS. | 4 | MAGNETIC STRIP & OLDER "BAR CODE" TECHNOLOGY DOES NOT ALLOW ANY ADDITIONAL INFO TO BE STORED ON CARD. (MERCHANTS WILL ALWAYS WANT INDIVIDUAL IN-STORE IDENTIFICATION DISCOUNT CARDS FOR CUSTOMERS -- ADVERTISING PURPOSES.) |
| 60% OF THE MERCHANTS ARE NOW "BAR CODE" READY WITH 90% OF THE MARKETPLACE AT THE TIME OF LAUNCH -- EXTREMELY IMPORTANT. | 5 | |
| LARGE AND FAST GROWING POTENTIAL FOR VISA + CLUB CARD MEMBERSHIPS. | 6 | |

Fig. 32

NOTE: This Figure is Prior Art from earlier submittals by applicants.

ONE CARD -- "OK, BUT"

| FEW ADVANTAGES | MANY BIG DISADVANTAGES |
|---|---|
| | VISA + CLUB MEMBERSHIP FEES MAY GIVE THE WRONG IMPRESSION OF PAYING A LOT FOR VISA CREDIT CARDS. |
| | THE VISA + CLUB MEMBER DISCOUNT CARD BEING INTEGRATED WITH A CREDIT OR DEBIT CARD REQUIRES ONE VISA MEMBER PARTNER FINANCIAL INSTITUTION TO ISSUE THE DISCOUNT CARD. |
| | SINCE ONLY ONE DISCOUNT CARD WOULD BE NEEDED AS OPPOSED TO INDIVIDUALS HAVING NUMEROUS CREDIT CARDS -- ONLY ONE OF VISA'S MEMBER PARTNER FINANCIAL INSTITUTIONS WOULD RECEIVE VALUE IN THE CARDHOLDER'S USE. |
| | WHICH INSTITUTIONS WIN? (THE ONE CARD EXCEPTION MIGHT OCCUR BY MAYBE HAVING A VISA + BRONZE CLUB CARD FOR ONE MEMBER OF A FAMILY, WHEREAS, A VISA + PLATINUM CLUB CARD MIGHT BE USED BY OTHERS.) |
| | VISA MEMBER PARTNER FINANCIAL INSTITUTIONS COULD AGGRESSIVELY SEND OUT INITIAL "GIFTED" VISA + PLATINUM CLUB DISCOUNT / CREDIT OR DEBIT CARDS IN AN ATTEMPT TO CAPTURE THE MARKETPLACE MAKING FOR A COMPETITIVE "WAR" BETWEEN THE FINANCIAL CARD ISSUING INSTITUTIONS. |
| | CANCELING VISA + CARD ALSO CANCELS CREDIT CARD. |

TWO CARDS -- "PHENOMENAL"

| | MANY BIG ADVANTAGES | FEW DISADVANTAGES |
|---|---|---|
| 7 | SEPARATE CARDS LET ANY VISA CREDIT CARD FEES BE TRULY COMPETITIVE WITH ALL OTHER CREDIT CARDS. | |
| 8 | THE VISA + CLUB MEMBER DISCOUNT CARD WOULD BE ISSUED BY VISA -- NOT A VISA MEMBER PARTNER FINANCIAL INSTITUTION. VISA COLLECTS CLUB MEMBERSHIP & ADVERTISING FEES. | |
| 9 | EITHER ALL OF THE FINANCIAL INSTITUTIONS SHARE IN THE AFOREMENTIONED REVENUE PROPORTIONALLY TO ALL OR TO THOSE 1, 2, 3, 4 FINANCIAL INSTITUTIONS THAT HAVE SENT INITIAL VISA + PLATINUM CARDS TO THE INDIVIDUAL CARDHOLDER. | |
| | ALL OF THE INSTITUTIONS WIN. (THE ONE CARD EXCEPTION APPLIES WHEN USING EITHER THE 1 OR 2 CARD APPROACH.) | |
| 10 | VISA MEMBER PARTNER FINANCIAL INSTITUTIONS WILL ONLY BE GIVEN THE NUMBER OF "GIFTED" VISA + PLATINUM DISCOUNT CARDS AS THEY HAVE VISA CREDIT AND/OR DEBIT CARDHOLDERS. IF THEY WISH TO INITIALLY SEND CARDS TO INDIVIDUALS PRESENTLY NOT THEIR CARDHOLDERS, THEIR OWN CARDHOLDERS WILL THEN NOT GET CARDS -- A QUESTIONABLE CHOICE IN OVERALL MARKETING. | |
| 11 | CANCELING VISA + CARD ONLY CANCELS CLUB CARD. | |

Fig. 33

NOTE: This Figure is Prior Art from earlier submittals by applicants.

FOLLOWING THE VISA + CLUB MEMBERSHIP VENTURE LAUNCH, "SMART" CHIP CARDS & HARDWARE CAN BE DEVELOPED / IMPLEMENTED.

TARGET

Visa + Club Members may take advantage of these superb discounts offered only this week. As seen on the interent under Target at www.visa.com -- Sales for week of: 1/4/04 to 1/10/04
Remember to keep watching for our continuously updated discounts available to Taget shoppers with their Visa + Club Membership Card.

VISA + Club Member Discounts

Fig. 34

Make purchases using Visa, Mastercard, American Express, Discover, JCB, Debit Card, Check, Money Order or Cash NOTE: This Figure is Prior Art from earlier submittals by applicants.

Panasonic DVD Recorder - DMR-E50S
MSRP $449.99
Discount 50%
Visa + Club Price: $224.99

Sony Digital 8 Camcorder #DCR-TRV250
MSRP $399.99
Discount 45%
Visa + Club Price: $220.00

Nikon Coolpix 3.2 MP Digital Camera - 3100
MSRP $299.99
Discount 40%
Visa + Club Price: $180.80

Panasonic 37" Plasma Display - TH37PA20U/P
MSRP $3,999.99
Disount 30%
Visa+ Club Price: $2,800.00

NiStep 2 Welcome Home Playhouse
MSRP $399.99
Discount 65%
Visa + Club Price: $140.00

3200Q Dartboard
MSRP 59.99
Discount 60%
Visa + Club Price: $24.00

Family Bundle for Playstation 2
MSRP $239.99
Discount 50%
Visa + Club Price: $119.99

Finding Nemo DVD
MSRP $29.99
Discount 70%
Visa + Club Price: $9.00

Weber One-Touch Gold Kettle - Black
MSRP $139.99
Discount 35%
Visa + Club Price: $91.00

Eddie Bauer 4-Room 10-Person Tent.
MSRP $229.99
Discount 45%
Visa + Club Price: $126.49

Women's Piled Lined Camel Jacket
MSRP $59.99
Discount 75%
Visa + Club Price: $15.00

Womens' Sorel Boots
MSRP $59.99
Discount 80%
Visa + Club Price: $12.00

Fig. 35  NOTE: This Figure is Prior Art from earlier submittals by applicants.
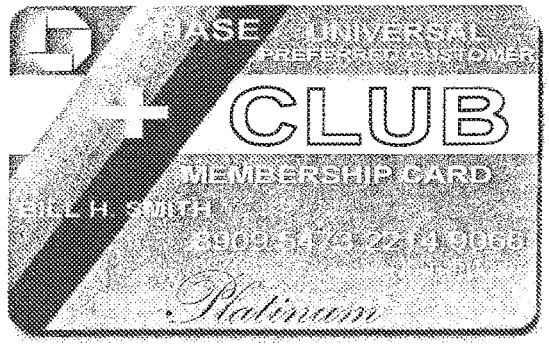
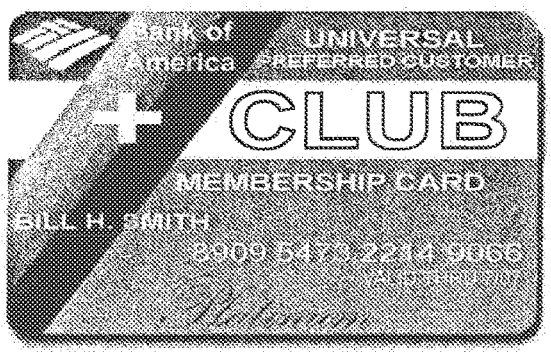

Fig. 36 NOTE: This Figure is Prior Art from earlier submittals by applicants.
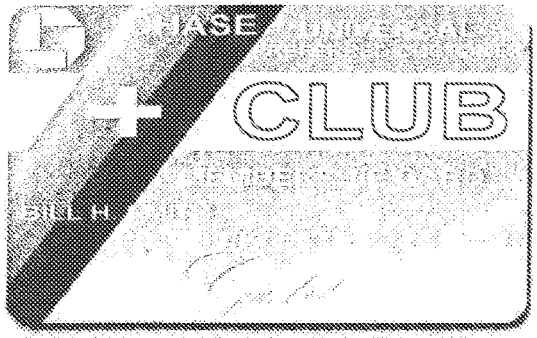
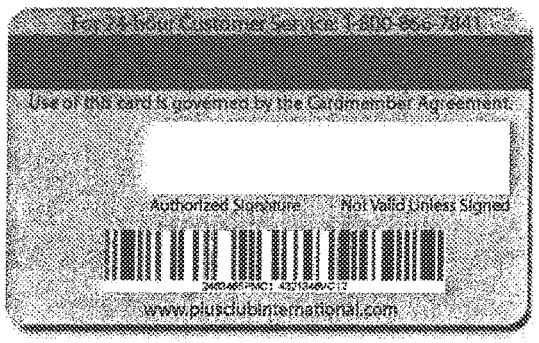
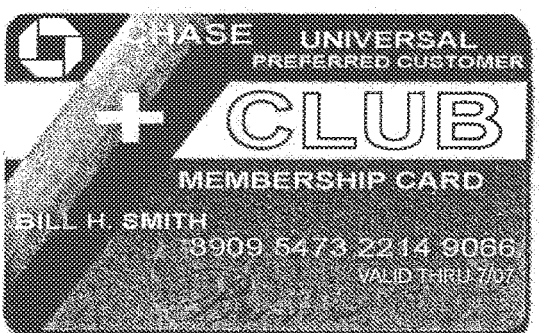
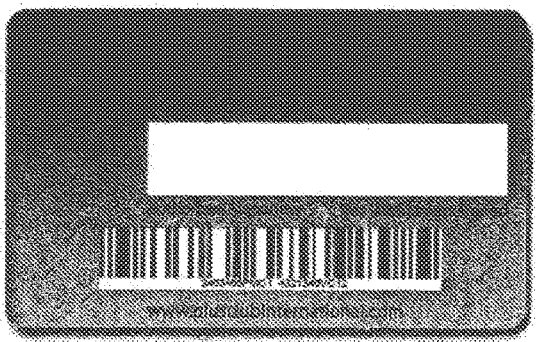

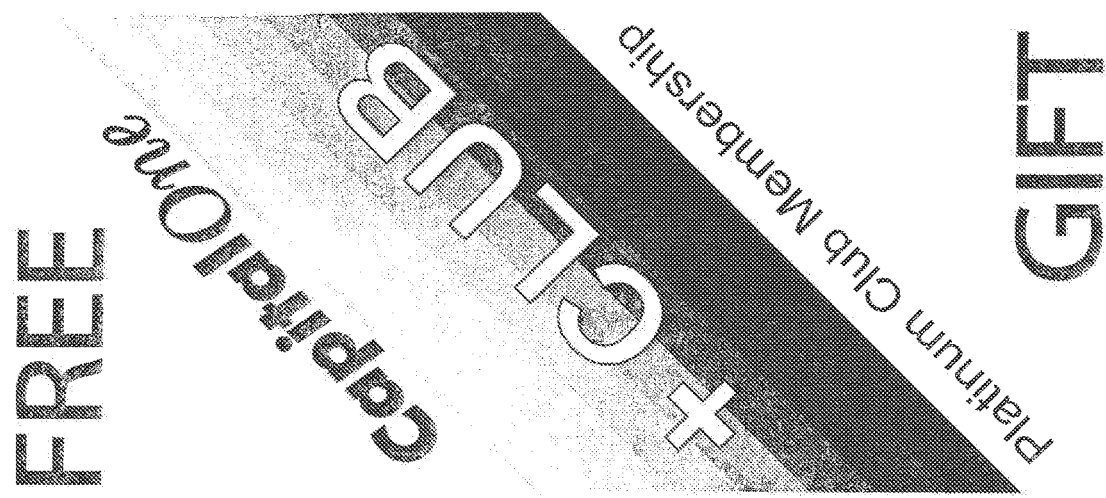
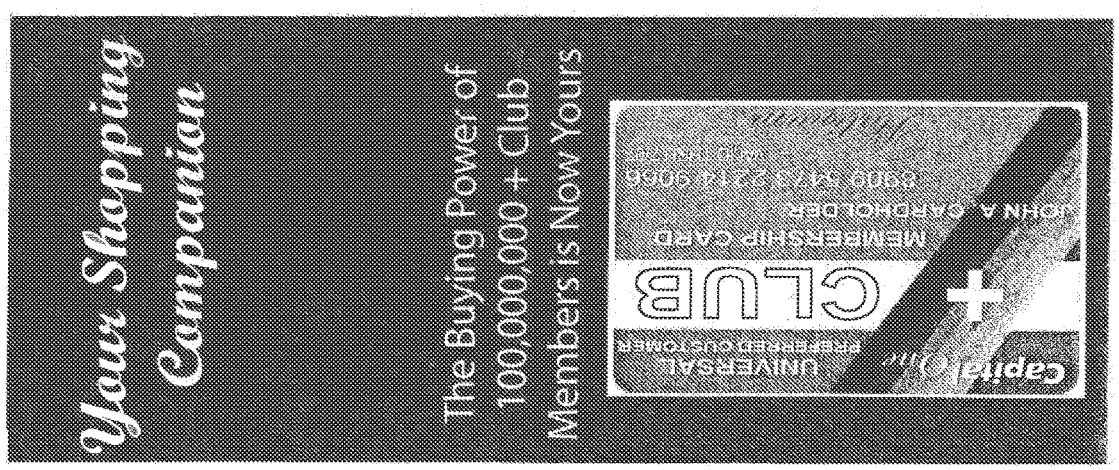
FIG. 38

NOTE: This Figure is Prior Art from earlier submittals by applicants.

CONGRATULATIONS!
You have been selected to receive a FREE gift + Club Discount Card

3 Month + Club Platinum Membership Card (This is NOT a Credit or Debit card)

Starting in April, 2006 you can use the enclosed + Club Platinum Card at any of the hundreds of participating major merchants & manufactures to receive exclusive discounts and super discounts on thousands of offerings.

DISCOUNTS (20% to 55% off MSRP* + free shipping w/ Internet purchases)

SUPER DISCOUNTS (55% to 90% off MSRP* + free shipping w/ Internet purchases)

+ Club discounts are given in addition to those merchants with their own store discount cards. You will find the same + Club discounted offerings in actual stores as shown on Internet sites.

*MSRP (Manufacturer's Suggested Retail or List Price)

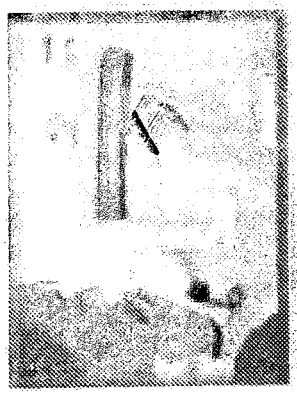

Use Online for discounts at 100's of Internet sites via + Club site:

www.plusclubinternational.com

Simply follow the screen instructions for + Club Members at the home page listed above and you will find yourself at the most powerful discounted shopping site on the internet.

OR

Use Offline for discounts at registers in actual retail stores nationwide. Magnetic Strip identifies + Club Platinum Membership Card's authenticity. Bar Code gives + Club Platinum Member special discounting.

The enclosed + Club Platinum Membership Card (discount card) is fully activated and can be used immediately.

This is a club discount card to be used with any method of payment: Any credit or debit card, check, cash or money order.

No fees will be assessed for use at or after card termination.

Permanent + Cards can be purchased after initial three month free trial period. Bronze, Silver, Gold & Platinum Cards will be available for purchase covering different areas of discounting beginning in July 2006.

It's as easy as handing your + Club Card to the person at the register, watch the card get swiped / scanned and the discounts are automatically deducted from your bill.

ENJOY!

FIG. 39

NOTE: This Figure is Prior Art from earlier submittals by applicants.

NOTE: This Figure is Prior Art from earlier submittals by applicants.

FIG. 41

"Never before has so much consumer power been harnessed by one entity."

"The Online/Offline Universal Shopping 'BIG BANG!'"

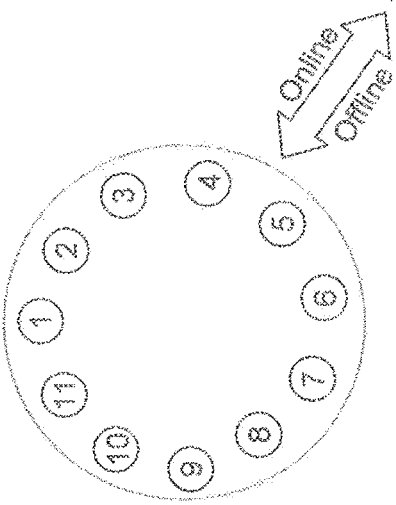
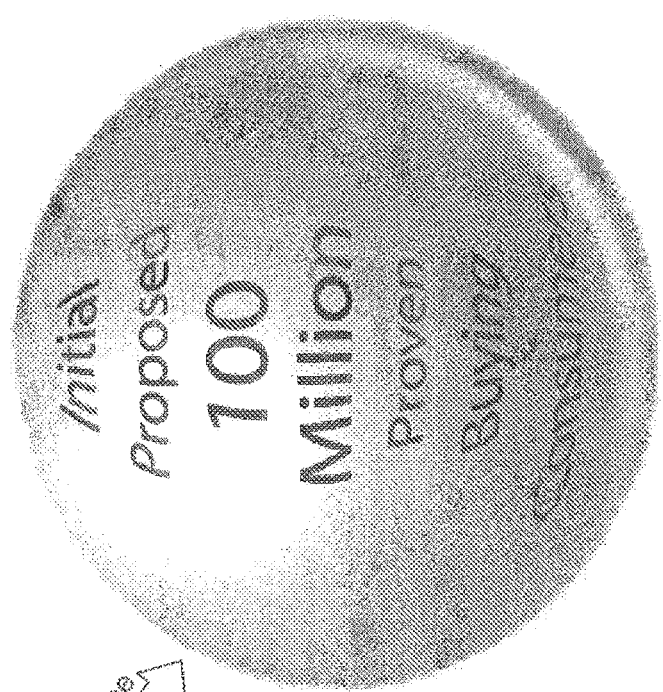
Fig. 45

+ CLUB International Sample Platinum Cards    Fig. 50
(NON-PAYMENT CARDS)

Initially, free fully activated temporary + CLUB cards will simultaneously be sent out to 100 million current Visa and MasterCard holders of the major financial institutions. Recipients of these cards will have use of them for three months at any participating retailer. After that three month period expires consumers may then decide whether to now pay for an annual + CLUB card or simply not become a member.

There will be "NO" cost to the issuing card institution for the initial "FREE" + CLUB Membership Cards. All advertising / marketing fees and card expenses will be paid for by + CLUB International, Incorporated.

The card issuing institutions (banks) will receive 10% of the annual "PAID" membership fee from + CLUB International, Incorporated for all + CLUB membership cards issued by their individual institution.

In addition to the brand exposure that the banks benefit from having their logo/name on the + CLUB card they carry, they can also "enhance" the use of their own credit/debit cards. This can be done by a bank offering additional percentage savings or reward incentives when a + CLUB Member uses a + CLUB card that has their individual issuing institution name with a credit/debit card having the same individual issuing institution name.

Yahoo's brand incorporated into the + CLUB brand

1. Sample of an Original + CLUB discount access membership card.

2. Sample of a revised + CLUB discount access membership card incorporating Yahoo's purple brand coloring onto the front of the card while the card still remains bank branded and neutral.

Back of the original + CLUB Card with the red Yahoo! logo written out

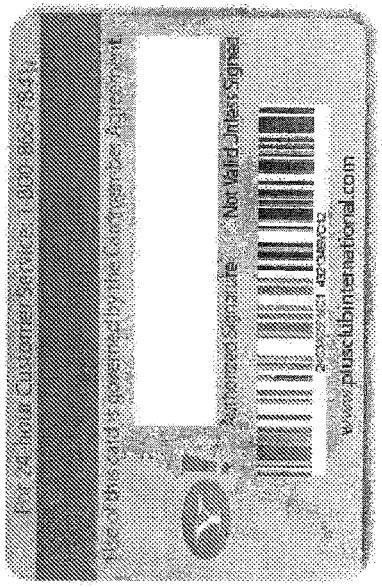

Yahoo's purple logo ties the front of the card to the back, subliminally displaying Yahoo's absolute presence in the + CLUB initiative.

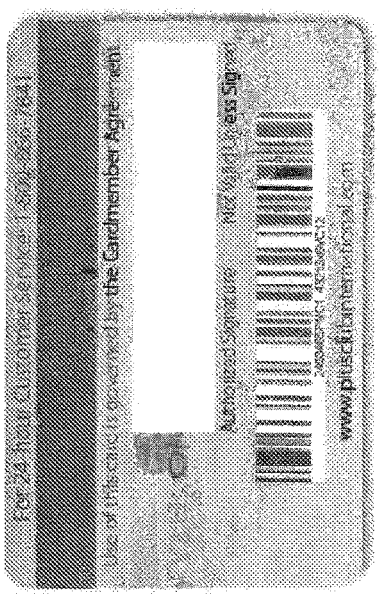

FIG. 54

Bank Loyalty Reward Programs   Fig. 55

Bank of America — WorldPoints ✳

Virtually every bank offers multiple credit/debit cards with varying types of reward programs to their card holding membership base. Consumers are faced with endless options to choose from when deciding where they want their money spent and how to have it pay them back.

These programs have their place and all provide a niche loyalty offering that help promote brand equity. However, for the most part, these rewards cards are very similar to one another in that they offer minimal savings that consumers either have to wait to receive their reward, get a fraction in return on the dollar spent, or have to choose a reward from a limited sampling of selected retailers and an abbreviated merchandise/service list.

Examples of common elements offered by these reward cards:

- Earn Bonus Points on "qualifying" purchases
- Redeem your points and select from our merchandise rewards
- Earn 1 point per dollar spent on all eligible purchases
- Cash: Redeem 3,500 points and receive a $25 check
- Choose from either a $25 check or a $25 gift card/certificate from leading national merchants for every 2,500 points earned
- Earn DOUBLE POINTS for every $1 spent at certain retailers
- Earn 1% cash back on all purchases
- Earn a 2% rebate at all eligible gas, travel & dining purchases Are these perks better then nothing? Of course they are, but they have many short comings when compared to the benefits of the Universal preferred customer + CLUB membership discount card. Imagine one main internet shopping portal to access discount offerings from all of the major national retailers. INSTANT discounting on purchases made either online or at point-of-sale in-store registers. While utilizing the power of one card, + CLUB members will enjoy 5%-90% off items ranging from unique expenditures to everyday purchases.

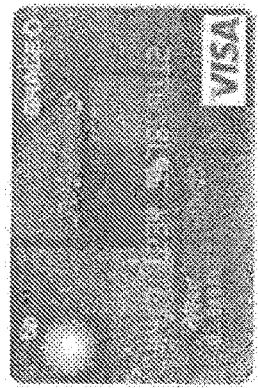
Airline Rewards credit cards

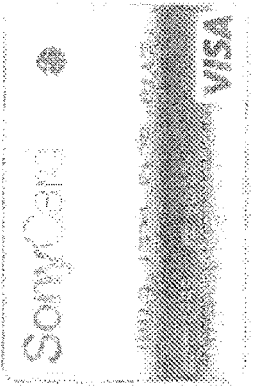
Gas Rewards credit cards

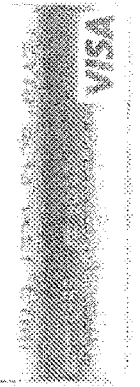
Retail Rewards credit cards

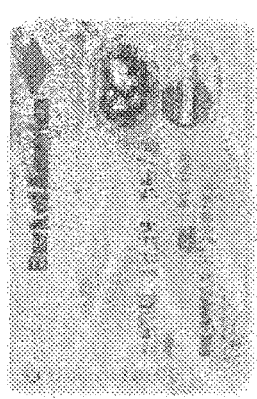
Points Rewards credit cards

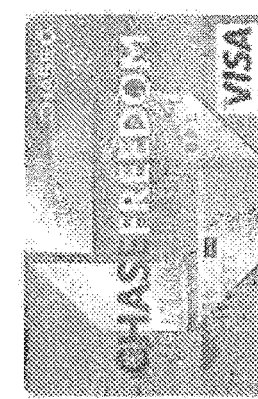
Cash Back credit cards

Travel Rewards credit cards

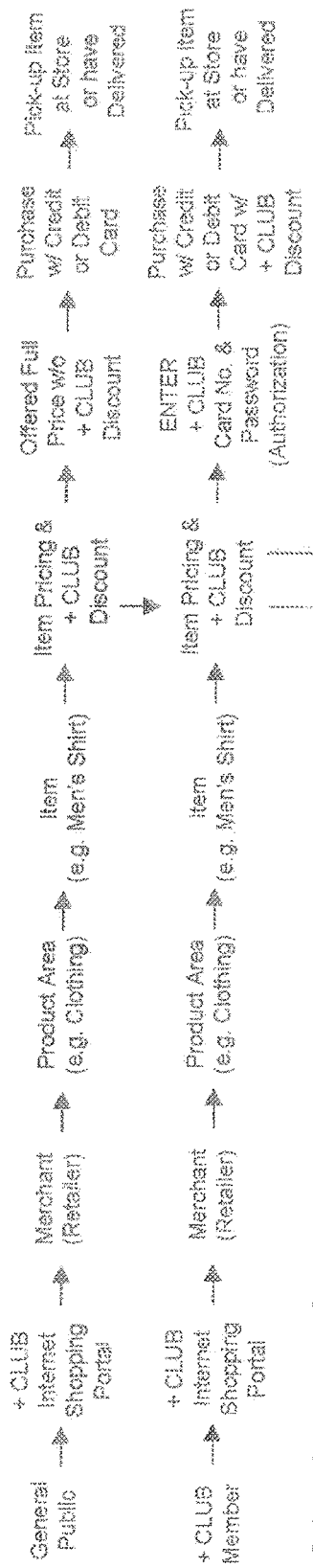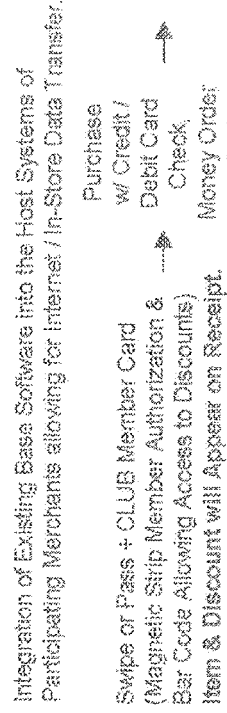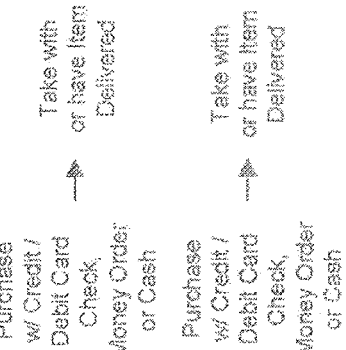
Fig. 58 — +CLUB International Member Shopping Scenarios w/ Universal Preferred Customer + Club Membership Card

Fig. 59 — + CLUB Member In-Store Consumer Experience

Printed sales receipt showing + CLUB discounted savings.

Printed sales receipt showing + CLUB discounted savings, retailer discount and card issuer discount.

+ CLUB Member swipes card at retail check-out register.

Note: All items and their discounted prices viewed online at the + CLUB shopping portal are available for those same discounted prices at the retailers (POS) check-out registers in real time.

Fig. 60

Sample +CLUB Member's Monthly Activity / Savings Report

+CLUB
International, Incorporated
*Your Shopping Companion*

About +CLUB | News | Card Types | Affiliated Banks | Videos | Forums | Account Info | Logout +CLUB Monthly Activity / Savings Report Prepared for: John A. Cardholder
+CLUB Membership number: 4561 3251 7984 4560

June 2010 Report
Platinum Chase + CLUB Card

Print this page

Transactions

| Trans. Date | Reference Number | Merchant Name | Transaction Description | Retail Price | +CLUB Price | % Saved | Amount Saved |
|---|---|---|---|---|---|---|---|
| 06/02 | 2356 | Target #5128 Grafton WI | Women's 2-piece | 72.30 | 50.61 | 30% | $21.69 |
| 06/02 | 2390 | Lowes #491 Brown Deer WI | Whirlpool Range Hood | 64.99 | 55.24 | 15% | $9.75 |
| 06/03 | 5496 | Walmart.com #5523 Mequon WI | Gillette Fusion | 18.23 | 13.69 | 25% | $4.59 |
| 06/06 | 6254 | Old Navy #54 Milwaukee, WI | Women's Halter | 29.50 | 8.85 | 70% | $20.65 |
| 06/19 | 1221 | KOHLS.com | Women's Tube Dress | 32.90 | 19.74 | 40% | $13.16 |
| 06/19 | 2899 | GAP.com | Denim Biker Jacket | 49.22 | 24.61 | 50% | $24.61 |
| 06/22 | 8521 | Walgreens #6523 Mequon WI | Bausch & Lomb Drops | 12.30 | 6.15 | 50% | $6.15 |
| 06/25 | 0590 | BESTBUY.com | Sony Camera | 145.90 | 87.54 | 40% | $58.36 |
| 06/29 | 5663 | Office Depot #165 Mequon WI | SanDisk Flash Drive | 36.29 | 12.70 | 65% | $23.59 |

Total June + CLUB Savings: $192.52

See activity from another month: January ▼

Total Year to Date Amount Saved: $1,134.21

Answer Center
Find answers to your questions.
[          ] Ask a question
Chat live online with a +CLUB representative.
Or call customer service: 1-800-789-6680

FIG. 61

+CLUB INTERNATIONAL INCORPORATED
PROVIDER/PRODUCT SERVICE RATING & COMMENT SECTION

+CLUB MEMBER NUMBER
+CLUB MEMBER PASSWORD

SEARCH ENGINE

RETAILER:

RETAILER NAME:
- RETAILER 1
- RETAILER 2
- RETAILER 3
- RETAILER 4
- RETAILER 5
- RETAILER 6
- RETAILER 7
- RETAILER 8
- RETAILER 9

OVERALL QUALITY:
- EXCELLENT
- VERY GOOD
- GOOD
- FAIR
- POOR

VARIETY OF SELECTION:

CUSTOMER SERVICE RATING:

RATE INTERNET SHOPPING ◉
RATE CLUB DISCOUNT ○
RATE IN STORE SHOPPING ○

HOW SATISFIED ARE YOU WITH YOUR CLUB DISCOUNTS:

MANUFACTURER/BRAND:
DEPARTMENT:
- APPAREL, SHOES, JEWELRY
- ELECTRONICS & COMPUTERS
- HEALTH & BEAUTY
- HOME & GARDEN
- HOME IMPROVEMENT
- MOVIES, MUSIC, & GAMES
- SPORTS & OUTDOORS
- TOYS, KIDS & BABY

CATEGORY:
ITEM:

SUGGESTIONS & COMMENTS

SUBMIT

Fig. 63

The Retailers give the + CLUB Membership its Value, so what's in it for them?

Retailers marketing and selling to the critical mass of "100 million" initial + CLUB Members via the huge Internet Portal Site will entice this enormous proposed demographic of proven shoppers into their individual store locations. Never before has there been an audience of this size using one "universal arena" for their primary shopping needs. This vast "multi-channel" Online / Offline approach to marketing and selling will generate substantial additional revenue for merchants, multiplying consumer spending while driving "in-store" growth at brick-and-mortar locations.

Unlike other "advertising revenue driver" Internet Shopping Site providers like Google, Yahoo, Ask.com, MSN, AOL, Amazon, etc., all advertising and marketing by participating merchants/retailers offering discounts on the + CLUB Internet Shopping Site will be totally "FREE":

NO LOGO or NAME LISTING CHARGES
NO ADVERTISING CHARGES or KEY WORD CHARGES
NO PRODUCT or SERVICE OFFERINGS CHARGES
NO PER "CLICK" CHARGES or COST-PER-ACTION CHARGES
NO PERCENTAGE OF FINAL SALES CHARGES
NO SITE MANAGEMENT or OPERATIONAL CHARGES

The base software, the integration and its installation into the individual retailer's host systems of the fully electronic + CLUB system at their POS registers will also be "FREE" for those merchants participating in the initial Venture launch, as these costs will be paid by + CLUB International, Incorporated.

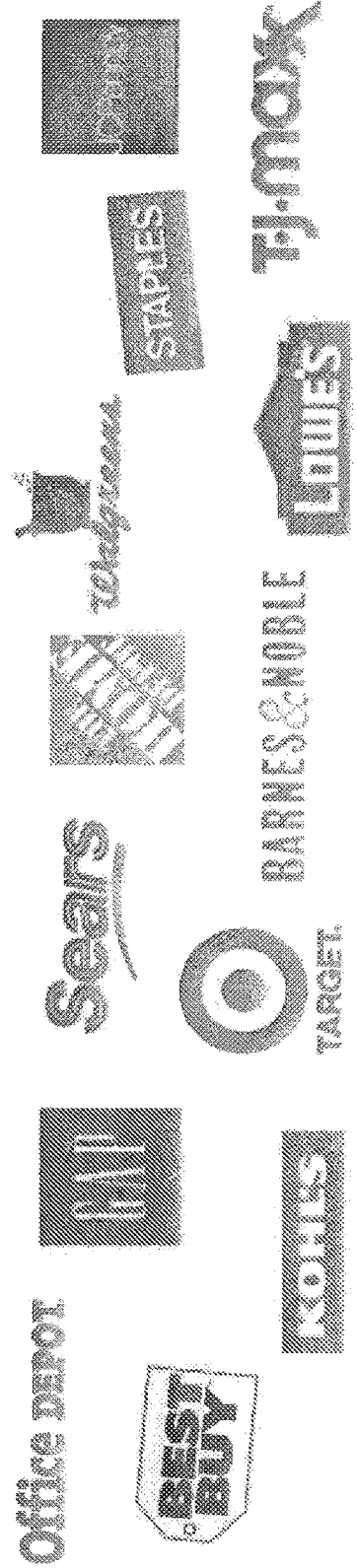

MANUFACTURER

ALL BRANDS

BEAUTY & GROOMING

| BRAND 1 | BRAND 9  | BRAND 17 | BRAND 25 |
| BRAND 2 | BRAND 10 | BRAND 18 | BRAND 26 |
| BRAND 3 | BRAND 11 | BRAND 19 | BRAND 27 |
| BRAND 4 | BRAND 12 | BRAND 20 | BRAND 28 |
| BRAND 5 | BRAND 13 | BRAND 21 | BRAND 29 |
| BRAND 6 | BRAND 14 | BRAND 22 | BRAND 30 |
| BRAND 7 | BRAND 15 | BRAND 23 | BRAND 31 |
| BRAND 8 | BRAND 16 | BRAND 24 | BRAND 32 |

FIG. 74

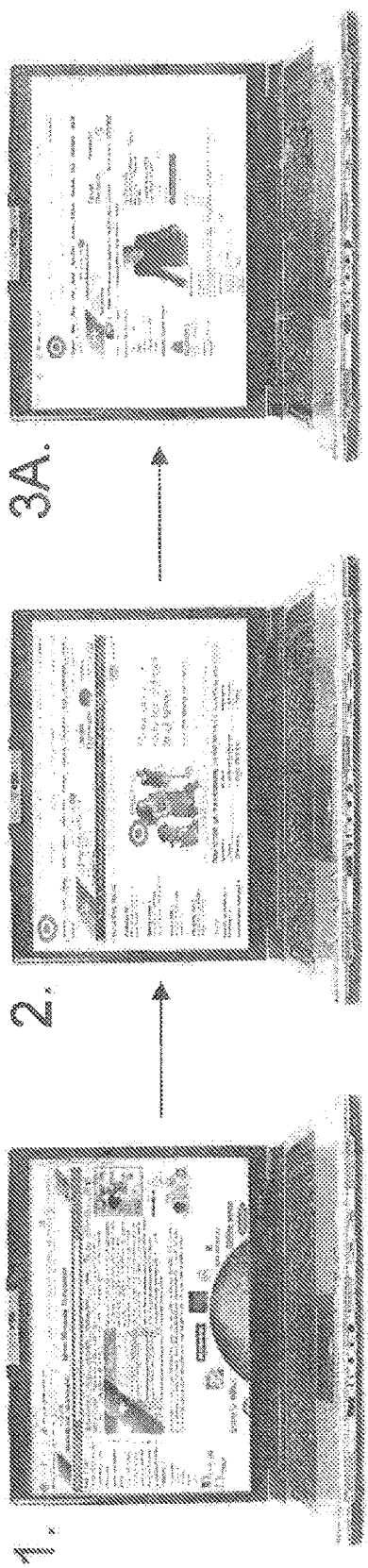

1. + CLUB member enters their membership # when visiting the + CLUB shopping portal website looking for retailer discounted offerings.

2. Retailer (e.g., Target) advertises special discounted offerings to + CLUB members.

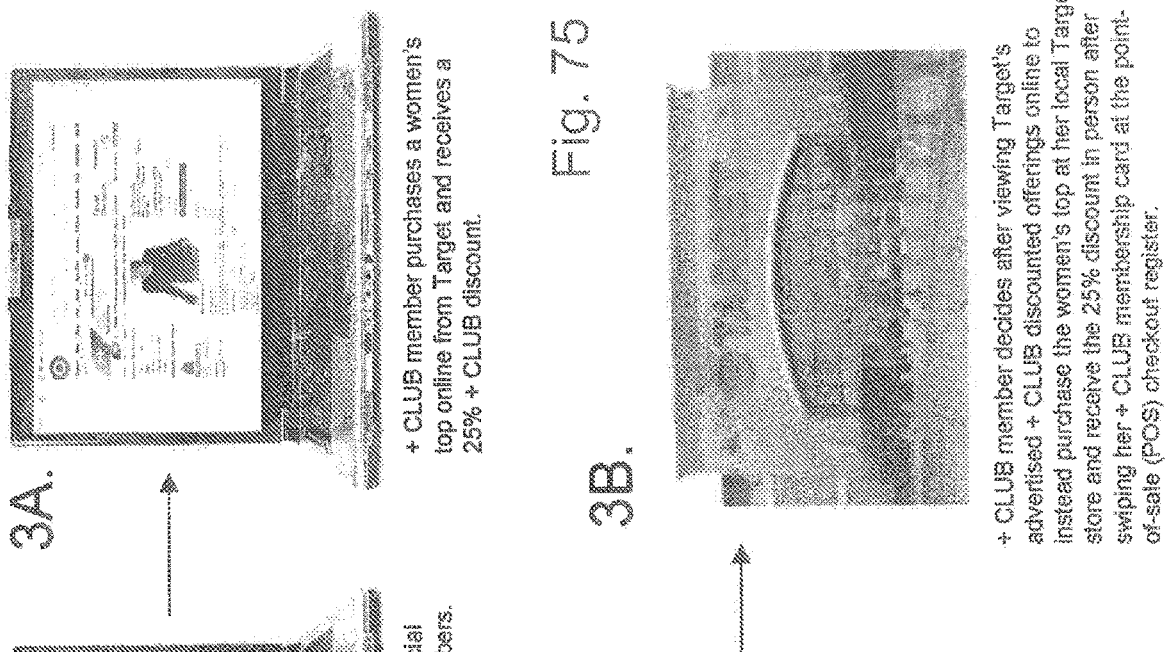

3A. + CLUB member purchases a women's top online from Target and receives a 25% + CLUB discount.

3B. + CLUB member decides after viewing Target's advertised + CLUB discounted offerings online to instead purchase the women's top at her local Target store and receive the 25% discount in person after swiping her + CLUB membership card at the point-of-sale (POS) checkout register.

Fig. 75

Consumer Behavior Tracking
(Using + CLUB membership numbers)

Using the + CLUB marketing, advertising and sales method and system, retailers and manufacturers for the first time can specifically spot and track consumer behavior, exactly measuring the effectiveness of advertisements and the correlation between an Ad view and a purchase either online or at a physical store location. Until now this has never before been possible to track with such certain accuracy. Because a + CLUB member enters their membership # before entering the + CLUB shopping website, this enables retailers to know who specifically has viewed their discounted offerings/advertisements. Then a retailer can determine the conversion rate based on whether that consumer either purchased the discounted item online or at the register in a physical store location using their Universal Preferred + CLUB Discount Card to receive the promotional discounted price.

Previously, retailers had to make uninformed decisions based on inadequate information regarding the effectiveness of their online advertising efforts. Internet search engine providers have been making billions of dollars on advertising charges without providing retailers answers to such common questions as: Where exactly are their ads being placed? Who clicked on the ads? What countries or region do the users come from? Are these Ads generating sales either online or at the POS registers?

1. Sample + CLUB shopping portal home page

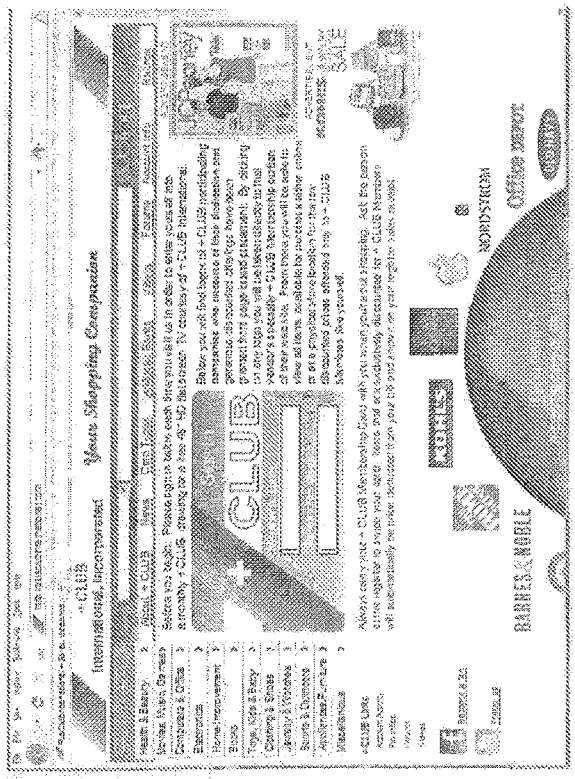

2. + CLUB presence on individual retailer web sites

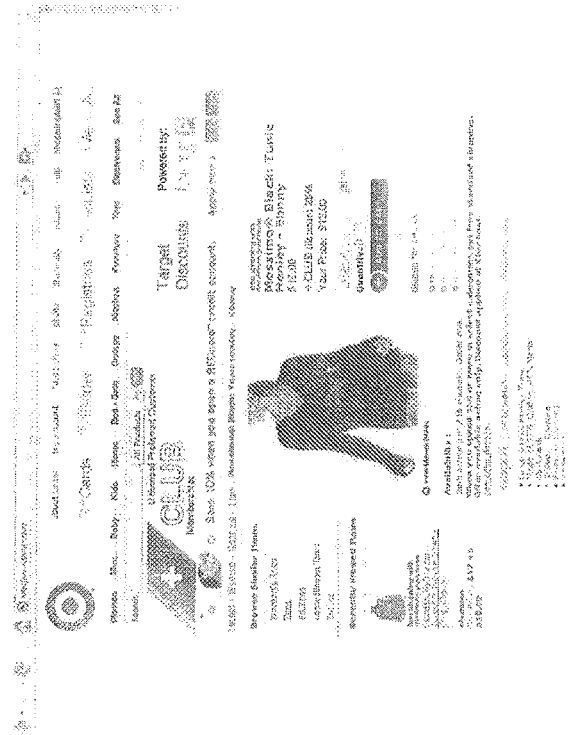

Retailers' brand logos and advertisements will be seen throughout the + CLUB website (at no cost) which will be home to 100 million shoppers at launch. The massive + CLUB shopping portal will not only offer access to exclusive discounts offered only to it's members, it will truly be an online community. With chat forums, online videos, prizes, consumer ratings and much more the + CLUB portal will be a daily online destination for millions of consumers.

3. + CLUB presence in millions of purses and wallets

The + CLUB brand will be present and carried in the purses and wallets of millions of shoppers worldwide. The brand will be seen in the real world at thousands of in-store point-of-sale (POS) merchant registers via + CLUB's real-time integrated online / offline shopping service offering and would additionally promote the name to countless millions of buying consumers, both + CLUB members and all others. Initial cards will utilize magnetic stripe and barcode technology with smart/pass/mobile technology to immediately follow.

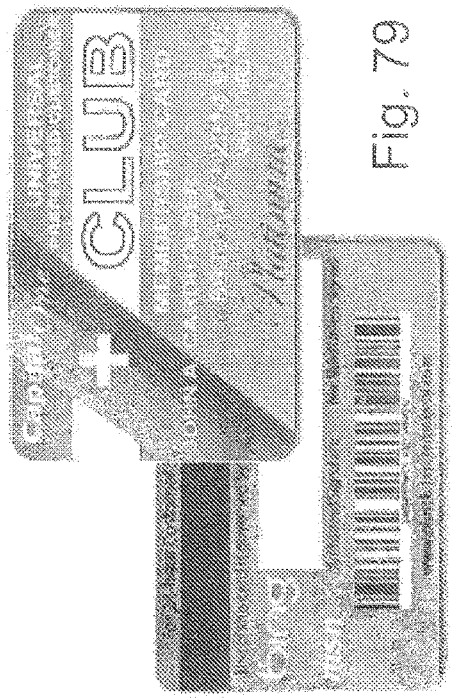

Fig. 79

METHOD AND SYSTEM WITH MULTI-TIER CLUB MEMBERSHIPS FOR DISCOUNTED BUYING ON THE INTERNET AND AT STORE LOCATIONS

CROSS REFERENCE TO RELATED APPLICATIONS

This application is a continuation of U.S. patent application Ser. No. 12/842,283, which is a continuation-in-part of U.S. patent application Ser. No. 11/376,951, filed Mar. 16, 2006, which is a continuation-in-part of PCT/US2004/030762, filed Sep. 17, 2004, which claims the benefit of priority based on U.S. Prov. Pat. App. No. 60/503,599, filed Sep. 17, 2003 and U.S. Prov. Pat. App. No. 60/534,236, filed Jan. 5, 2004, all of which are hereby incorporated by reference herein.

FIELD OF THE INVENTION

This invention relates to a method and system as a branded club product (goods and services) discounting membership, universal discount card technology, hardware infrastructure, operational and software corporate team amalgamation, seller and buyer critical mass, essential implementation and real-time operational approach to integrate Internet e-commerce with in-store commerce in physical store locations, at the point of sale (POS) checkout at store registers, of initially hundreds and eventually thousands of sellers, electronically and operationally, launching and igniting a whole new generation of advertising, buying and selling. This technology-based marketing and sales, method and system, Internet online and huge real-world offline integration concept addresses discounting in the vast consumer national and international, retail and wholesale, products and services marketplaces, utilizing individually or collectively computer systems, the Internet, e-mail, electronic data interchange (EDI), television, telephone, mail, facsimile (fax), catalogs, magazines and newspapers.

BACKGROUND

The concept of sellers offering products (goods and services) to be purchased by buyers has been a practice engaged in by both individuals and corporations over very many years throughout the world. New ideas to promote this process through marketing and advertising via the use of many different mediums is continually being addressed and developed to maximize the efficiency and effectiveness of such interactions in the specific area of shopping.

The overall competition from internet product and/or service sites competing in a relatively new industry presently address only 1.4% of the purchasing environment; whereas, 98.6% of all sales are presently being completed in the real-world, at point-of-sale store locations. While the internet is important and will become increasingly more important, at this point in time, the real-world area of sales holds sway over the true interests of sellers (merchants and manufacturers), buyers and financial institutions. These participants in the world of buying and selling would like to bring the great strengths of both of these elements together in a compatible and enhancing integration, but have yet to do so. Sellers are all trying to reach the largest potential audience of potential buyers for the least cost and offer those buyers products at costs that will entice buyers to purchase those products.

The present top ten (10) Internet sites relative to their shopping offering areas combined had a May 2004 total audience of 74.72 million. Separately in millions for the "shopping" portions of these ten sites according to the Nielsen/NetRatings in the Jul. 26, 2004 edition of The Wall Street Journal was Yahoo! Shopping (17.12), Shopping.com (15.73), BizRate (10.83), NexTag (8.11), MSN Shopping (5.73), PriceGrabber (4.54), Froogle (Google) (4.08), AOL Shopping (4.08), MySimon (3.01) and Shoptoday.us (1.49).

Advertising revenues paid by merchants to be on these Internet sites, some making up to 98% of these service providers' overall gross incomes, is the life blood of these organizations. In 2003, Yahoo! and Google combined accounted for 40% of the overall total of 6.6 billion dollars spent on Internet ads with their 1.650 billion dollar and 0.962 billion dollar respective gross revenues. In that same year, 2003, offline, real world, print advertising and marketing efforts in magazines totaled 11.6 billion dollars according to JupiterResearch, The Wall Street Journal, Jul. 27, 2004 edition. Internet advertising is proposed to equal print magazine advertising in the year 2007 at 13.8 billion dollars and exceed print ads in the year 2009 with 16 billion dollars compared to 15 billion dollars—a lot of Internet ad spending for a relatively small return.

Corporations presently advertise products on their own sites as well as on others including advertising on one or more of the following shopping search engine sites: Amazon.com Shopping, AOL Shopping, BizRate, Froogle (Google) Shopping, MSN Shopping, MySimon, NexTag, PriceGrabber, Shopping.com, Shoptoday.us, Trilegiant Shopping (Shoppers Advantage, Netmarket.com and Travelers Advantage), Visa Shopping, and Yahoo! Shopping. These Internet ad revenue driven sites charge for ad placements and web site links. Revenue options include but are not limited to "per click" charges that can range from $0.19 to $1.25, with or without a purchase being made, or require logo indication charges, or bill percentage of sale charges.

An article from Friday, Sep. 3, 2004, in The Wall Street Journal, Marketplace, Page A7, titled: "Shoppers Who Blend Store, Catalog and Web Spend More". This article indicated quote: "A study by Forrester Research recently found that customers who shop three different ways—in store, on Web sites and with catalogs—spend about four times more than customers who shop only through one of those channels. Similarly, customers who shop two different ways spend two to three times more than the single-channel consumer." This was also found by consulting firm J. C. Williams Group working with J. C. Penney Co. Many consumers like to be able to first check out items on the web before actually going to the store to buy same. Those that do also tend to buy more at the store when they do go. The linking of online and bricks-and-mortar is where retailers must direct their strategic planning to take advantage of this changing customer phenomenon.

However, with the many thousands of web sites vying for attention, the importance lies not only with merely being on the Internet but rather in being represented on a highly recognized, universally respected branded Internet site that is capable of drawing the largest audience of potential shoppers to which merchants can then present their selected potential buying opportunities enticing those consumers to come to real-world store locations. An individual does not have the time or inclination to view thousands of web site home pages Smaller Internet sites with smaller audiences than the ten (10) largest offer shopping searches (e.g., dealcatcher.com (coupons), sundaysaver.com (weekly store newspaper ad flyers), onlineclothingstores.com and clothes-coupons.com along with the marketing service Performics owned by DoubleClick) are all fringe approaches attempting to capture a buyer market for the participating sellers offering products for purchase. These sites are less expensive sites on which to advertise but also provide less seller product exposure.

Another Internet web site "Offer Zone" is presently being put forth by American Express (AMX). Of the 61 companies, 25 are hotels, all of which either offer only 15% off their regular rates or a minimum of 15% off their rates. Expedia.com, Hotels.com, Travelocity.com, Priceline.com, Hotwire.com, etc. all are service providers addressing hotel accommodations that offer far better values than 15%, ranging from 40% to 70% off the regular hotel rates. The VISA +Club Membership Venture while concentrating on other retail areas than hotels will fall into the later group concerning such offerings. Also, included in the other American Express "Offer Zone" participants besides hotels are retail companies just offering "free shipping" depending upon the size of the purchase or asking for one to join their own separate memberships or giving discounts of 10%, 15%, 20% or 25% reductions with conditions—mostly by web or phone purchasing with only a few in-store opportunities. The American Express "Offer Zone" uses the various AMX Credit Cards. Again, it does not even remotely encompass the approach, intention or implementation of the present invention discussed below.

Many individual sellers presently offer free in-store discount cards to their customers that can be used in their own seller store locations to receive discounts on certain selected products. Customers fill out a short information card and are issued the discount card immediately, unless the cashing of checks by the customer will be desired, requiring additional time for the seller to review qualifications.

These one level, free one seller (merchant) in-store location discount cards, not club memberships, can be received by any individual customer and are given to promote loyalty among their customers by offering some discount opportunities when the cards are scanned at the checkout register prior, during or after ringing up purchases but before the final total. A customer can have a plurality of discount cards from a plurality of sellers, each one only valid at the individual stores of the specific issuing sellers. These cards are not affected by and can be used in conjunction with the present invention discussed below.

Financial institutions (banks) and some sellers issue credit cards (with or without rewards) and/or debit cards (with or without rewards). These financial instrument purchasing cards (e.g., Visa, MasterCard, American Express, Discover, Japan Credit Bureau (JCB), Diners Club, etc.) are used both on the Internet and at in-store locations to pay for the products (goods and services) offered by sellers. Rewards including points, miles, products, etc. by using these cards for purchases at various seller locations and seller product types are a marketing and sales incentive by the issuing corporations for the cardholders to use individual cards by receiving specific value. Some of these credit and/or debit cards are free and others have annual fees (e.g., $35, $55, 95$, etc.). These cards are not affected by and can be used for the payment of product purchases in conjunction with the present invention discussed below.

In view of the above discussion, it should be evident that currently there are a wide variety of methods and devices that are available to a wide variety of companies of different types that are designed to create incentives to increase consumer spending on a variety of levels. While these existing methods and devices each have their respective areas of effectiveness, the methods and devices are largely disparate, are often duplicative, and generally fail to successfully operate in conjunction with one another in a manner that would effectively harness the opportunities associated with the integration of multiple channels of sales/marketing/promotion. Therefore, it would be advantageous if a new method and system were devised that allowed for such multi-channel integration.

SUMMARY OF THE INVENTION

The present technology-based invention integrates the Internet online and the huge real-world, point of sale (POS) at in-store registers, offline, with a marketing and sales, method and system for discounting in the vast consumer, national and international, retail and wholesale, products (goods and services) marketplaces via product discount club memberships along with the discount club member cards.

The development of this concept includes the full operational elements of this invention addressing such a unique and never before available total method and system approach for multi-tier club memberships for discounted buying on the Internet and at store locations (e.g., bronze club, silver club, gold club and platinum club). Each tier would address different product types with each successively higher level tier offering additional discounts than the tiers before along with the same discount offers of the lower tier memberships.

The club membership venture concerning the potential purchasing membership audience being vast, and demographic potential buyers to which participating sellers (merchants) will be presenting both within the internet community as well as in the real world of commerce, expresses the potential impact of this unique concept. The start-up will included an enormous fully activated club product discount card membership number, all simultaneous on the initial launch date.

The online/offline integration concept itself, the actual implementation/infrastructure along with the provider and user participants are all integral to the success of such a venture. While truly addressing discounting, the intention is not to merely further discount seller advertised discounts but rather to offer a new additional enormously valuable venue for marketing offerings to a huge uniquely viable shopping orientated audience, who will then make purchases in the many seller stores throughout the country.

As indicated, each major merchant participating in the launch of this venture, will be partially to fully reimbursed, depending upon the seller operational requirements, for hardware/software/development costs, which include the individual seller IT personnel time in working with the venture software development/implementation teams as required for the integration and installation of the proposed base multiple discount level software and/or ISO 8583 Loyalty Messaging Format (for example) at the registers at the individual merchant's store locations. The system(s) would be tied into the individual seller controlled, club product discount seller site page(s) on the Internet for real-time data information transfer and which, in turn, would be directly tied to the individual merchant's own separate home page on their own Internet site for all other shopping offers.

In stark contrast to present shopping search sites that are seller ad revenue driven, the proposed club membership venture intends not to charge major sellers (merchants) for advertising (special ads excluded)—an enormous plus for the participating sellers, especially when considering the vast and unequaled, purchasing audience being proposed to be addressed. Revenues for the club venture will be generated by the annual, renewable, club membership fees, which will begin following an "initial" free three (3) month start-up period for the members.

Corporations can present their discounting approach and reduction percentages as are presently indicated in their ads without changing the discounts or offering anything in addition to that already advertised. Or, along with present corporate offerings, which in themselves may be most inviting, one, two or more items could be selected on occasion (e.g., once a week or once a month) in addition, as super special(s) directed solely to the vast club membership audience, as even a further incentive to bring them into their store locations. Specials can be shown to be offered for as little time as for one specific hour during one specific day or for as long as is desired. The flexibility in marketing is limited only by the imagination of the merchant.

Club members (buyers) can log onto the club product discount member Internet web site and using their individual club member numbers and password can access the listings of corporations (sellers) either by corporate logo, corporate name listing or product type to view discounts (e.g., discounts—20% to 55% off of the manufacturer suggested retail or list prices plus free shipping or super discounts—over 55% to 90% off of the manufacturer suggested retail or list prices plus free shipping) as offered by the sellers.

Additional information is available at the corporate logos such as indications of the date and number of the latest entries, the date and discount percent of present offerings and the date and time of discounting availability (e.g., one week, one day, one hour, etc.).

Full individual product information is shown along with pricing, discounts and savings to the club members. Individual products, more than one of the products, component products, out-of-stock, and waitlist offerings are available. Payments can be by credit card, debit card, check, money order or cash (at in-store registers). Purchases can be in the full amount, by monthly time payments until paid in full, or layaway until paid in full.

Club buyer members can just view the Internet product discount offers by the sellers to see what is presently available and then choose to go directly to the actual seller store locations to purchase the selected items. Products at the in-store locations are available at the exact same price as those shown on the sellers' Internet discount pages. The software program integrated into the sellers' host system (e.g., IBM, NCR, VeriFone, etc.) electronically transmits the data from the Internet to the resisters in real time. The club product discount cards have magnetic authorization strips that are swiped at the checkout along with a bar code discount tier identifier to automatically give the club member the appropriate discount when scanned prior to, during or after ringing up the purchases but before the final total. The discounts are automatically indicated on the buyer's register receipt. A manual approach to give the club member the correct product discounts is available via individual item sheets with bar codes, coupons or manually entering the item discount at the register.

Financial institution review found no negativity in this method and system, agreeing with the importance of having the issuing bank name on the card and indicating that they would like to be involved on a percentage of the annual membership fee revenues basis for additional financial institutional marketing for the venture. Very important and as previously stated, these club cards are preferably discount cards only, not credit or debit cards with or without rewards. This therefore, does not negatively impact the present or future issued financial purchasing cards, but rather will increase the volume of cardholder purchasing, generating greater revenue for the individual credit and debit card issuing financial institutions.

In addition, the club member product discount cards are totally separate from all of the present individual in-store merchant discount cards. Actual purchases will be made via credit cards (with or without rewards including individual seller (merchant) cards), debit cards (with or without rewards), check cards, checks, money orders or cash.

In certain embodiments, the present invention relates to a method of buying and selling using club memberships as a basis for buyers to receive discounts on purchases of products offered by sellers through at least one of a computer system, the Internet, e-mail, electronic data interchange (EDI), television, telephone, facsimile (fax), catalogs, magazines, newspapers, coupons, and mailings and additionally at in-store locations, where the products comprise either goods or services. The method includes making a plurality of discounted product offers from the sellers available to the buyers by integrating an Internet online channel of purchasing with real-world offline channels of purchasing, and providing the club memberships and associated membership cards of the buyers to provide access to the integrated channels and the discounted product offers from the sellers. The method is further characterized in that the buyers who are club members have access to a club Internet web site that allows the club members to access the discounted product offers on individual seller discount pages from the sellers directly linked through seller logos or seller names either generally or by product category to the club Internet web site without the buyers having to visit a multitude of seller sites separately and locate the individual seller discount pages from within information included on the seller sites.

Additionally, in certain embodiments the present invention relates to a club membership product discounting system in which sellers advertise discount product offers to buyers for purchase through an integration of online and offline channels. The system includes means for hosting, managing and operating a club membership Internet web site on which the sellers can advertise the discount product offers to the buyers through links to discount pages from at least one of seller logos and seller names. The system further includes means for indicating additional important temporal product information at the seller logos prior to receiving commands from the buyers to link to the discount pages, and means for allowing the respective sellers to add, remove and revise data on the discount pages associated with the respective sellers. The system additionally includes means for linking to respective main web sites of the respective sellers from the respective discount pages, means for allowing the buyers to purchase discounted products online securely, and means for electronically transmitting discounted product data from the hosting means to seller in-store checkout registers.

Other objects and advantages of the invention, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and therefore, reference is made to the claims that follow the description for determining the scope of the invention. That is, the particular objects and advantages and other information provided above, and the description of the preferred embodiment and accompany drawings discussed below, may apply to only some embodiments falling within the claims and thus do not define the scope of the invention.

BRIEF DESCRIPTION OF THE DRAWINGS

FIG. 1 shows exemplary (AOLTW & VISA +Club) membership cards (Bronze, Silver, Gold & Platinum) in accordance with one embodiment of the present invention (P);

FIG. 2 shows an exemplary (AOLTW) text scenario breakdown of offering areas for club card type (P);

FIG. 3 shows an exemplary (AOLTW) text scenario breakdown of offering areas (2nd Page) (P);

FIG. 4 shows an exemplary text scenario of the ISP system on-line and off the Internet (P);

FIG. 5 shows an exemplary text scenario of the ISP system on-line and off the Internet (2nd Page) (P);

FIG. 6 shows an exemplary text scenario of the ISP System on-line and off the Internet (3rd Page) (P);

FIG. 7 shows an exemplary diagrammatic scenario of the ISP system on-line the Internet (P);

FIG. 8 shows an exemplary diagrammatic scenario of the ISP system off-line in a retail store (P);

FIG. 9 shows an exemplary (AOL.com) Internet home page (P);

FIG. 11 shows an exemplary (AOLTW) discounted (D) corporate logos page possible (P);

FIG. 14 shows an exemplary (AOLTW) listing of D & SD covered area breakdown (P);

FIG. 15 shows an exemplary (AOLTW) listing of D & SD covered area breakdown (2nd Page) (P);

FIG. 16 shows an exemplary (AOLTW) listing of D & SD/magazines w/full Internet screen (P);

FIG. 17 shows an exemplary (AOLTW/Sears) general all areas D & SD Internet site page (P);

FIG. 19 shows an exemplary (AOLTW/Sears) appliance/refrigeration SD Internet page (P);

FIG. 20 shows an exemplary (AOLTW/Sears) SD pricing Internet page (% below MSRP) (P);

FIG. 24 shows an exemplary (AOLTW/Sears) clothing pricing (% below MSRP) Internet site page (P);

FIG. 25 shows an exemplary (AOL) shopping comparative pricing Internet page alternative (P);

FIG. 26 shows an exemplary credit card plus club membership card methods of payment for purchases (P);

FIG. 27 shows an exemplary credit card plus club business membership card with business credit cards (P)

FIG. 28 shows an exemplary credit card plus club membership card individual credit/debit card examples (P);

FIG. 29 shows an exemplary credit card plus club membership card plus discount and/or payment cards (P);

FIG. 30 shows an exemplary CLUB card online and offline magnetic strip/barcode and smart cards (P);

FIG. 31 shows an exemplary CLUB card plus bronze, silver, gold and platinum magnet strip/barcode cards (P);

FIG. 32 shows an exemplary credit card plus one card (discount with credit) or two card membership offerings (P);

FIG. 33 shows an exemplary credit card plus one card/two card offering comparison—page two (P); and FIG. 34 shows an exemplary club membership in-store advertisement example (P).

FIG. 35 shows exemplary non-payment financial institution issued (MBNA, Chase, CapitalOne, Citi, Bank of America, Household Bank, Discover & American Express) Universal Preferred Customer +Club Platinum Membership Discount Cards in accordance with one embodiment of the present invention which provides dual advertising for both the financial institutions and the +Club Memberships (P);

FIG. 36 shows exemplary non-payment Chase Universal Preferred Customer +Club Membership Multi-level (Platinum, Gold, Silver & Bronze) Discount Cards in accordance with one embodiment of the present invention (P);

FIG. 38 shows an exemplary tri-foldable advertising flyer for a CapitalOne +Club Platinum Membership & +Club Card (Outside Face) (P);

FIG. 39 shows an exemplary tri-foldable advertising flyer for a CapitalOne +Club Platinum Membership & +Club Card (Inside Face) (P);

FIG. 41 shows an exemplary advertising mailer announcing the forthcoming free gift of a temporary CapitalOne +Club Platinum Membership (Back) (P).

FIG. 45 augments the exemplary graphic in FIG. 44 by showing an initial possible eleven (11) credit card and debit card issuing financial institutions (seven (7) banks and four (4) associations) as the proposed selectors of the initial one hundred million club member buyers from their credit and debit cardholder members who presently hold online and/or offline relationships with these institutions;

FIG. 50 shows an exemplary of three (3) non-payment discount access, bank name branded (e.g. Chase, Bank of America and Citi) universal preferred customer, platinum club membership cards to be used by club members when purchasing goods and services on the Internet online and in stores offline, on the phone or using catalogs along with benefits accrued for the card issuing financial institutions' participation in the method and system—all club cards optionally marketed as "Your Shopping Companion";

FIG. 54 shows an exemplary alternate use of a diagonal band color (e.g. blue or purple) on the front and/or of placing a name/logo (e.g. Red Yahoo! or White "Y" in purple oval with purple!) of the club site hosting Internet search engine provider (e.g. Yahoo!) on the back of the club membership cards;

FIG. 55 shows an exemplary comparison of typical loyalty/reward programs relative to such offerings as points on qualifying purchases, redemption of points, 1% cash back, 2% rebates on eligible gas, travel and dining purchases, etc. using any of the multiple payment cards as compared to the additional possible substantial benefits to the cardholders by using those payment cards in concert with the immediate significantly larger 5% to 90% product and service discounts and super discounts at participating retailers' points of sale at time of purchase, as would be available to club members using the one universal preferred customer club discount access, non-payment card approach;

FIG. 58 shows an exemplary of a sequential text diagram showing comparisons of both Internet online and in-store offline club member verses non-club member multiple steps from product viewing to product purchase shopping scenarios;

FIG. 59 shows exemplary in-store club member consumer's register receipts showing a product, the club membership discount and the total savings or a product, the club membership discount along with both additional separate retailer and card issuer discounts applied and the total savings on the purchase;

FIG. 60 shows an exemplary of a club member's personal monthly discount shopping activity page summary indicating the name of the retailers and manufacturers along with the products, retail price, club price, percent saved, amount saved and dates of purchase. A member can see the total monthly saving and the savings to date, which can then be compared to the annual club membership fee to understand the actual net savings received up to that point in time;

FIG. 61 shows an exemplary retailers' and manufacturers' products, brands and service rating format which includes a comment section for club members to further address individual retailer's and manufacturer's products, brands and service;

FIG. 63 shows an exemplary of logos of thirteen (13) proposed retailers along with some of the proposed benefits accruable to retailers and manufacturers participating in the method and system;

FIG. 70 shows an exemplary club shopping page (e.g. Women's Clothing) as being hosted by Microsoft's Bing with six (6) merchants with a free listing "gifted" by the club and the Internet search engine provider (e.g. Microsoft) for retailers and manufacturers;

FIG. 73 shows an alternate exemplary retailer's (e.g. Target) women's dress page with four dress offers with club discounts off the retail price along with the percentage saved;

FIG. 74 shows one of many exemplary manufacturer (e.g. Proctor & Gamble, P&G) Internet Beauty & Grooming site pages listing their brands. The inclusion of club logos placed at the individual brands would be one optional method to indicate those brands providing product discounts for the club's members, selling directly to the public, bypassing retailers;

FIG. 75 shows an exemplary of the possible unparalleled tracking capabilities of club members' shopping interests and actions, only possible through the use of club member numbers and passwords, which the members will enter on the club Internet Home Page sign-in card, allowing retailers to judge the true effectiveness of their Internet marketing and advertising offers by following individual club member's viewing of specific retailer (e.g. Target) products on the Internet and then seeing those same products being purchased by that individual club member in that specific retailer's physical store location—or in some cases, even in a competitive retailer's store location;

FIG. 79 shows as exemplary summary of three possible areas for marketing by the Internet search engine provider (e.g. Microsoft's Bing), the card issuing banks (e.g. CapitalOne), individual retailers (e.g. Target) or manufacturers and club itself both online by way of the club Internet home page, on the retailers' Internet home pages and offline on the front or back of the club membership cards.

DETAILED DESCRIPTION OF THE INVENTION

Figure 10:
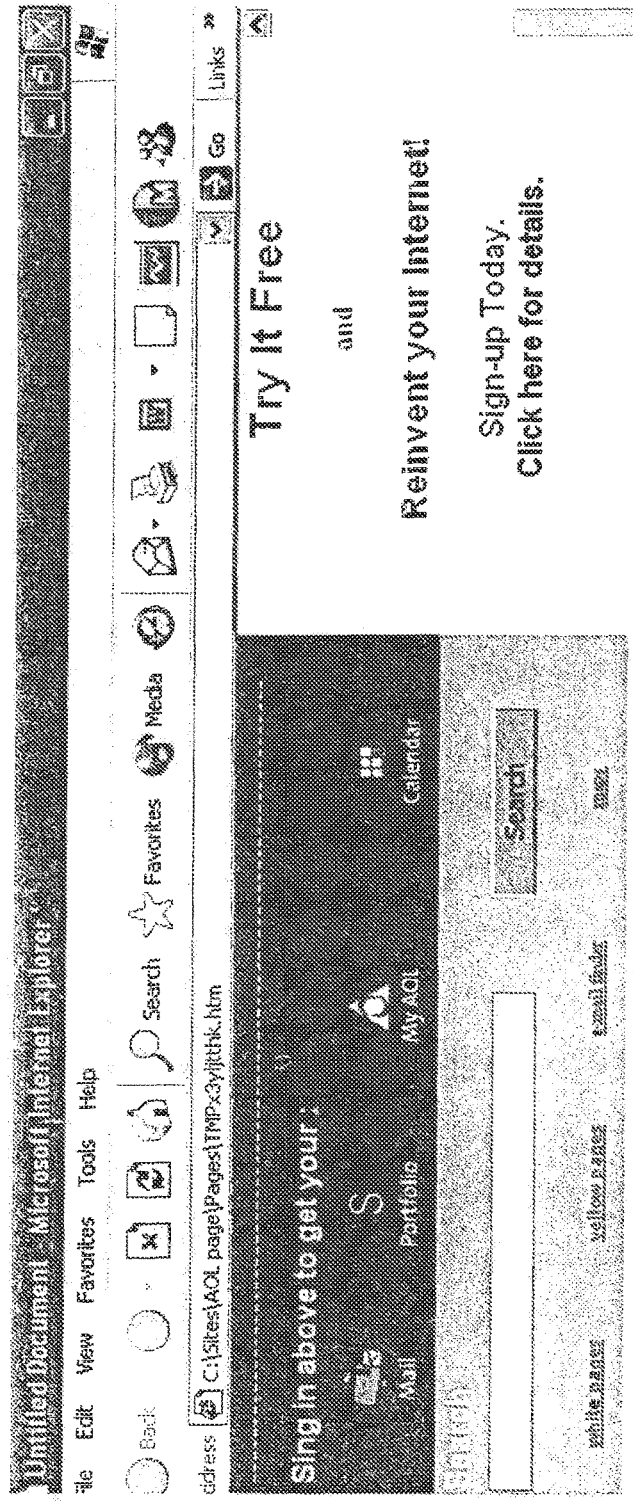
FIG. 10 shows an exemplary (AOL.com) Internet home page w/+club member no./password sign-in (P)
Figure 12:
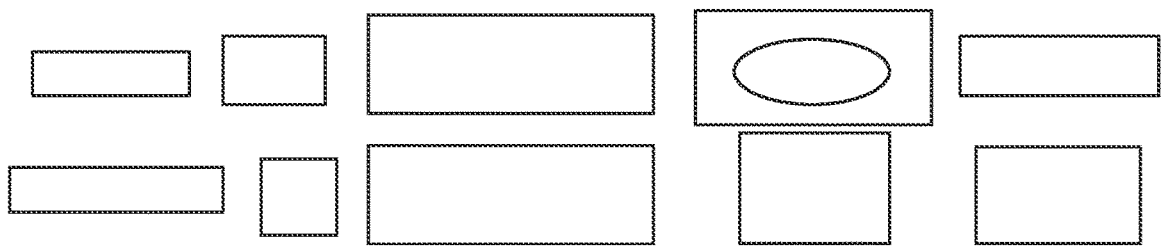
FIG. 12 shows an exemplary (AOLTW) super discounted (SD) corporate logos page (2nd Page) (P)

The present invention relates to a WIN/WIN/WIN CONCEPT FOR: INTERNET SERVICE PROVIDER(S) (ISP) & NON-ISP CORP.(S); PARTICIPATING PRODUCT & SERVICE VENDORS/RETAILERS; and CLUB MEMBERS (non-paying (initial) and paying subscribers). Throughout this embodiment including the diagrams, ISP (or any AOL, AOLTW or VISA example) includes any ISP and/or any non-ISP corporation offering an Internet site platform/portal capable of providing for the Marketing/Sales Method & System of the present invention. Also, it should be noted that any SEARS example includes any participating corporations including, e.g., retail & wholesale (corp.) discounts & super discounts. Further, it should be noted that the CLUB MEMBERS can includes individuals & small/medium/large corporations.

The Marketing/Sales Method and System using Club Memberships provides a "Neutral, Vendor Platform" and a "Specialized, Internet Portal" for the available multiples of competing, responsible and reliable vendors and/or service providers in an almost unrestricted variety of legitimate areas to advertise the offering of special "discounts" (e.g., 20% to 55% plus Free Shipping) and/or "super discounts" (e.g., over 55% to 90% plus Free Shipping) from the Standard List or the Manufacturer's Suggested Retail Price (MSRP) on provider selected products and/or services. This is not merely a typical aggregation of corporate names with vendors/retailers' products and/or services offered in side-by-side comparisons of type, quality, price, etc. or the typical listing or display of corporate named links/connections to the general, individual product or service providers internet sites that a person might very well already know and could therefore enter their separate sites totally without the use of the concept. Rather it is a single, real-time source and platform for multitudes of participating retailers, service organizations, etc. to advertise their present and/or future enticing discount and super discount offerings to a very large audience of demographically targeted members and potential purchasers. After checking out the true specials, the individuals may very well enter the rest of the corporations' individual Internet sites to view their other offerings available to the general public. This one neutral, collective "discounting" location is a unique, highly interactive, product and service information communication, marketing and sales tool between vendors and buyers. This method and system replaces the need for an individual to search hundreds and even thousands of individual corporate Internet sites to find such discounts, which is not only extremely time-consuming but by the very nature of such a process is for all practical purposes impossible, along with integrating these almost unlimited number of Internet offerings on the aforementioned multitude of sites with those of the physical world at individual store locations for the same products and services. (See FIGS. 1 through 25.)

An operational Method and System "Text" Scenario indicates both an Internet (on-line) and a retail store location (off-line) or call in request (off-line) to television, store, etc. offer approach. (See FIGS. 4, 5 and 6 which, in turn, refer to additional figures for further method and system explanation.)

An operational method and system "diagrammatic" scenario indicates an Internet (on-line) approach. (See FIG. 7 which, in turn, refers to additional figures for further method and system explanation.)

An operational method and system "diagrammatic" scenario indicates a retail store location (off-line) or call in request (off-line) to television, store, etc. offer approach. (See FIG. 8 which, in turn, refers to additional figures for further method and system explanation.)

The method and system will employ "independent", ISP/Service Provider/Product Supplier/Manufacturer/Travel/Entertainment, etc. driven, single or multi-level ISP +club memberships (e.g., Bronze, Silver, Gold and Platinum). (See FIG. 1 for certain exemplary membership cards.)

The products and/or services discounts and super discounts offered by the participating vendors and service providers are presented "exclusively" to the ISP club members or alternatively to other competing ISPs' club members, if those ISPs, too, are permitted through licensing to use the method and system.

Instantaneous critical mass of both subscribers and participating vendors is absolutely necessary at the launch date(s) for the greatest success of such a venture; as subscribers will not be satisfied with either just a few vendor participants and/or just a few discounted or super discounted offerings, and, in turn, vendors will neither be compelled nor will take the time and the effort to offer substantial discounts and/or super discounts for just a few subscribers.

To obtain the initial critical mass of subscribers with "limited" or "standard" club memberships, these club memberships would be simultaneously "gifted" to all of the subscribers of the ISP providing the marketing and sales method and system. This would immediately include many millions of individuals. These subscribers neither ask for nor sign up for the initial memberships. All of the necessary member information is already on file with the ISP that the subscribers are using for internet access. The method of choice for informing the subscribers of their individual memberships is by e-mail. (This could be reinforced through a mass mailing option.) All subscribers are addressed with the mass e-mail program in which computer-generated club membership numbers and passwords are sent with a brief description of the upcoming discount and super discount vendor offering opportunities. No club membership cards would need to be issued during the initial several month "gifted" period.

To obtain the initial critical mass of product and service vendor providers, the ISP would approach the existing vendors already participating in the ISP's existing shopping and/or travel offerings network(s). In addition, other corporations would be approached with the opportunity of advertising to the new huge subscriber audience created with this unique marketing and sales concept.

The ISP should heavily advertise the upcoming event of the ISP +club membership offering prior to e-mailing to all ISP subscribers their limited or standard "gifted" several month ISP +Platinum Club membership number and password as well as after the mass e-mail effort. (A Platinum Club membership would give the ISP subscribers access to the entire range of offerings as opposed to a lesser value membership, so that the subscribers can later decide whether nor not to continue with a "paid" membership at the time that the initial "gifted" period ends and their initial membership expires.) This major advertising promotion will insure both widespread subscriber and vendor participation and result in a financial bonanza for the ISP, as well as raise the bar in "shopping" environments, making it very difficult for competitors to follow.

The club memberships can preferably be divided into multiple types to provide different offering opportunities depending upon the cost of the individual membership, such as ISP +Bronze, ISP +Silver, ISP +Gold and ISP +Platinum Club memberships. With separate membership types, various values and areas of products and/or services would be available with each of the different memberships the higher cost memberships would include additional offerings along with the offerings of the lesser value memberships. (See FIGS. 2 and 3.)

For ISP subscribers wishing to continue with the ISP +Platinum membership or one of the other three memberships (Bronze, Silver or Gold), after the several month "gifted" period expires, a monthly fee would be assessed and an actual MEMBERSHIP CARD issued along with allowing the member to select a new PERSONALIZED password, if one so desired.

Club memberships allow the holders not only to take advantage of offerings on the Internet but also to take advantage of offerings at the respective individual vendor's retail establishments, restaurants, service organization, etc. locations throughout the country or world. Any available ISP +club site Internet discount offering on a product or service would automatically be applied, at the time of the purchase of the same product or service, at the register of the retail location(s) when the club card, or appropriate club card if there are membership types, is electronically read or "swiped", whether or not the club member is aware of the offered discount or super discount on the Internet. This will finally truly integrate the "virtual" and "real" day-to-day worlds. (See FIGS. 4, 5, 6, 7 and 8.)

ISP/Vendor "discount" and "super discount" site pages would be accessible only through the ISP's club membership pages which, in turn, would be accessed either from the ISP's site or directly from the individual vendor's/retailer's/etc. own site/home page/etc. without first going to the ISP home page or other ISP sites. The latter will bring up the ISP +club site requiring the member number and password; however, once the member has finished viewing the offerings and possible purchasing there, the member can then return to the corporation's Internet pages but, respecting the individual corporation, not to the full ISP discount and super discount pages, protecting the participating corporation from having members go to other competing providers or other offerings through their own site, unless that corporation does not find such movement objectionable. If the member had accessed the corporation by first going through the ISP sites, then the member would have full access to all of the other participating corporations' discount and super discount as well as standard Internet sites directly. Also, club members' selections by either the individual companies' logos (see FIGS. 11, 12, 13, and 22) or by the companies' names under the "item" directories (see FIGS. 14, 15, 16, and 23) will only bring up the discount pages and not proceed directly to the individual vendors' home pages. And, after a club member arrives at the individual ISP/vendor discount page(s), the individual vendor's home page can then be reached directly or returned to, if the original discount site access came from there, to view the other vendor's offerings as presented to the general public.

This new approach will be separate from and in addition to, not instead of, the present offerings by the ISP. This offering is truly unlike typical ISP shopping, or ISP travel offerings which, in effect, merely mirror the offerings of almost all of the other ISPs and/or other individual product or service vendors, relative to actual savings.

The system & method is not just a series of controlled single-day offerings at certain times of the year but rather a continuous every day, all-year discounting effort, offering within its format, specific day or hour specials. This new concept creates a very dynamic platform/portal with participating vendors/service providers constantly changing/modifying/adding/deleting the ISP +club member offerings. This entices the members to check the sites often so as not to miss any truly unique opportunities to save—not waiting for some sporadic advertised sales event by a selected list of non-competing retailers on a semi-static shopping site with very few real discounted products/services.

It should be further noted that vendors totally control their own discounts and super discounts and the pages on which they are presented, indicating custom, or many, or one of a kind items, or services, and/or limited time offers, and/or combination offers, and/or out of stock/wait list (date) items, and/or lay-a-way, and/or any other manner of products or services as well as flexible payment arrangements to entice the ISP +club members. (Due to the great value deals, individuals may well choose to purchase even though they were not looking for a particular item or service-true "impulse" buying.)

Vendors that are not interested in providing discounts or super discounts on their products or services will not appear either by logo or item listings within the ISP +club membership sites. However, vendors that are interested will appear under item listings and, if they choose, also separately with their company logo. The logo may appear fixed, flashing, moving, enlarging, etc. with or without relevant dates for the most recent added item(s) ("latest"), length of discount period ("until") or specific limited day discounts ("only") can be indicated by the vendors providing club members with all important timing information, if they wish to review items for purchase (e.g.: latest: Jun. 4, 2003, 18 Items; until: Jun. 20, 2003, 40% to 50%; and/or only: Jun. 15, 2003, 10 AM to Noon). (See FIGS. 13 and 22.) In any case, vendors may also appear on any or all of the other ISP shopping sites and/or ISP travel sites.

Vendors offering only discounts or super discounts on very inexpensive items (e.g., $1 off a $5 item) when they sell many high priced items, just to entice ISP +club members to their site, will be dropped from presenting offers, for it undermines the spirit and intent of the concept by trying to skirt their obligation to offer truly substantial dollar values for the "privilege" of having their names seen on these sites by such a huge audience of potential buyers even though they would have to pay to advertise on the sites.

An important note is that the ISP +club membership sites are open to all "qualified" product and/or service vendors. The ISP solely reserves the right to determine what vendors meet the required qualifications to be placed on these sites for viewing by their membership. Quality, reliability, integrity, delivery and warranties of offerings are just a few in the overall list of necessary parameters for vendor participation.

The neutral platform will allow multiple vendors in multiple areas to decide on their unique strengths and abilities to offer the special discounts and super discounts. No individual store or entity, not even the largest retail chains, would be able beat or even match the vast array of potential offerings that can be put forth by such a wide variety of vendors of untold products and/or services. All qualified vendors will be welcome in all areas. (One specific example in a non-asset based service industry involved in travel and related service offerings separate from the individual asset based provider companies would include companies such as Expedia.com, Hotels.com, Orbitz.com, Priceline.com, Travelocity.com, Hotwire.com, CheapTickets.com, etc.)

With the eventual widespread use of the ISP +club membership cards at individual vendors' physical store locations as indicated above, the ISP will become a major world discounting leader with a base so large that other competing ISPs, without the use of the present method and system, will find it difficult to hold the interest of their shopping subscribers.

The ISP becomes a vendor itself in the ISP +club membership scenario, able to promote through special limited or individual month, second at half price or free, etc. discounts on the ISP's own products and/or services.

The ISP can also promote its ISP VISA card (if one is offered by the ISP) to handle the transactions through the ISP +club environment by offering "extras" that are not available through other VISA, MasterCard, Discover, American Express, etc. cards with those organizations.

Product and service offers can include custom, one or many of a kind, limited time, combinations, wait-listed or out-of-stock, etc. in addition to the more standard approach. Also, the products and services can be purchased by credit card, check, money order, cash (at a store register), etc. and either outright, multiple payments, layaway, etc. giving the members numerous options that can be tailored to their individual situations.

Since ISP +club memberships only address the special discounts and super discounts on specific vendor offerings (unless other lesser, wider based offerings are added), any existing other ISP shopping and/or ISP travel offerings will remain viable and valuable services in the ISP corporate family for interested subscribers. The actual discounts on these other sites could also indicate the percent discount from the list or MSRP, so that the members would be able to realize their actual savings. (See FIG. 25.)

The ISP will hold sway over other ISPs with these unique discount and super discount shopping content sites not incorporating this discount approach. Subscribers who use other ISPs will have to participate through "bring-your-own-access" to the ISP using this service or lose out on the great deals. The "extra" monthly fees might well make those subscribers decide to just switch to the ISP offering the method and system. And eventually, those that are not with any ISP might well decide to join the ISP when they see ISP +club members checking out in line in front of them receiving the automatic discounts at the same stores and on the same items that they are paying full or higher prices.

As already discussed, the present method and system in various embodiments can provide ISP +club memberships and/or non-ISP +club memberships, and can allow a variety of different possible membership types such as, for example, Bronze, Silver, Gold and Platinum membership types both on-line and off-line. The method and system can allow for discounted and super discounted pricing for a variety of specific products, hotels, travel, services, etc., some or all of which may be separate from and/or in addition to any existing ISP shopping offerings, ISP travel offerings, or other offerings.

The implementation of this business concept will position the ISP as a neutral, price sensitive, quality Internet destination venue or marketplace/portal for a most truly diversified range of retail/wholesale, products/services on-line offerings, which are also available off-line at the individual participants' physical locations, whether or not the member(s) were first aware of the Internet offering(s). Due to the unique nature of this concept, ISP competitors will be hard pressed to replicate the success of this approach, which will generate substantial annual revenue for the ISP entity.

The potential advertising bonanza for participating providers of goods and services through this club membership approach is almost unlimited. Solid discounting and/or super discounting of items will direct members to their individual discount/super discount pages and then to the individual product buy pages with percentage discounted pricing from the manufacturers' suggested retail prices (MSRP) along with price and savings comparisons. From these pages the club members can be directed into the providers' own individual sites for additional sales opportunities on other goods and/or services before returning to the club membership site. Advertising to such a large audience of millions of members will justify substantial advertising revenue to the ISP along with the revenue generated from both the new membership fees and the potential additional sales of other ISP goods and services through this venture. These new areas of revenue will provide an enormous capital infusion into the ISP entity along with a tremendous growth period both in size and valuation for the corporation. The ISP can hold sway over its rivals as they struggle to meet the new high bar in this fiercely competitive Internet industry.

An extremely intensive and continuous marketing effort must be supported by the ISP to allow sufficient personnel to contact and adequate resources to deliver the message to both present and potential future provider participants. The success of this major integration of the virtual Internet and real world buyers' marketplace environment of a multitude of providers, across a very broad spectrum of goods and services, is to present both discounting as well as super discounting on the costs of their individual offerings. This will create a never before seen or even contemplated assemblage—a truly grand amalgamated marketplace with outstanding pricing, a buyer's dream.

Also as discussed above, in certain embodiments the present method and system will involve a new marketing/sales method and system concept in which the ISP (and/or non-ISP) possibly e-mails and/or mails (or otherwise communicates) to all present ISP subscribers and/or card holders offering an enormous discounted buyers marketplace opportunity, in which a gift is provided from the ISP to all its ISP subscribers and/or card holders.

The ISP is giving a unique gift to all its subscribers/card holders, both individuals and/or organizations, by providing an opportunity for both product/travel/hotel/service/etc. suppliers to offer special discount and super discount pricing to all its subscribers who, in turn, will benefit by the savings obtained on purchases during an initial multiple month free trial club membership period.

In certain embodiments, the ISP would offer four (4) club membership types (see FIG. 1, showing cards for different types). Namely, these types would be the following: ISP +Bronze Club membership (see FIG. 2); ISP +Silver Club membership (see FIG. 2); ISP +Gold Club membership (see FIG. 2); and ISP +Platinum Club membership (see FIG. 3). The gift would be a limited*ISP +Platinum Club membership, effective immediately, with an appropriate member number and password. For example, a member might be assigned a member number of 286 49973311 and a password of AFYS9987 (see FIG. 10 for a sign-in screen). These new +club memberships for on-line and off-line use would be in addition to and separate from any present ISP shopping, ISP travel, etc. offerings.

Following a possible three month (more or less) initial free membership period, the gifted ISP +Platinum Club membership will automatically expire. Should the member wish to continue with the Platinum Club or wish to choose the Bronze, Silver or Gold Club memberships, the member will have to contact the ISP. At that time, the member would be sent a club membership card and could select a new personalized password. This would then allow an individual or organizational member to continue to receive club member savings on future purchases and services. The limited multiple month club membership might not include discounts on other services, benefits, perks, fees, access charges, etc. offered by the ISP.

FIGS. 4-7 further show an ISP marketing/sales method and system involving an ISP +club member system use scenario on-line (Internet) and/or off-line (physical store location). FIGS. 4-6 in particular show an on-line and off-line text scenario, while FIG. 7 in particular shows an Internet (on-line) diagrammatic scenario and FIG. 8 shows a retail store location (off-line) diagrammatic/text scenario.

Describing a use of the marketing/sales method and system, an ISP +club member either logs onto the Internet from a computer or other electronic device or the member enters the physical store location of a particular Internet participating ISP +club vendor or service provider. If the member chooses the Internet approach, the individual can go to the Internet home page of the ISP provider (see FIG. 9). From there, one can proceed to the general ISP +club site (see FIG. 10). A non-club member or a club member who wishes to upgrade to a higher membership can see the benefits and services offered under each of the different club membership types (see FIGS. 2 and 3).

On the ISP +club site, the member enters an assigned club member number as well as a given or personalized password prior to being able to purchase from any of the participating retailers, vendors, service organizations, etc. The member can go to the ISP +Bronze Club membership page, the ISP +Silver Club membership page, the ISP +Gold Club membership page or the ISP +Platinum Club membership page depending upon what club membership the individual held (see FIG. 1 for possible membership card type examples). In this particular scenario the member goes to the ISP Gold Club membership page (see FIGS. 11, 12, 13 and 22 for corporate logos, or see FIGS. 14, 15, 16 and 21 for item or area descriptions and corporate listings).

The individual corporate logos can be selected by "clicking" on same to proceed to the individual corporation's ISP/corporate discount or super discount page(s). These logos can be fixed, flashing, moving, enlarging, etc. to draw the attention of the member. Also, additional information can be placed with the logos indicating such things as the latest date that new items or services have been placed on the corporation's discount or super discount pages (e.g., latest: Jun. 15, 2003, 30 items), the date up to which certain discounts will be valid (e.g., until: Jun. 20, 2003, 50% off) and/or a date and time of upcoming discounts (e.g., only: Jun. 22, 2003, noon-5 pm), etc. This helps members to make certain informed judgments prior to actually going to any individual participating corporation's site.

Figure 16:
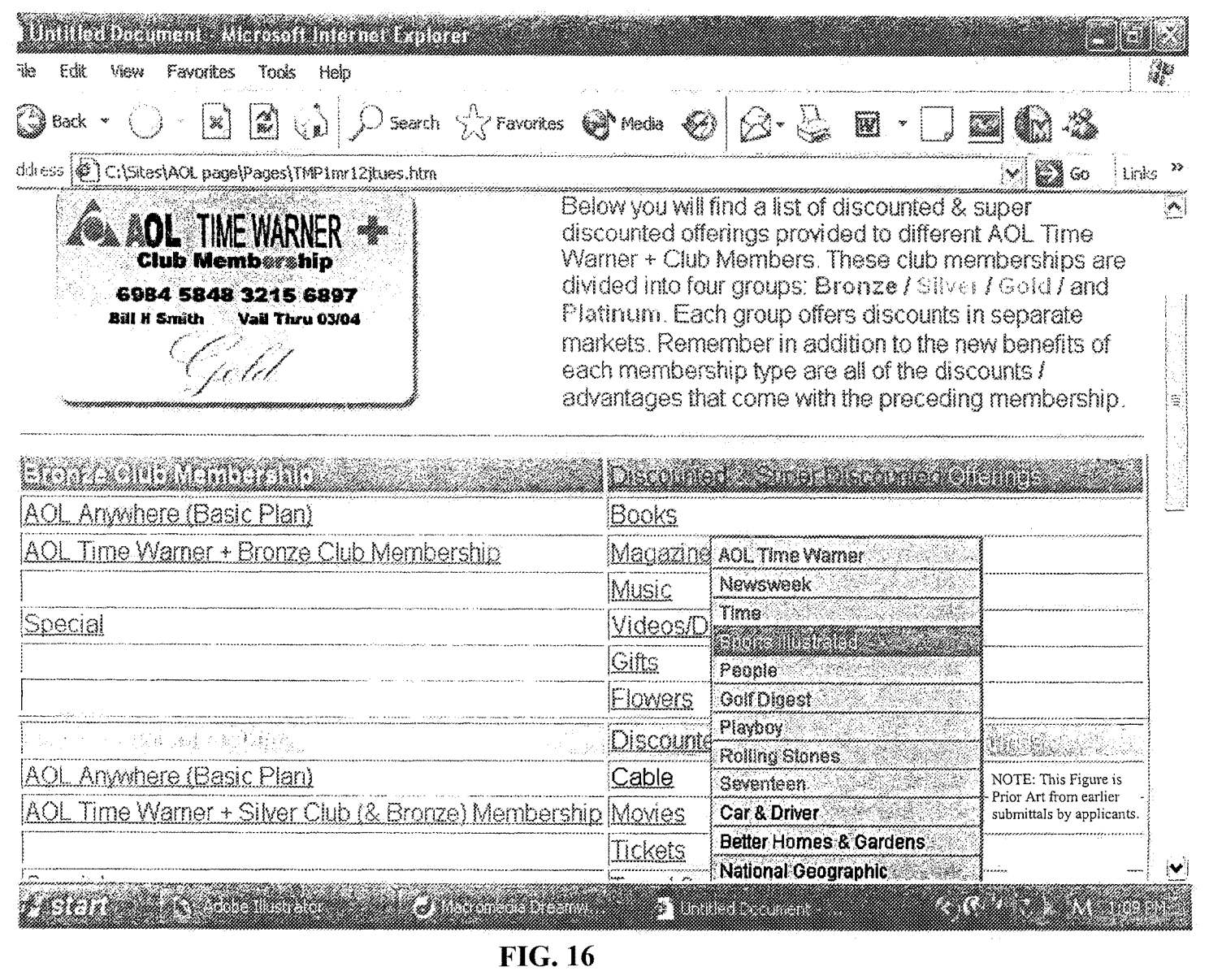
Figure 21:
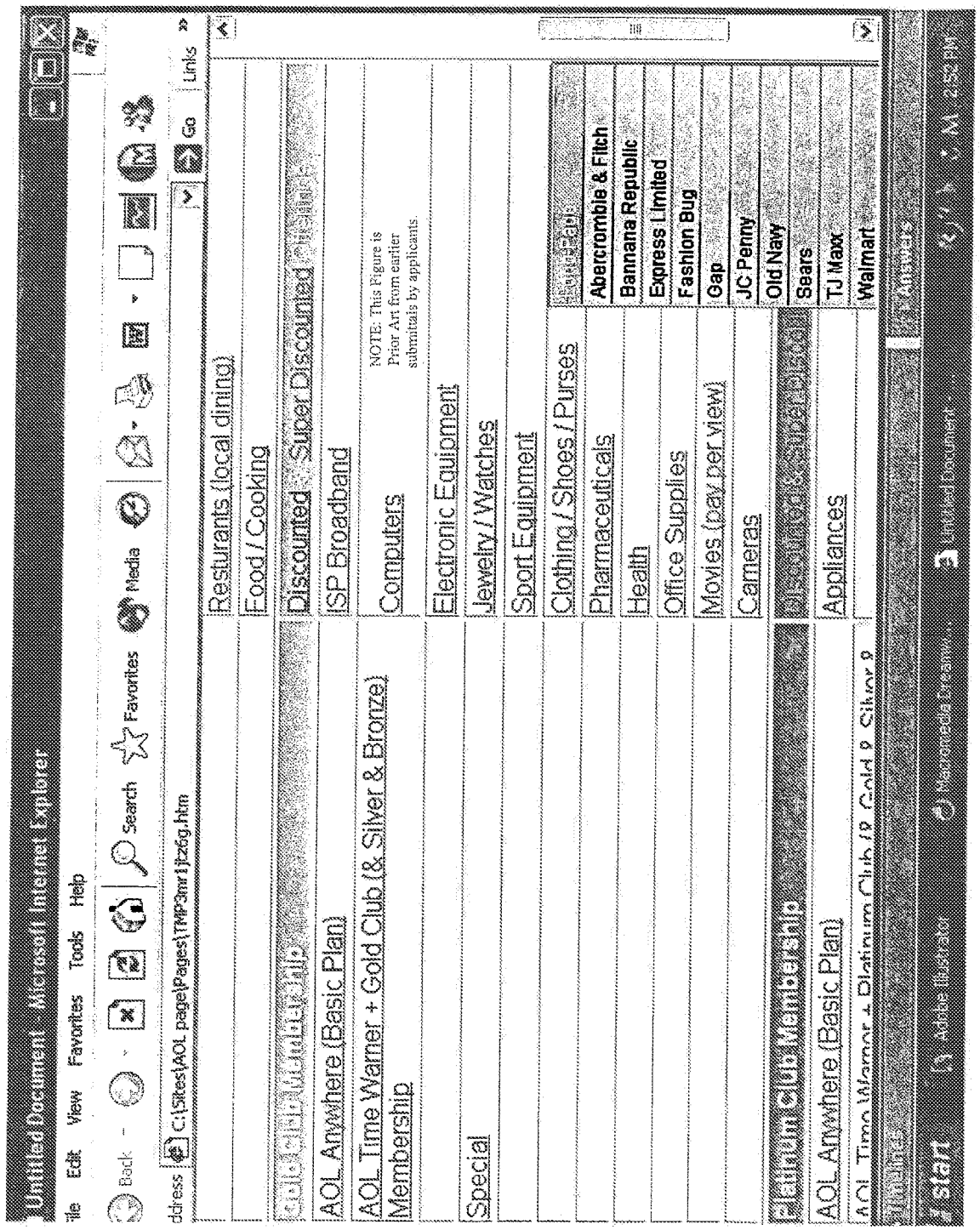
FIG. 21 shows an exemplary (AOLTW) listing of D & SD/clothing, etc. with full Internet screen (P)
Figure 22:
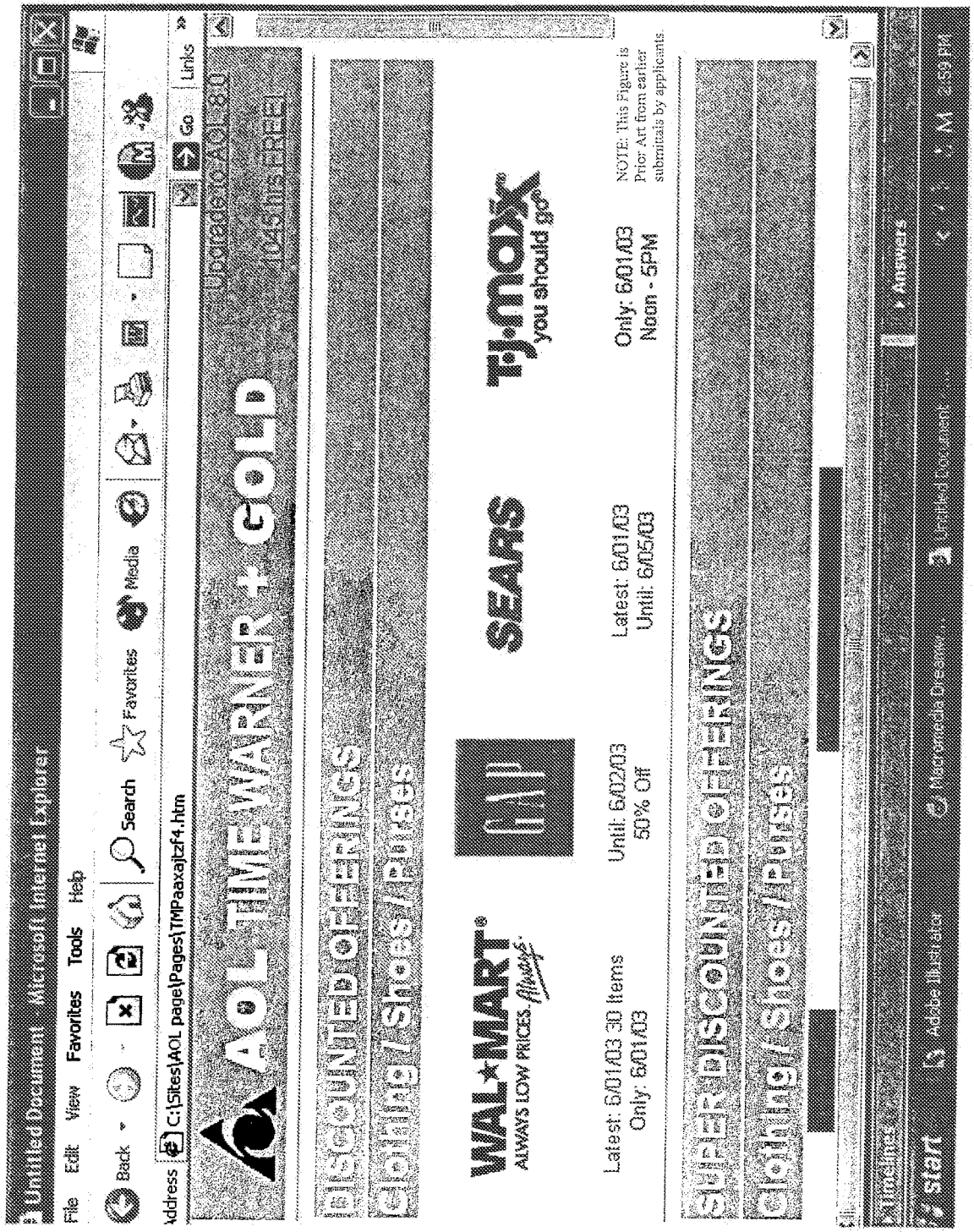
FIG. 22 shows an exemplary (AOLTW) D & SD/clothing, etc. corp. logos w/full Internet screen (P)
Figure 23:
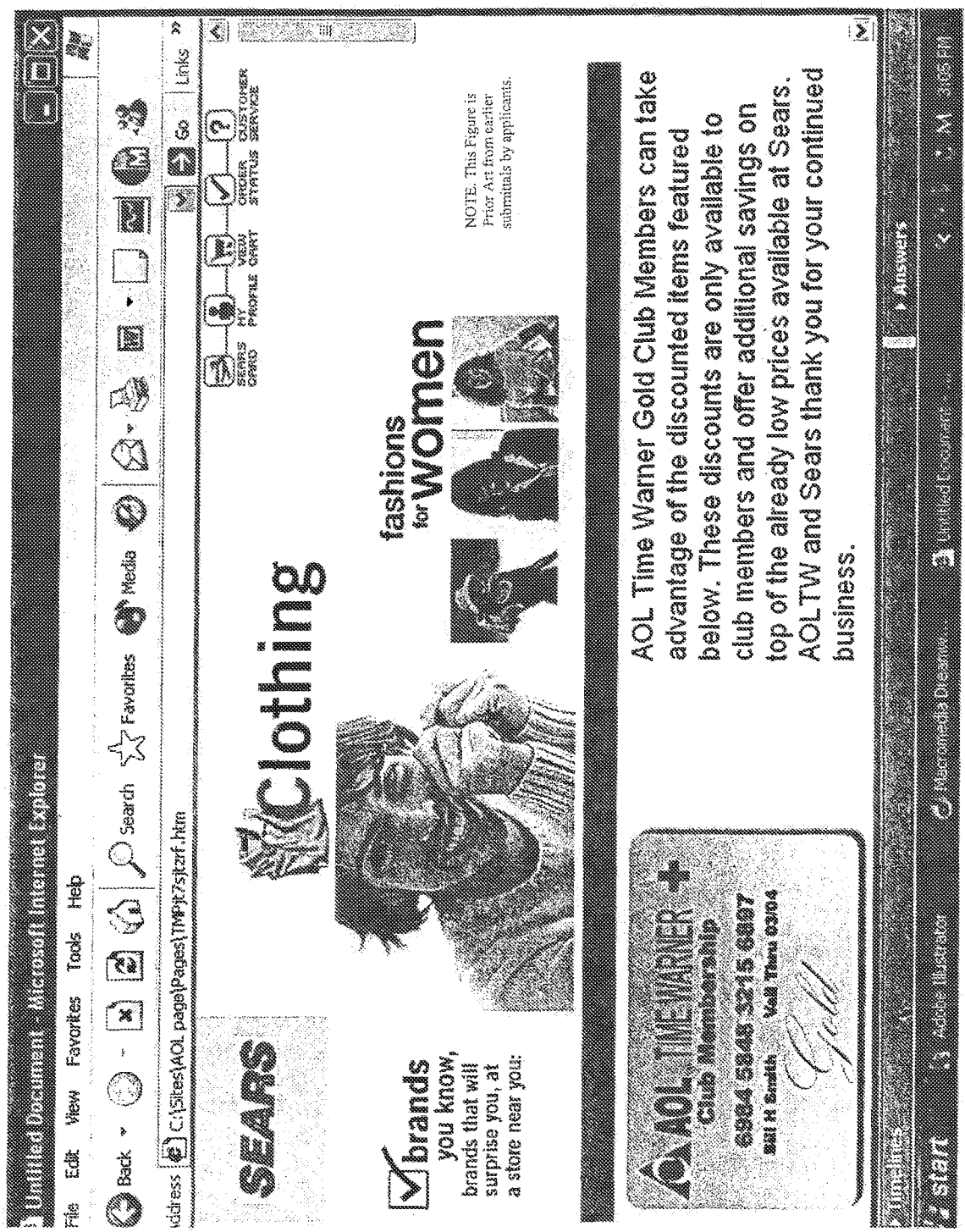
FIG. 23 shows an exemplary (AOLTW/Sears) specific clothing area D & SD Internet site page (P)
Figure 37:
FIG. 37 shows an exemplary advertising page indicating the concept and showing a generic Universal Preferred Customer +Club Membership Card with the slogan "Your Shopping Companion" (P)
Figure 40:
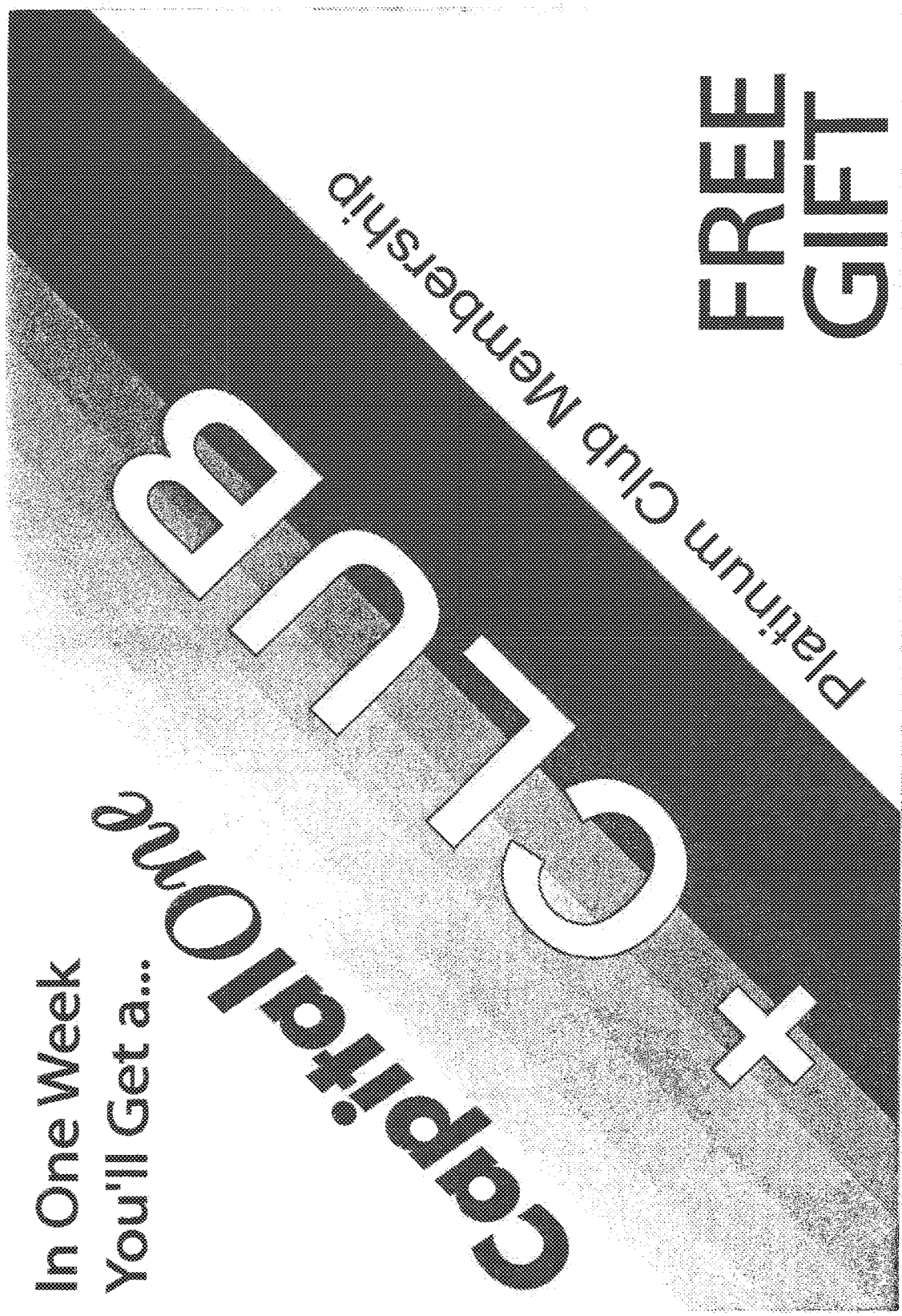
FIG. 40 shows an exemplary advertising mailer announcing the forthcoming free gift of a temporary CapitalOne +Club Platinum Membership (Front) (P)

Under the item or area descriptions one can select individual products or services and "drop-down" boxes where the corporate names will appear for selection purposes (see FIGS. 16 and 21). These individual names can be then "clicked" on to proceed to the individual corporation's ISP/corporation discount or super discount page(s). The discount (e.g., 20% to 55% plus free shipping) and super discount (e.g., over 55% to 90% plus free shipping) pages (see FIGS. 17, 18 and 23) indicate the items or areas of discount. "Clicking" on one selection will bring up the item and item description page (see FIGS. 19 and 24). "Clicking" on the individual item selected will bring up the pricing/percent (%) off of the manufacturer's suggested retail price (MSRP) discount page (see FIGS. 20 and 24).

The member can purchase the item or place any selection in a shopping cart or basket for purchase or later elimination following reviewing other items for purchase. Items or services offered by the vendor, retailers, service providers, etc. can be for example even one-of-a-kind as opposed to having many available, the member can be offered to purchase more than one for an equal or greater discount, combined offers of items or services can also allow for a greater discount opportunity, out-of-stock items can be offered with a reorder time period indicated, similarly waitlist items can be offered also to be available within a time range, etc. To purchase the products and services, the member may pay the amount in full at the time of purchase, use a time payment plan by paying a specified amount per month until the total is reached, pay on a lay-away basis whereas the item or service is sent, picked-up or available when the full purchase price has accumulated, etc.

Members using the Internet could opt to pay using a credit card, check, money order, etc., whereas, members purchasing in a physical retail store location and paying at a register can, in addition to the aforementioned, use cash. Members shopping in participating vendors' stores "automatically" would receive the same discount or super discount that the vendors are offering on the Internet when the member shows and has the ISP club membership card "swiped" at the time of purchase, even if the member was not aware that the item to be purchased had the additional discount available. This offering through the use of the ISP +club membership card truly integrates the virtual world of the Internet with the physical world of the day-to-day reality.

After purchasing or just viewing the possible discount and super discount offers on the Internet site of a participating corporation, the member can go to the home page of the vendor to view other offerings that were available, continue searching through other vendors' sites using the method and system, go back to any previous site visited, go to other sites on the Internet, or log off the Internet.

Depending upon the embodiment, the ISP (and/or non-ISP)+club membership cards can have a variety of characteristics in use, including those which are associated with the level of the card (e.g., Bronze, Silver, Gold & Platinum or one level). This following discussion addresses, in additional detail, exemplary actual physical club membership discount card characteristics and merchant/member steps in operation/use for the above-described method and system with club memberships for discounted buying on the Internet and at store locations. In particular, the following discussion continues in the presentation of certain exemplary individual aspects of the aforementioned method and system with club memberships relative to online/offline integration for the national/international, retail/wholesale, products/services, discounted buying marketplace:

The initial "gifted" or free ISP or non-ISP +club membership discount and super discount card would be Platinum, if multiple levels rather than one level of membership were decided to be offered. Including the option of multiple levels, the club card could either be only a discount card or both a discount as well as a payment card.

The first option (the "two-card approach") is for the +club card to not also serve as a payment card but rather only a discount and loyalty card which can be used with or without other in-store discount cards, which would give additional and separate savings from those available with the +club card. Any item(s) then to be purchased with the discounts deducted by using this club membership card would then be paid for by a variety of methods including credit or debit card (e.g., VISA, Master Card, American Express Card, Discover Card, Japan Credit Bureau, Diners Club International, Debit Cards, etc.), check, money order or cash. FIGS.

26-29 respectively show exemplary methods of payment, exemplary samples of available credit and debit cards, exemplary business to business credit, and an exemplary VISA +Platinum card with or without a merchant discount card and methods of payment.

With the two-card approach, the discount card being separate from any of the aforementioned payment cards, any credit, debt or no cardholder could get a +club card, for credit limitations are not applicable. Since multiple credit or debit cards, checks, money orders or cash can be used for purchases, the discount card can be used universally by the greatest number of purchasers.

The second option (the "one-card approach") is for the +club card to serve as both a discount and a payment card. With the one-card approach there is obviously one less card needed than with using the two-card approach. However, one must then be a credit or debit cardholder to obtain a +club discount card, making credit worthiness and limits applicable. Also, if the credit or debit card with which the +club card is combined is "maxed out" or at its limit, the discount card portion would automatically be void until the credit or debit limitation was rectified. Numerous side-by-side 1-card versus 2-card advantages/disadvantages are shown on two Analysis Sheets using VISA as an example of a possible major organization to issue the +club memberships—VISA +club membership cards (for a VISA example, see FIGS. 32 & 33).

A "magnetic strip" on the back of a card would be used similar to a debit card with a password or "pin" number or without a password like a credit card for verification of the authenticity of the +club card by being "swiped" in a card reader or with "pass" technology at the point of sale or register offline in a physical store location(s) (for a VISA example, see FIG. 31). When making a purchase online, one would enter the card number via keystroke or using "accessory" card reader equipment, again with or without a password or "pin" number. Verification is necessary to prevent unauthorized use of a phony manufactured facsimile card in an attempt to fraudulently avoid paying the required +club membership fees. Also, the magnetic strip identifier allows the card to be voided at the end of a "free" or "paid" time period, as well as when the card is reported by the legitimate cardholder to the +club member issuing corporation or financial institution to be misplaced or stolen. Cardholder purchasing habits can be tracked through the magnetic strip and/or through the bar code as indicated below.

Following authenticity verification using the magnetic strip or "smart" chip, a "bar code" on the back of the card would be "scanned" (just as where in-store merchant discount cards with bar codes are scanned), to activate any discounts available to the purchaser being a +club member. The +club memberships may come in one or more levels (Bronze, Silver, Gold & Platinum). With multiple levels, the bar codes would incorporate different sets for each level. The in-store bar code on the individual in-store discount card would continue to give discounts just as they do now. Then, with multiple levels, the +Bronze Club card would not give the regular in-store discounts but rather discounts other than those available with the individual in-store card. The +Silver Club card would give the discounts available on the +Bronze Club card as well as additional discounts. The +Gold Club card would give the discounts available on the +Bronze Club card and the +Silver Club card as well as additional discounts. And finally, the +Platinum Club card would give discounts available on the +Bronze Club card, the +Silver Club card and the +Gold Club card as well as additional discounts (again, FIG. 31 shows a VISA example). As aforementioned, additional loyalty rewards for the individual cardholders would also be available via tracking, depending upon the purchasing price totals and/or volumes and/or choices.

Prior to this method and system, the need did not exist to have multiple bar coded discount "group" levels read at any individual store locations. While the separate identifying bar codes of the individual products are presently read at the register and any additional discounts for the daily, weekly, etc. in-store special discounted items entered into the store system/back room operations are given to purchasers using the in-store discount card with its bar code. Since the present in-store cards are "free", and since they only work within a particular store, while identifying products along with customer use through the individualized bar codes for that customer, there was absolutely no reason to provide multiple levels of discounting requiring multiple bar coded discount "systems" within any individual store's operations.

The +club card "bar code(s)" will run on the same network as the in-store "bar code" discounts, but access different items and discount amounts. The additional "bar code(s)" (one or one for each level if using multiple level club cards) will be integrated into both the register and the back room operations of the participating stores, using the same existing or similar compatible technology, dramatically simplifying the +club card implementation in both time and cost (again, FIG. 31 shows a VISA example).

The discounts and super discounts offered offline can be or will be the same as those offered by the individual participating merchants online, for those offering both online and offline discounts, as shown on an Internet shopping web site(s), portal(s) or hub(s). This will be the first truly universal online/offline integration concept brought to fruition (see FIG. 34 for an in-store advertising example).

The +club cards can also incorporate the use of "smart" chip card technology to track and store additional data allowing greater flexibility in use, loyalty solution benefits and recording features (although, transferring information from the thousands of in-store discount cards would never happen, not to mention that merchants use their in-store discount cards with their individual names as part of their advertising/marketing programs). This "smart" chip technology will be able to incorporate the transfer of data from the Internet online offerings of participating merchants to their individual offline store's point of sale/register locations in "real time"—potentially being able to replace the bar code requirement when and if desired by the participating merchants. In contrast, other data tracking and loyalty solutions address tracking of purchases with "bulk" transfers once every twenty-four (24) hours (see FIGS. 30, 32 and 33 for a VISA example).

However, "smart" cards require additional development and implementation requirements, which are both timely and costly to member partner financial institutions and to merchants wishing to integrate such technology into existing operations (again, see FIGS. 30, 32 and 33 for the VISA example). The initial and even continued future use of "magnetic strips" and "bar codes" would allow for immediate implementation of the concept to include approximately 60% of the existing merchants which address approximately 90% of the retail/wholesale marketplace. The "smart" technology can be integrated into the concept as it is developed and implemented at each merchant's locations with both required software and hardware considerations.

This concept is the first true Internet online/in-store offline integrated at point of sale (POS) registers in real time, marketing and sales, method and system for the discount purchasing of goods and services. Universal preferred customer club membership cards, "Your Shopping Companion", are issued with club memberships. Examples of non-ISP providers that could be name identified on the club membership cards are major banks and financial associations that issue credit and/or debit cards and/or reward cards and/or gift cards, etc. include, in alphabetical order, American Express, Bank of America (includes Fleet and MBNA), Capital One, Chase (includes Bank One), Citigroup, Discover, HSBC, Providian, Wells Fargo and US Bank as one embodiment of the present invention (See FIG. 35). Also, multi-level (Platinum, Gold, Silver & Bronze)+Club Cards are one additional embodiment of the present invention addressing different areas and valuations of purchasing (See FIG. 36). These card issuing institutions and associations presently have records of consumer information as it relates the issuance of payment cards to their individual customers. This information will allow these organizations to select a strong demographic of proven buyers from their existing credit and debit cardholders to which they issue the initial free temporary club membership cards to satisfy the critical mass requirement of consumers desired by merchants and manufacturers participating in offering discounts to a large enough audience of potential buyers as part of the implementation procedure at start-up to launch the concept. Examples of potential advertising implementation literature can be seen at FIG. 37, FIG. 38, FIG. 39, FIG. 40 and FIG. 41.

The universal preferred customer club membership cards are preferably only discount cards and not also payment cards, actual purchases being made by credit cards, debit cards, reward cards, checks, money orders or cash. There will be no cost to the issuing institutions for the free temporary discount cards or any of the marketing notices, flyers, venture advertising or mailings. The card issuing institutions will receive a percentage of the annual +Club fees generated from payments for the permanent discount cards for the marketing of club discount cards issued under their institution name. Also, these club discount cards provide a dual advertising venue by marketing the names of the issuing institutions along with the +Club memberships. These non-payment +Club cards will also enhance the use of the card issuing institutions payment cards. Additionally, the card issuing institutions' payment cards use can be further enhanced by the institutions offering reward or percentage incentives to use the institution named +Club discount cards with a similarly named institutional payment card.

Figure 42:
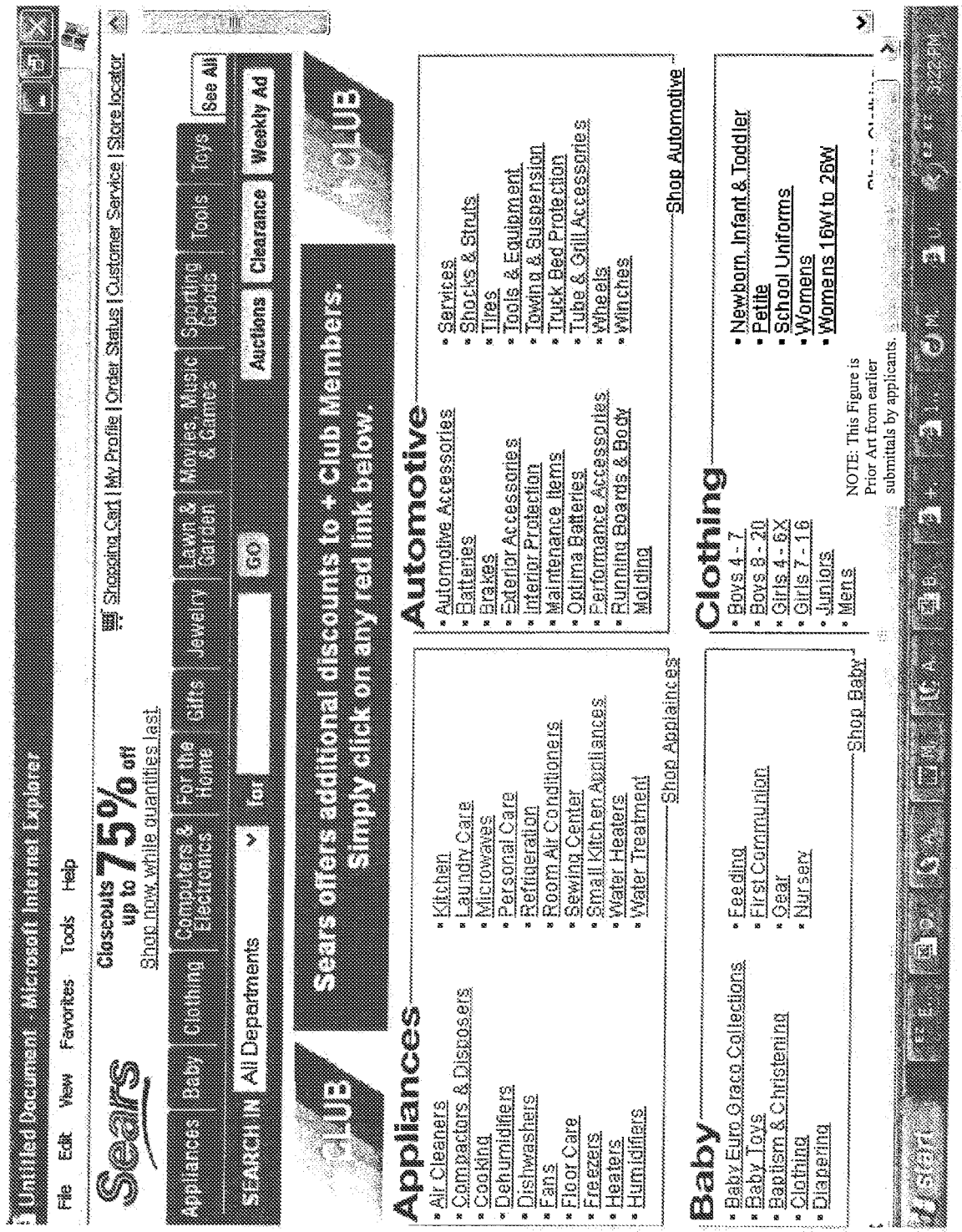
FIG. 42 shows an exemplary +Club banner on a participating merchant's main Internet site (i.e.: Sears) which provides reciprocal advertising as the individual merchant actually advertises +Club memberships by hosting the required Internet link to the merchant's +Club discounts and/or super discounts they are offering to consumers (P).
Figure 43:
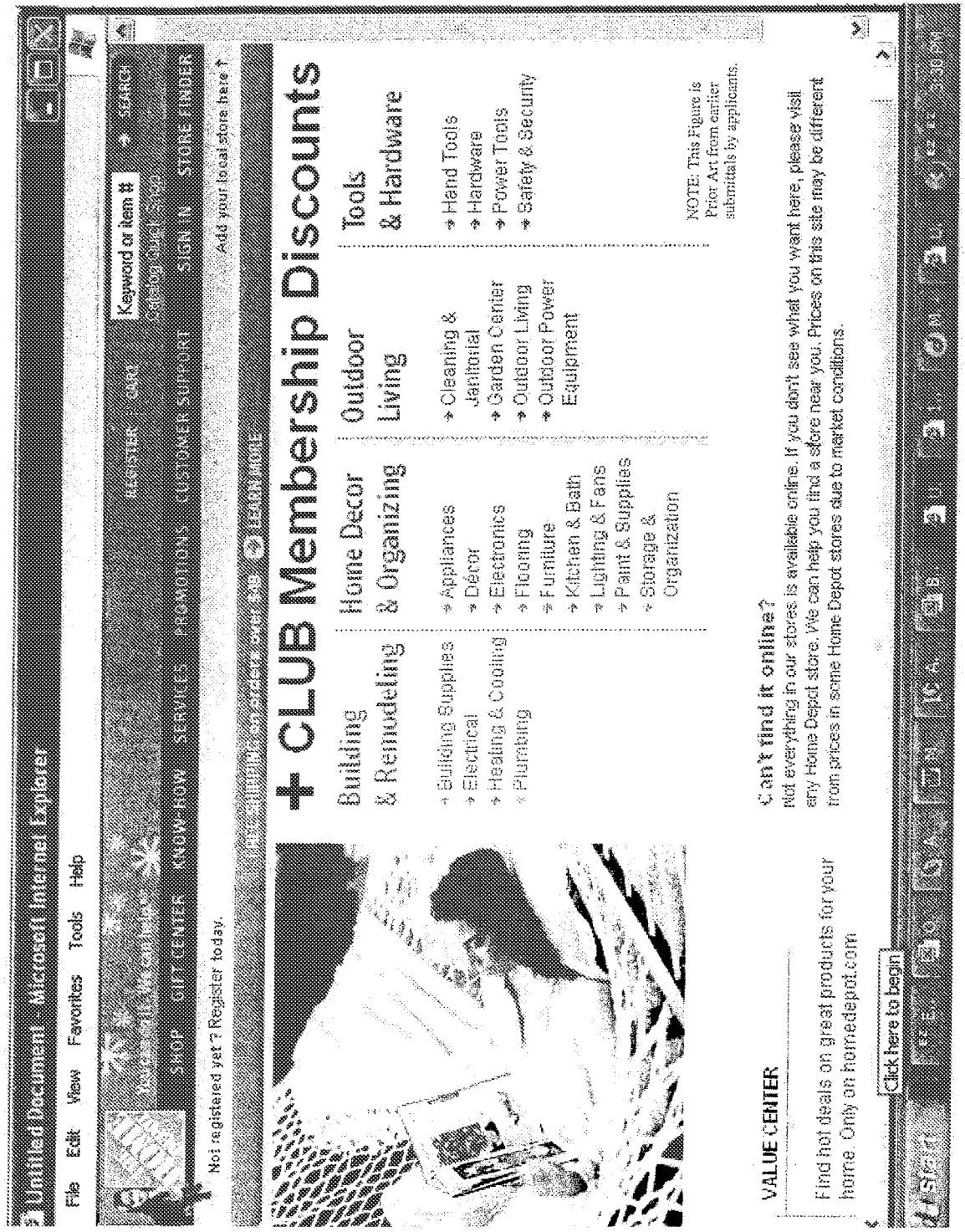
FIG. 43 shows an exemplary +Club Membership Discounts page for a potential participating home improvement retailer (i.e.: The Home Depot) indicating the +Club identification appears throughout an individual merchant's offering Internet pages (P).

The critical mass of venture start-up consumers (i.e.: 100 million present credit card and debit card holders) selected by the aforementioned examples of major card issuing institutions and associations would be sent temporary free fully activated club membership cards simultaneously at venture launch. These universal club membership discount cards will immediately allow these selected consumers to receive special discounts on products and services both online on the Internet and offline in stores at point of sale (POS) registers (i.e.: 5% to 50% off the MSRP) or super discounts (i.e.: 51% to 90% off the MSRP). Following a time period (i.e.: three months) temporary club members can purchase permanent annual memberships and receive permanent discount cards, optionally paid for with a credit or debit card in total or monthly. The magnetic strip identification permitting access to the discounts and bar coded discount system technology will provide the consumer a record of the discount purchases on their register receipts. Smart card technology along with radio frequency identification (RFID) technology or pass technology are other future possible card enhancements. Consumers can shop in stores or order on the Internet and pick-up purchases at actual store locations if in stock or to be shipped to the stores from remote locations if not in stock for pick-up or request that Internet purchases be shipped to them directly Examples of potential major merchant participants, in alphabetical order, include Ace Hardware, Banana Republic, Barnes & Noble, Bed Bath & Beyond, Best Buy, Blockbuster, Bloomingdale's, Borders Group, Circuit City, GAP, The Home Depot, Ikea, JC Penney, Kmart, Kohl's, Linens-n-Things, Lowe's, Macy's, Marshall Field's, Marshalls, Menards, Nordstrom, Office Depot, Office Max, Old Navy, Pottery Barn, Radio Shack, Sears, Staples, Target, TJ Maxx, Toys "R" Us, Walgreens, Wal*Mart, and Williams Sonoma. With merchants hosting +Club banner links on their main Internet sites to allow consumers to view their +Club discounts and/or super discounts area on the main +Club Internet site, a reciprocal advertising venue is created actually advertising +Club memberships (See FIG. 42 & FIG. 43).

This vast multi-channel online/offline approach to marketing and selling will generate substantial additional revenue for merchants and manufacturers as never before, multiplying consumer spending while driving in-store growth at brick-and-mortar locations. Approximately 96% of shopping takes place in the real or physical world in store locations; whereas, approximately 4% of shopping occurs in the virtual world on the Internet. Once in the actual store locations to make a planned expenditure, according to statistical research, up to 60% of the total final purchases by consumers will consist of items other than those originally sought. Marketing to the enormous demographic of proven shoppers via the huge Internet site for no fees will be a unique opportunity for both merchants and manufacturers. Unlike typical ad revenue driven Internet providers (i.e.: Google, Yahoo, MSN, AOL, etc.), with the annual membership fee driven club venture, on the +Club Internet portal site there will be no logo or name listing charges, no advertising charges, no product or service offerings charges, no per click charges, no percentage of final sale charges and no site management or operational charges. All base software, the integration and its installation into the individual merchant's host systems of the fully electronic system at their point of sale (POS) registers will also be free to those merchants participating in the initial venture launch along with an allowance to assist in developing their individual site pages to appear on the main site. A manual coupon system for in-store discounting at their registers is an option to the fully automated electronic system for merchants desiring same in a manner similar to services as provided by organizations like E-centives.

Loyalty Software Specialists (i.e.: Catuity Incorporated, etc.) offering membership and reward card programs with their relationships with POS terminal manufactures, ECR manufactures, store system suppliers, card associations, integrators, card suppliers and manufacturers, etc. will participate in base software development and integration of online/offline data transfer in real time to point of sale (POS) registers of the individual and/or multiple host systems of the participating merchants.

Corporations offering enterprise software and IT services providing integrated solutions and business consulting services (i.e.: IBM, EDS, Compuware, etc.) are some of the other participants in the venture implementation process addressing the enormous base software integration requirements into the numerous merchants' host systems at the multitude of store locations.

Major merchant check-out cash register and equipment manufacturers (i.e: IBM (with a 60% dominant market share of the top 100 retailers worldwide), NCR, NCI, Dell, HP, etc.) with both their strong relationships with merchants and manufacturers and presence at the point of sale (POS) with in-store sales can enhance their existing relationships by offering the individual merchants free participation in the +Club offering while providing the needed assurance to the merchants of the overall base software integration process within the closely guarded secure individual and/or multiple host systems of these merchants already using their equipment while gaining financially through their own participation.

ISP or Internet Search Engine providers (i.e.: Google, Yahoo, MSN, AskJeeves, AOL, etc.) with their relationships with merchants and manufacturers via advertising, marketing and sales to their individual audiences of consumers also can enhance these relationships with both merchants and manufacturers by offering free participation with +Club to their individual corporate clients while gaining financially through their own participation.

Internet shopping site operators and management services addressing online marketing and loyalty programs directed to financial and retail companies (i.e.: Trilegiant Corporation (Cendant), IAC, etc.) with their relationships with merchants and manufacturers and Internet sales and marketing offerings provide online shopping fundamentals experience.

Major call center operations within the United States and/or in other countries will address the enormous customer relations requirements associated with such a large membership base and the necessary amalgamation of participating corporations.

Figure 44:
FIG. 44 shows an exemplary graphic sphere signifying an initial optimal critical mass of one hundred million (100,000,000) proven buying consumers (not just Internet users, viewers, social networkers or garners) as a proposed initial number of members for a club to be the marketing and advertising targets by retailers and manufacturers using the method and system.
Figure 46:
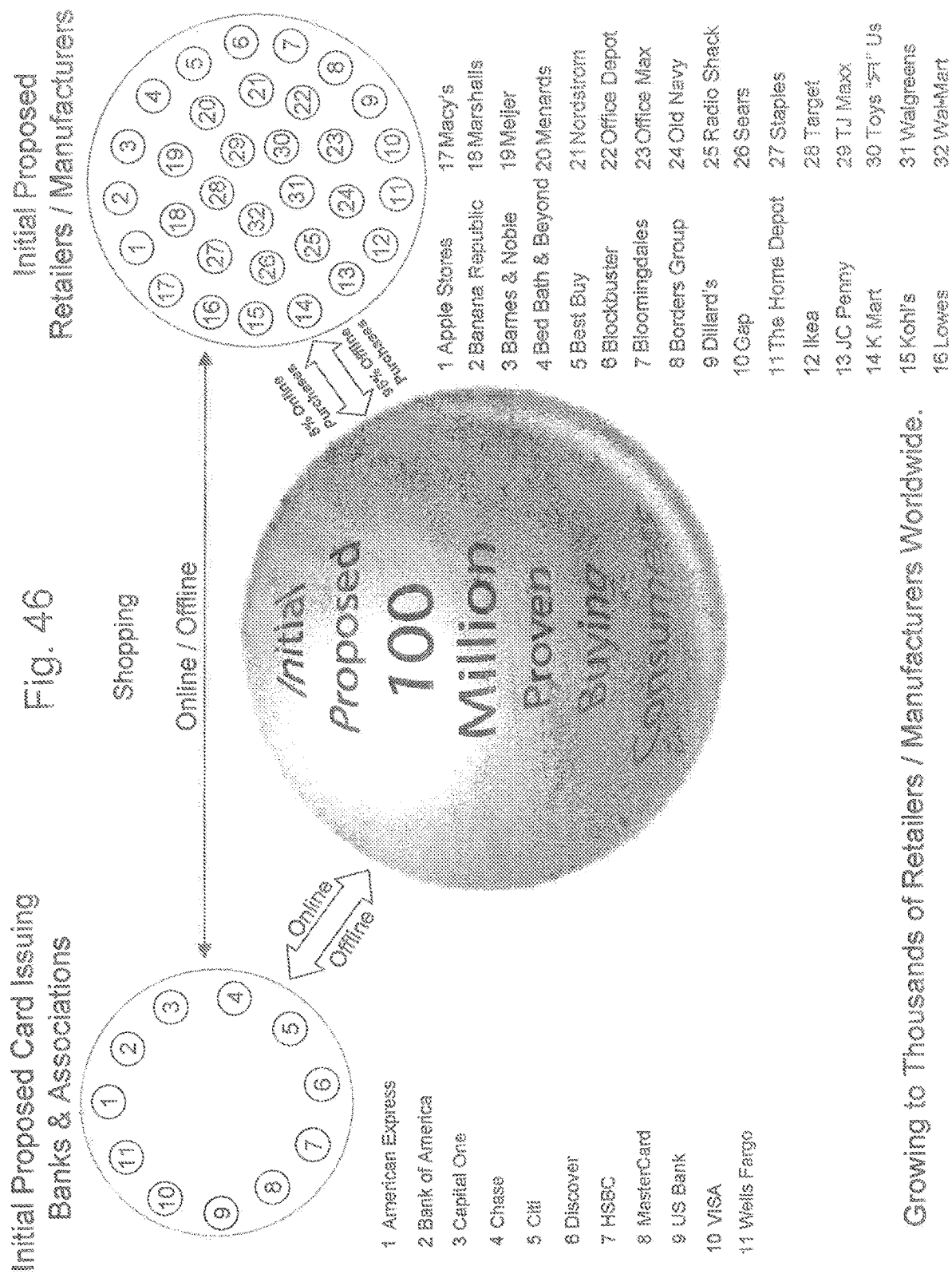
FIG. 46 augments the exemplary graphic in FIG. 45 by showing an initial possible thirty-two (32) retailers as the proposed providers of the specially selected discounted products and services for purchase using the method and system by the one hundred million club member buyers on the Internet and in the retailers' physical store locations along with the retailers online and offline relationships with both the consumers and the financial institutions.
Figure 47:
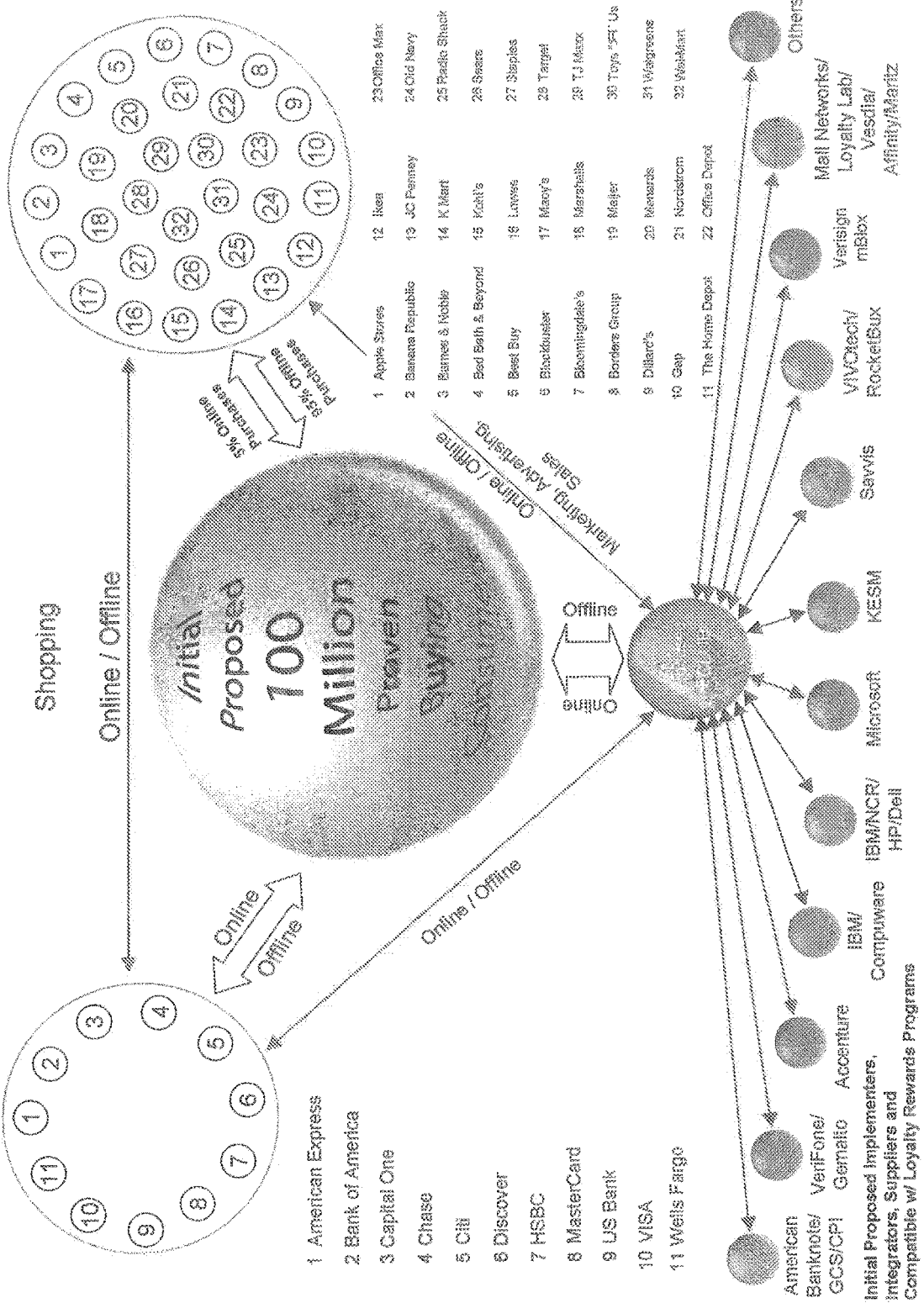
FIG. 47 augments the exemplary graphic in FIG. 46 by showing a smaller sphere as the initial proposed club organization and an initial possible twenty-three (23) plus other entities as the proposed method and system developers, integrators, implementers and suppliers along with the online and offline relationships between the club and these vendors, the consumers, the merchants and the financial institutions.

The concept incorporates an amalgamation of corporate entities to develop, integrate, implement and service the method and system for participating retailers and manufacturers to offer discounts and super discounts on goods and services, both online and offline, to a proposed large initial number (e.g. 100,000,000) of club members—a targeted audience of proven buying consumers (symbolically indicated by a sphere) not just Internet users, viewers, social networkers or garners (See FIG. 44). Eleven (11) possible major card issuing financial institutions (e.g. seven (7) banks and four (4) associations) are proposed to provide the names of these initial consumers by selecting them from their individual lists of valued credit and debit cardholders. These card issuers will be rewarded in areas relative to marketing their brand names, expanded the use of their credit and debit cards and receive percentages of the club membership fees for concept marketing services to their respective cardholders who become paying club members (See FIG. 45). An initial group of major participating merchants (retailers) and manufacturers (e.g. thirty-two) will provide the special selected discounted and super discounted goods and services for purchase by the proposed club members, both online and offline. These retailers and manufacturers will receive access to the large group of proven buying club members via a free marketing, advertising and sales portal (See FIG. 46). The proposed club organization, symbolically indicated by a smaller sphere along with implementers, integrators, Internet search engine, suppliers and vendors (e.g. twenty-three) will support the club method and system which uniquely combines the offerings of each of the above participating organizations for the club members (See FIG. 47). The club goal is to offer, all from one site, special selected discounts on products and services by many thousands of retailers and manufacturers both online and offline in store locations worldwide. There will be no longer be the need for consumers to begin a product or service search by attempting to individually look through the offerings of a few of the thousands of separate retailer or manufacturer Internet sites or through a few of the hundreds of shopping or discount shopping Internet sites to direct their shopping scenarios.

Figure 48:
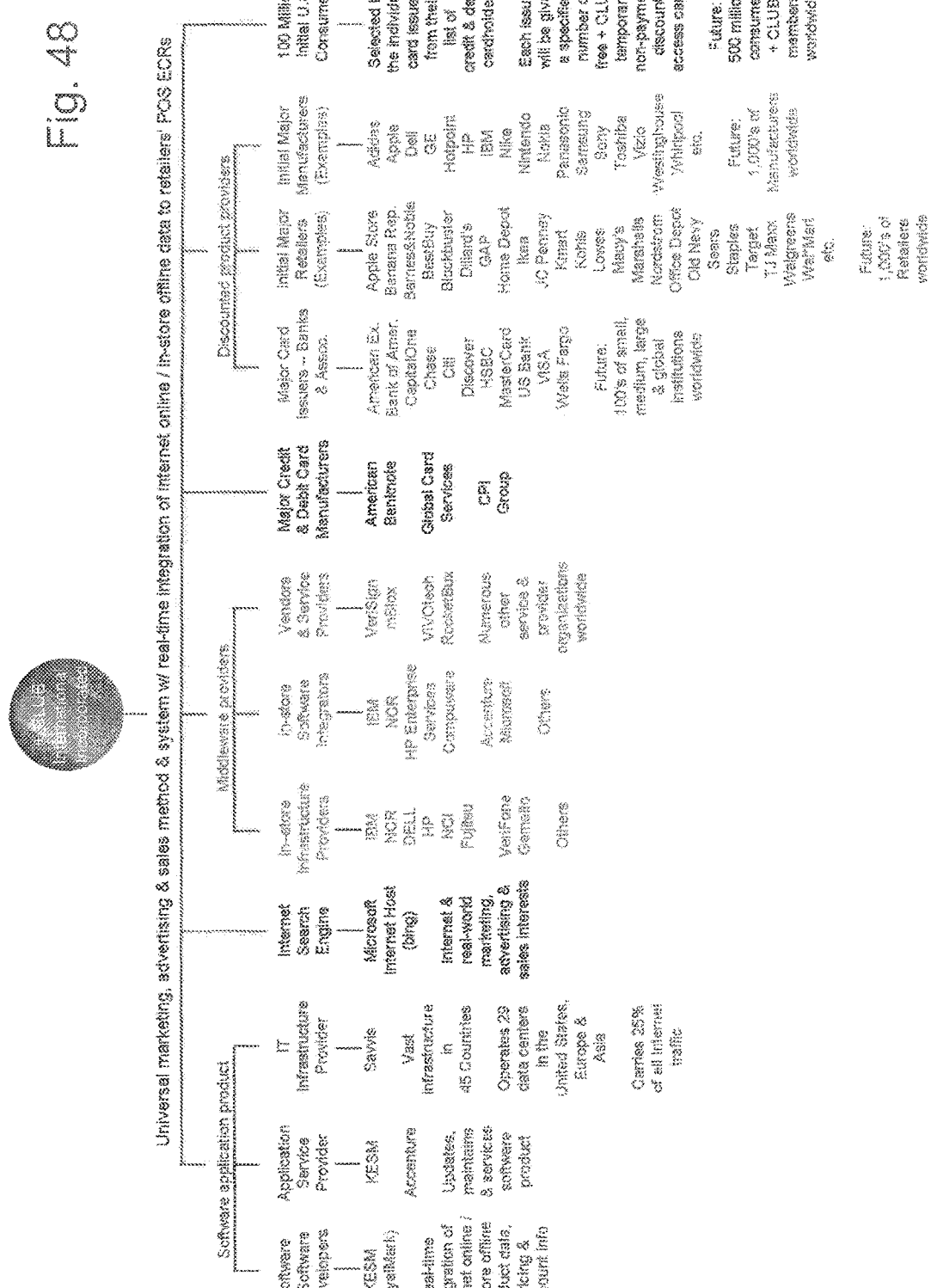
FIG. 48 shows an exemplary chart of participating entities involved in various aspects of providing the club membership, universal marketing, advertising and sales method and system including the software application product providers (software and software developers, the application service provider and the IT infrastructure provider), the Internet search engine provider, the middleware providers (in-store infrastructure providers, in-store software providers and vendors and service providers), the major credit and debit card manufacturers, the discounted product providers (major card issuing banks and associations, major merchants and manufacturers) and consumers.

An organizational chart of participating entities involved in various aspects of providing the club membership, universal marketing, advertising and sales method and system including the software application product providers (software and software developers, the application service provider and the IT infrastructure provider), the Internet search engine provider, the middleware providers (in-store infrastructure providers, in-store software providers and vendors and service providers), the major credit and debit card manufacturers, the discounted product providers (major card issuing banks and associations, major merchants and manufacturers) and consumers (See FIG. 48) shows the categories of responsibility of the various participating corporations.

Figure 49:
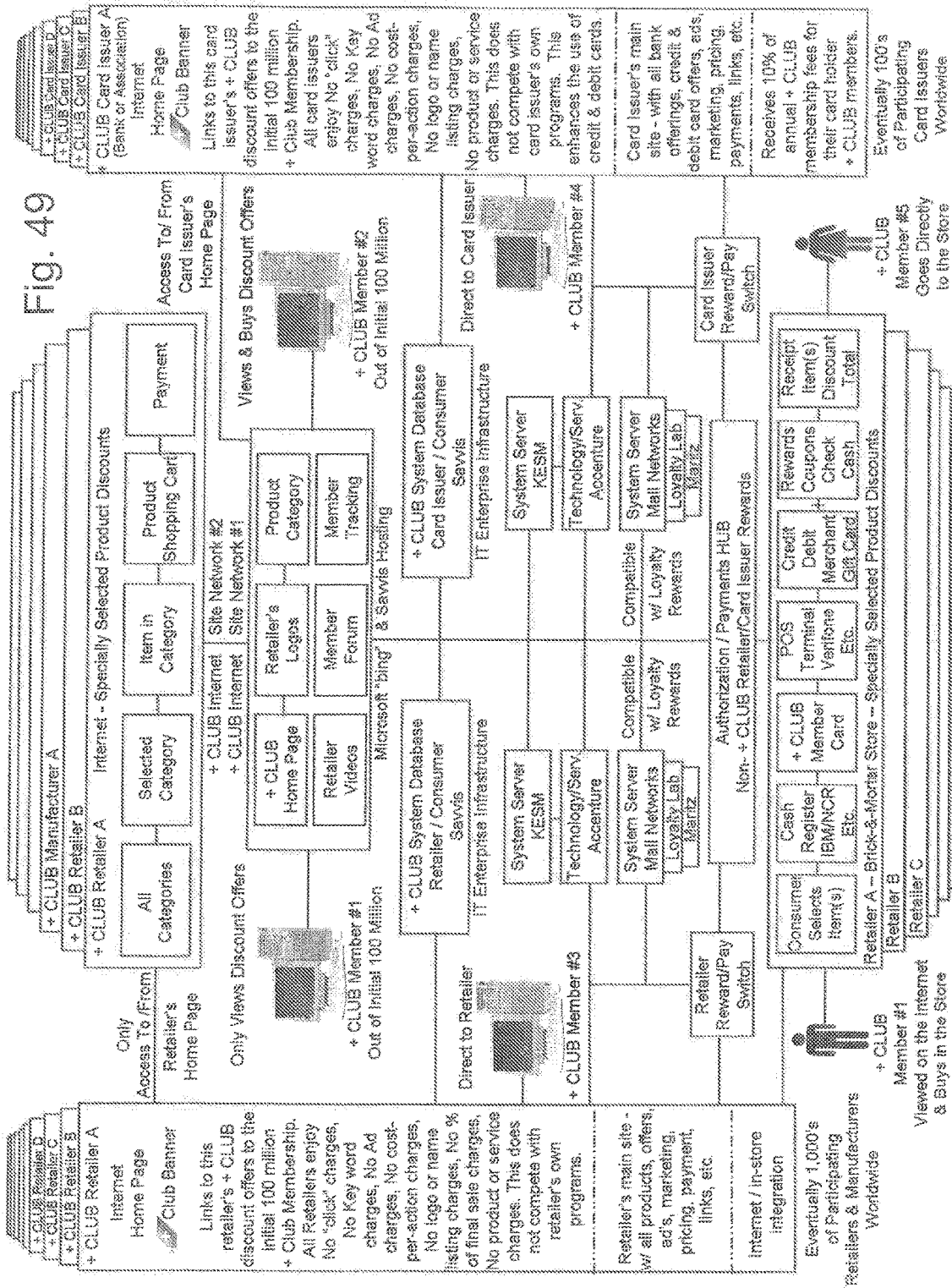
FIG. 49 shows an exemplary club participants, components and transactions inter-relational overview graphic including the roles of participating retailers, card issuing banks and associations, service providers, and consumers addressing product viewing through actual product purchase scenarios operationally in both physical store locations and on the club member Internet web site.

A participant, component and transactional overview graphic including the roles of retailers, card issuing banks and associations, service providers, and consumers addressing product viewing through actual purchase scenarios operationally in both physical store locations and on the club member Internet web site (See FIG. 49) shows the operational interrelationships between the various corporations and the club members along with actual steps to purchase the discounted product offers, both online and offline.

Non-payment, bank name branded club membership cards offer unique marketing opportunities for card issuing financial institutions (banks and associations) along with the enhanced use of these card issuers' credit and debit cards (See FIG. 50). Shown are three (3) non-payment discount access, bank name branded (e.g. Chase, Bank of America and Citi) universal preferred customer, platinum club membership cards to be used by club members when purchasing goods and services on the Internet online and in stores offline, on the phone or using catalogs along with benefits accrued for the card issuing financial institutions' participation in the method and system—all club cards optionally marketed as "Your Shopping Companion".

There can be many possible club card designs. Shown is an alternate exemplary club membership card front-face design (See FIG. 51) as compared to card fronts shown in the prior submitted FIG. 31, both figures also showing an exemplary club card plus bronze, silver, gold and platinum magnet strip and barcode cards along with statements of card discounts—bronze for bronze discounts; silver for bronze and silver discounts; gold for bronze, silver and gold discounts; and platinum for bronze, silver, gold and platinum discounts.

Figure 52:
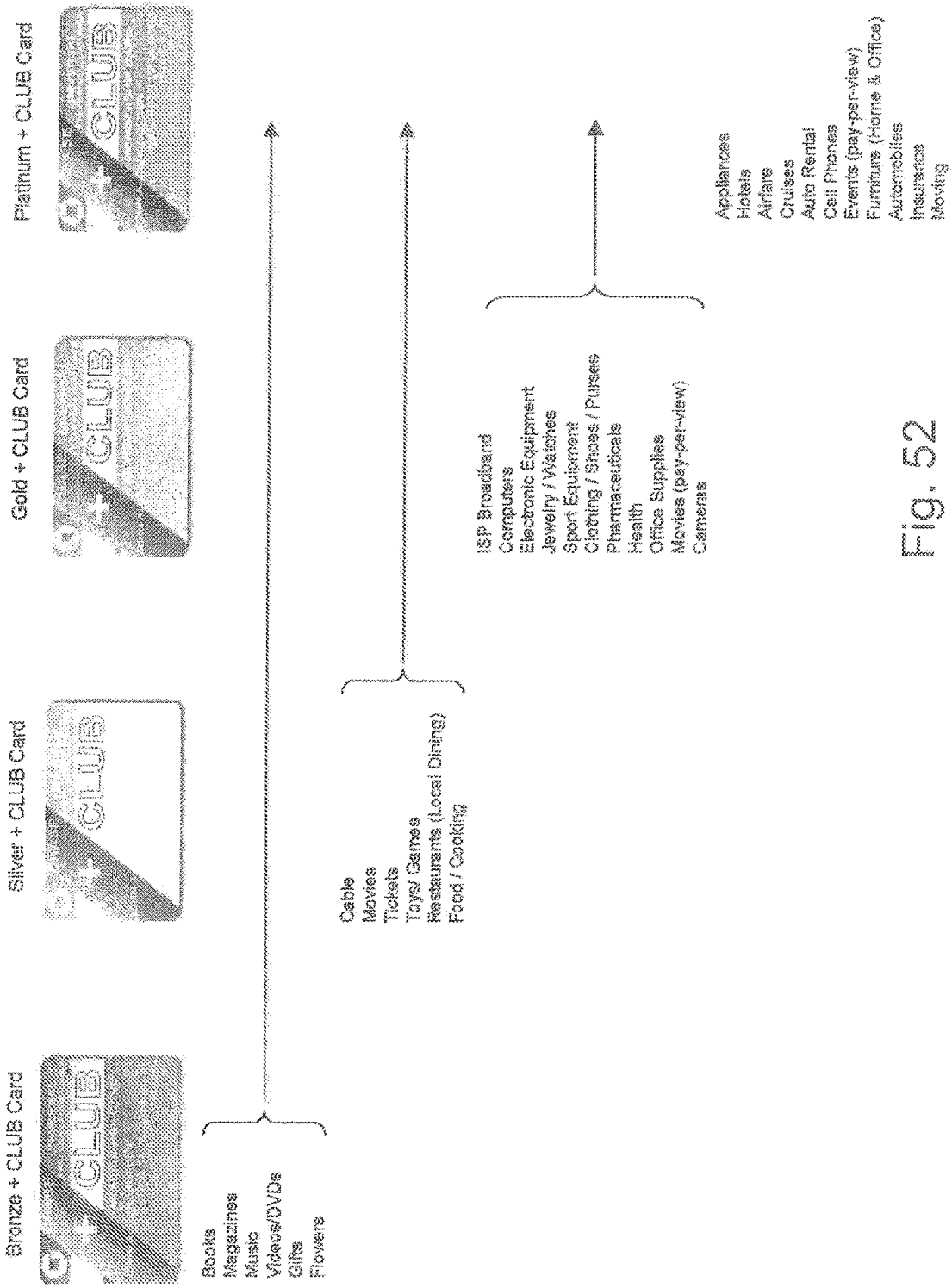
FIG. 52 shows exemplary alternate retail categories indicating potential products or services proposed to be offered with discounted and super discounted pricing under each of the four (4) club card types (e.g. Bronze, Silver, Gold and Platinum) as compared to that shown in the prior submitted FIG. 2, FIG. 3, FIG. 14 and FIG. 15.

Retail categories indicating potential products or services proposed to be offered with discounted and super discounted pricing to club members under each of the four (4) club card types (e.g. Bronze—Books, magazines, music, videos/DVDs, Gifts and flowers), (e.g. Silver—Bronze offerings plus cable, movies, tickets, toys/games, restaurants and food/cooking), (e.g. Gold—Bronze and Silver offerings plus ISP broadband, computers, electronic equipment, jewelry/watches, sport equipment, clothing/shoes/purses, pharmaceuticals, health, office supplies, movies (pay-per-view) and cameras) and (e.g. Platinum—Bronze, Silver and Gold offerings plus appliances, hotels, airfare, cruises, auto rental, cell phones, events (pay-per-view), furniture (home and office), automobiles, insurance and moving) (See FIG. 52) similar to those shown in the prior submitted FIG. 2, FIG. 3, FIG. 14 and FIG. 15.

Figure 51:
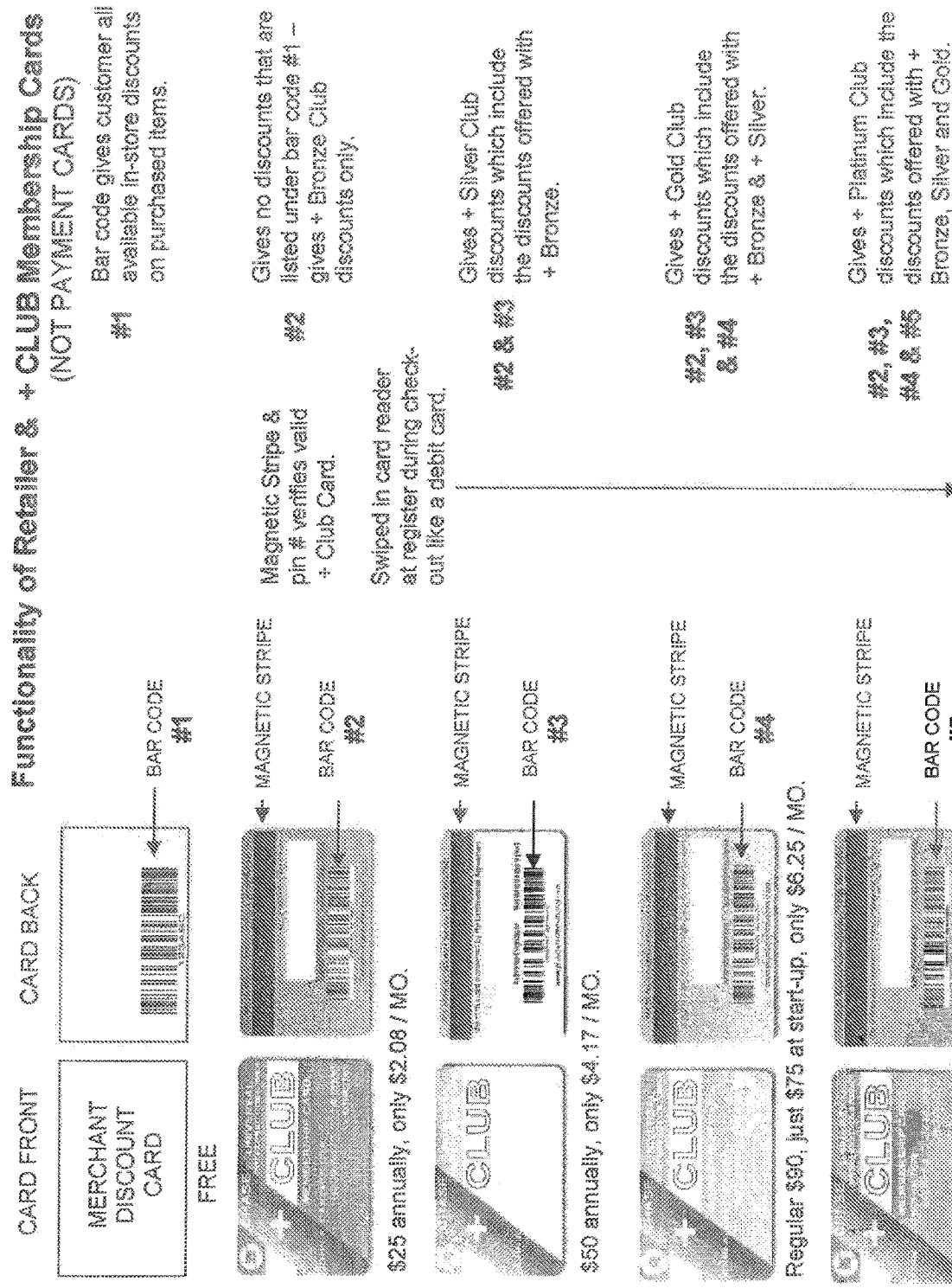
FIG. 51 shows an alternate exemplary club membership card front-face design as compared to those shown in the prior submitted FIG. 31, which also shows exemplary club cards including bronze, silver, gold and platinum magnetic strip with barcode cards (P)
Figure 53:
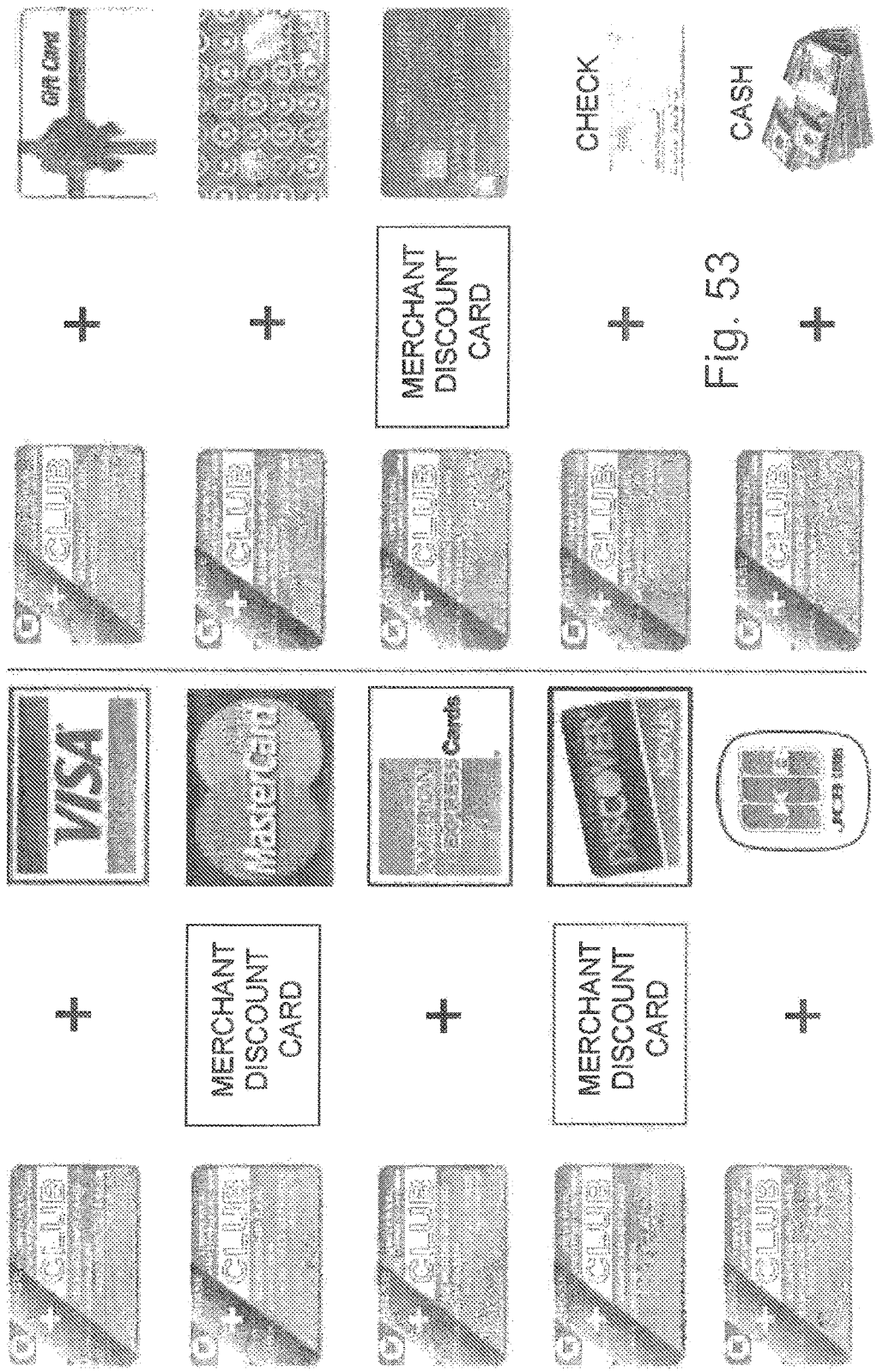
FIG. 53 shows an alternate exemplary club membership card front-face design as compared to that shown in the prior submitted FIG. 29, which also shows exemplary club membership cards used with credit cards, debit cards, discount cards and other payment types (P)—as the club cards are typically non-payment instruments with credit cards, debit cards, merchant cards, gift cards, checks, money orders or cash being the actual payment instruments.

As indicated in FIG. 51, there are many possible club card designs. FIG. 53 shows an alternate exemplary club membership card front-face design as compared to card fronts shown in the prior submitted FIG. 29, both figures also showing exemplary club membership cards used with credit cards, debit cards, discount cards and other payment types (P)—as the club cards are typically non-payment instruments with the credit cards, debit cards, merchant cards, gift cards, checks, money orders or cash being the actual payment instruments.

The additional branding and marketing opportunity for the host Internet search engine provider (e.g. Yahoo!) provided by the club membership cards, separate from that of either the club or the card issuing institutions, can be realized through both color representation like a purple band on the card face and the hosts name and/or logo on the card back (See FIG. 54).

The credit and/or debit card issuer loyalty reward programs typically offer bonus points on qualifying purchases redeemable with selected merchandise, by check or gift card or the earning of 1% cash back on all purchases or 2% rebate on eligible gas, travel and dining purchases the benefits accruing to the holders account up to eight weeks after original purchase; whereas, the club can offer substantially greater benefits of from 5% to 90% off manufacturers suggested retail prices, immediately at the time of purchase, on products and services as specially selected by participating merchants and manufacturers, as would be available to club members using the one universal preferred customer club discount access, non-payment card approach (See FIG. 55).

Figure 56:
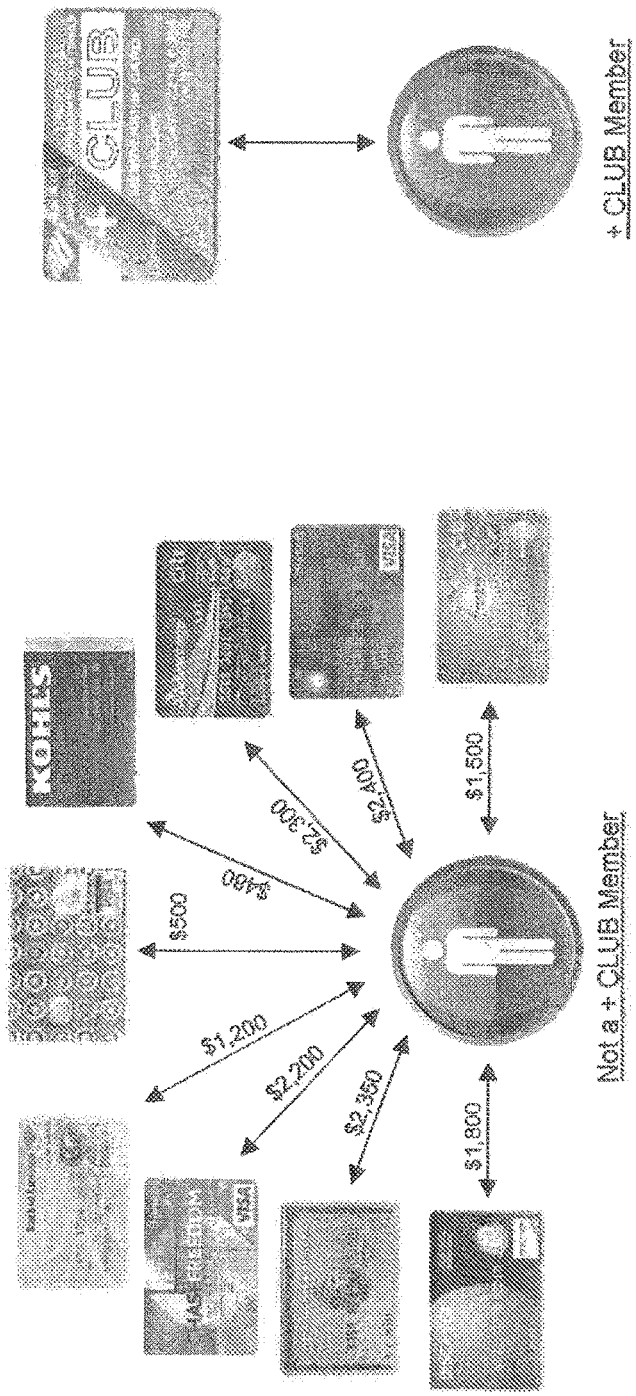
FIG. 56 shows exemplary bank loyalty reward card programs' benefits dilution due to cardholders using multiple cards for purchases as opposed to selecting just one payment card, for benefits accumulate separately on each card, not collectively between payment cards. Also, shown is a general club membership non-payment card advantage statement with the payment for purchases being made by credit card, debit card, merchant card, reward card, gift card, check, money order or cash.

The accumulation of loyalty/rewards with typically offered programs by credit and/or debit card issuers, including banks, associations and merchants, using issuer paid, merchant paid or a combination of issuer and merchant paid points or cash back approaches as compared with the universal non-payment club approach shows that due to a variety of payment cards available, the card holder is penalized if using more than one card to obtain maximum reward benefits. Each separate card accounts for any reward point or cash back separate from any other and the totals are separate and applied to each card individually, not collectively between cards, for any respective card paid purchases. Whereas, the club card can work universally with all participating merchants and in conjunction with all payment types, including credit cards, debit cards, reward cards, gift cards, checks, money orders or cash, letting the holder to accumulate combined totals in the multiple venues along with rewarding and documenting loyalty immediately at the time of each purchase, not weeks or months later requiring diligent holder follow-up to assure that the savings have been credited to each respective account (See FIG. 56).

Figure 57:
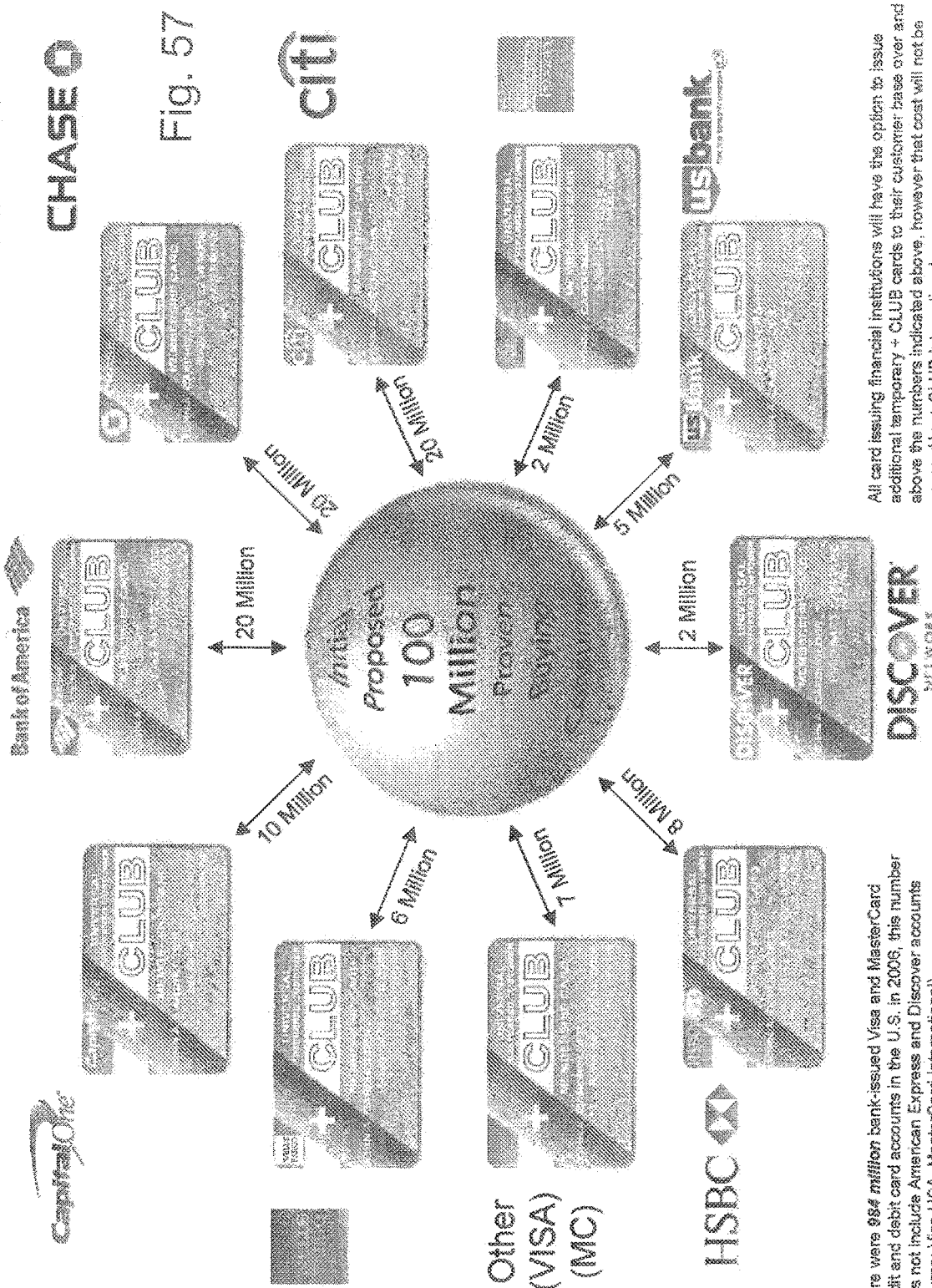
FIG. 57 shows an exemplary of universal platinum club membership cards issuer name branded by eleven (11) card separate issuing financial institutions (e.g. Listed alphabetically: American Express, Bank of America, CapitalOne, Chase, Citi, Discover, HSBC, MasterCard. US Bank, Visa, and Wells Fargo) along with a proposed number of free temporary club membership cards determined to be issued, optimally at the club's expense, by each bank or association out of the initial proposed one hundred million temporary club cards at method and system launch, based upon the issuing institutions' individual market shares of the total issued and presently active credit card and debit card accounts.

Free temporary universal platinum club membership cards name branded by eleven (11) card separate issuing financial institutions (e.g. Listed alphabetically: American Express, Bank of America, CapitalOne, Chase, Citi, Discover, HSBC, MasterCard, US Bank, Visa, and Wells Fargo) along with the proposed number of these club membership cards, determined by the club, to be issued by each bank or association out of the initial proposed one hundred million temporary club cards at method and system launch can be based upon the issuing institutions' individual market shares of the total issued and presently active credit card and debit card accounts (See FIG. 57). Individual card issuers can opt to issue more of their own name branded club cards that their individual allotted number, but at their own expense.

A sequential text diagram compares Internet online and in-store offline shopping scenarios for both club members and non-club members from product viewing to product purchasing (See FIG. 58). Retailers and manufacturers will be able to market and sell to the large club membership for "free" on the club Internet web site shopping portal, offering special selected discounts on both products and services. These offerings will be viewed online and then purchased either online or in physical store locations. Driving consumers into their brick and mortar locations to buy is the preferred desire of retailers.

In-store club member consumer's register receipts will show products, the club membership discounts and the total savings or products, the club membership discounts along with both additional separate retailer and card issuer discounts applied and the total savings on the purchase—as product, price and discount data relative to the participating retailers' offerings, shown on the club Internet site, are electronically transferred in real-time to the point-of-sale (POS) electronic sash registers (ECR's) of the individual retailers (See FIG. 59).

The club monthly activity and savings summary report shown indicates an individual member's product or service purchases by date, merchant and manufacturer, products, retail price, club price, percent saved, amount saved and dates of purchase for all purchases along with daily, monthly and yearly totals of retail prices, club prices and club discount savings to date, which can then be compared to the annual club membership fee to understand the actual net savings received up to that point in time. Members can also perform other club actions from this page like reviewing/updating their individual club profile, shop all departments, return to the club shopping home page, submit a merchant/manufacturer/product/service rating report, enter a message on the club social network message board forum, view/rate online advertising videos, enter a search request, ask a question, etc. (See FIG. 60).

Along with advertising videos, club members will be able to rate and make comments relative to individual merchants, manufacturers, products and services (See FIG. 61). This advertising related social networking aspect in conjunction with the professional and amateur advertising video submitting, rating and commenting social networking approach are at the core of the club merchant and manufacturer directed marketing, advertising and sales concept. The results of these ratings, both good and poor, by club members will be shared with the respective retailer or manufacturer, so they can understand how their buying consumers view their individual offerings and will allow the retailers and manufacturers to improve any deficiencies and retain good practice to help hold existing customers and to garner new ones. This is in direct contrast with the typical present social networking site offerings which are based on the adjunct incorporation of advertising within, by definition, personal communication/sharing, ad disassociated business models, thereby having to be tentative, even fearing to alienate their members with a too aggressive or disruptive ad approach while convincing merchants and manufacturers that the return on their offerings in such an environment is worth the cost of participation. Whereas, the entire foundation of the club is an online/offline method and system, marketing, advertising and sales venue is intended to be "free" to participating merchants and manufacturers who will provide information, financial and socially interactive benefits to paying club consumer members—a huge demographic of proven buyers not just a large diverse group of people interested in communicating and sharing specific personal information with their friends and associates, their intended participation, by definition, being unrelated to making product and service purchases of any kind. Due to the intention of club being an annual membership fee driven revenue approach instead of being an advertising fee driven revenue approach as with the other present offerings, with the possible exceptions for unique or special advertising venues, merchants and manufacturers participating on the club Internet web site shopping portal will be assessed no logo or name listing charges, no advertising charges, no product or service offerings charges, no per "click" charges, no cost-per-action charges, no percentage of final sales charges and no site management or operational charges. This also is diametrically opposite to the present conventional wisdom approach of today.

Figure 62:
FIG. 62 shows an exemplary club member shopping discussion forum. This is an important social networking aspect in a spread sheet format allowing for club members to truly interact with each other in an open comment, response, rating venue, addressing all areas of their shopping experiences (e.g. retailers, manufacturers, brands, products, advertising (text and videos), services, discounts, upcoming/prior sale events, club activities, etc.)

The club member social networking forum for general club member discussion will allow for individual member comments, recommendation and general communication on a wide variety of subjects including these relative to buying and selling such as products, brands, services, videos, ads, discounts, manufacturers, retailers and the club itself, plus upcoming/prior sale events, club activities along with the ratings, posting times and dates, number of replies and number of views, all placed for other members response and/or information (See FIG. 62). This is an important social networking aspect in a spread sheet format allowing for club members to truly interact with each other in an open comment, response, rating venue, addressing all areas of their shopping experience.

Logos of some proposed participating retailers are shown along with a listing of some of the proposed free Internet advertising and marketing benefits accruable to retailers and manufacturers participating in the club method and system including no logo or name listing charges, no advertising charges, no key word charges, no product or service offerings charges, no per "click" charges, no cost-per-action charges, no percentage of final sales charges and no site management or operational charges (See FIG. 63).

Figure 65:
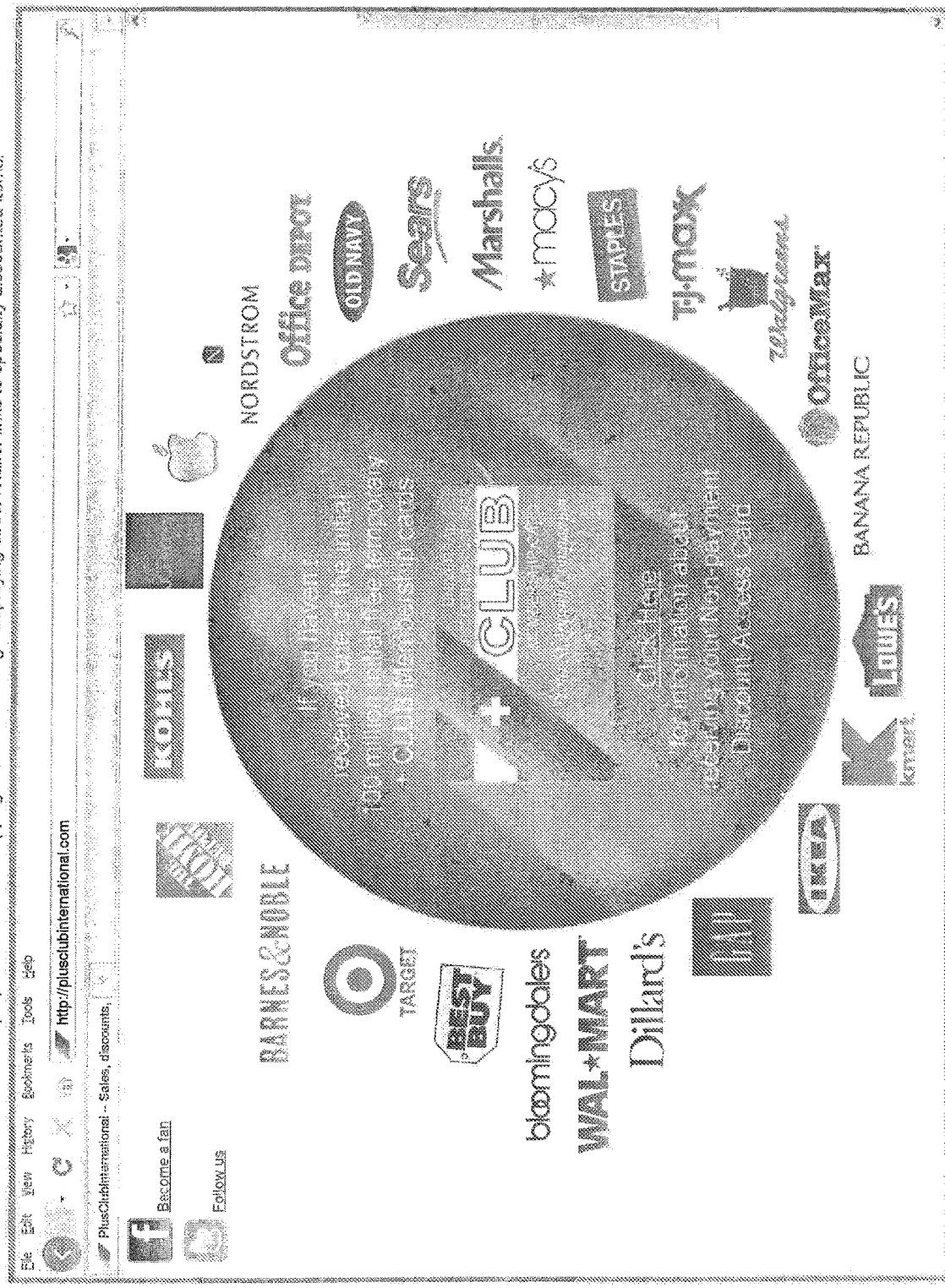
FIG. 65 continuing down from the home page indicated in FIG. 64 shows an alternate exemplary club specially selected corporate retailers' and manufacturers' logos for exemplary product and service discount offerings participation, rewarded with positioning around a club sphere on this page w/full Internet screen as compared to that shown in the prior submitted FIG. 13, which shows an exemplary (AOLTW) D & SD corporate logos page w/full Internet screen (P)

The club Internet web site shopping portal Home Page is shown with club member information, coveted advertiser presentation locations, and club member number/password sign-in format card allowing the members to receive the merchant and manufacturer discounts and super discounts, along with optionally offering an additional incentive to signing in, for that by doing so would automatically, once per day, generate individual member entries for monthly drawings to award member prizes. All shopping departments are indexed at the left margin to allow for ease in immediately accessing the specific areas of interest for the club members. Specially rewarded merchants selected by the club for being among the best in discount offerings participation (e.g. J C Penney and Kohl's) are given prime club home page advertising video placement. One can "click" on these videos for viewing, one can "click" to see this merchant's additional ad videos and one can "click" to see a club page listing all of the present participating merchants' and manufacturers' ad videos. This start page also continues down to additional club selected merchants' and manufacturers' names/logos (See FIG. 65), which when "clicked" on link to the club's individual participating merchant's and manufacturer's special discount and super discount pages along with other product and service discounting information seen in full. This video ad method and system, marketing and advertising platform presents a unique social networking aspect directed to a proven demographic of buyers both club members and non-club members interested in products and services offered by merchants and manufacturers. This alternative can be compared to that shown in the prior submitted FIG. 10, which shows an exemplary (AOL.com) Internet home page with a club member number/password sign-in (P) and to the shopping department indexing as compared to that shown in prior FIG. 14 and FIG. 15.

Figure 13:
FIG. 13 shows an exemplary (AOLTW) D & SD corporate logos page w/full internet screen (P)
Figure 18:
FIG. 18 shows an exemplary (AOLTW/Sears) general all areas D & SD Internet site (2nd Page) (P)
Figure 64:
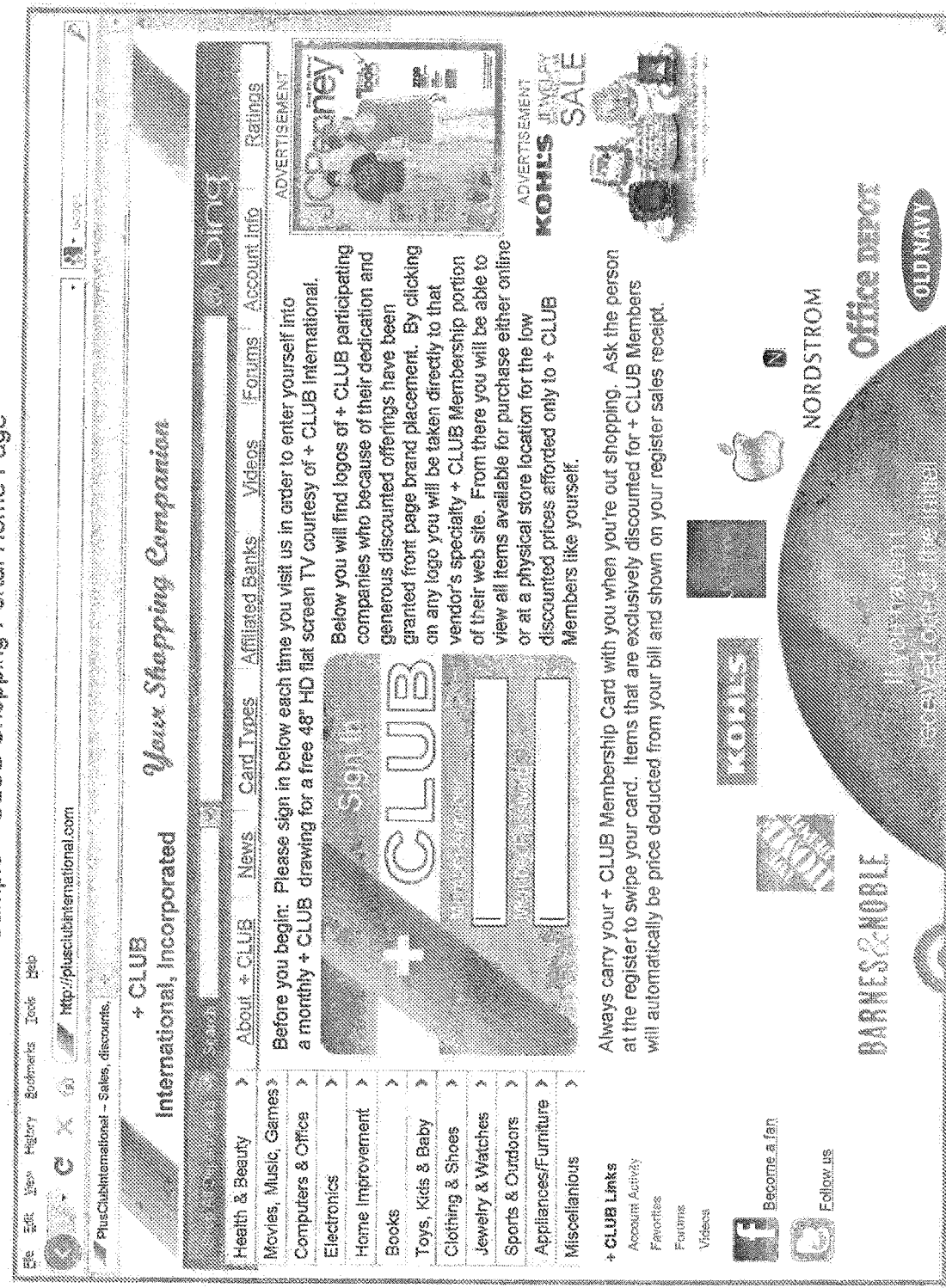
FIG. 64 shows an alternate exemplary club Internet web site Home Page with club member information, coveted advertiser presentation locations, and club member number/password sign-in card allowing the members to receive the merchant and manufacturer discounts and super discounts, along with optionally offering an additional incentive to signing in, for that by doing so would automatically, once per day, generate individual member entries for monthly drawings to award member prizes. All shopping departments are indexed at the left margin to allow for ease in immediately accessing the specific areas of interest for the club members. Specially rewarded merchants selected by the club for the being among the best in discount offerings participation (e.g. JC Penney and Kohl's) are given prime club home page advertising video placement. This exemplary alternative can be compared to that shown in the prior submitted FIG. 10, which shows an exemplary (AOL.com) Internet home page with a club member number/password sign-in (P) and to the shopping department indexing as compared to that shown in prior FIG. 14 and FIG. 15.
Figure 66:
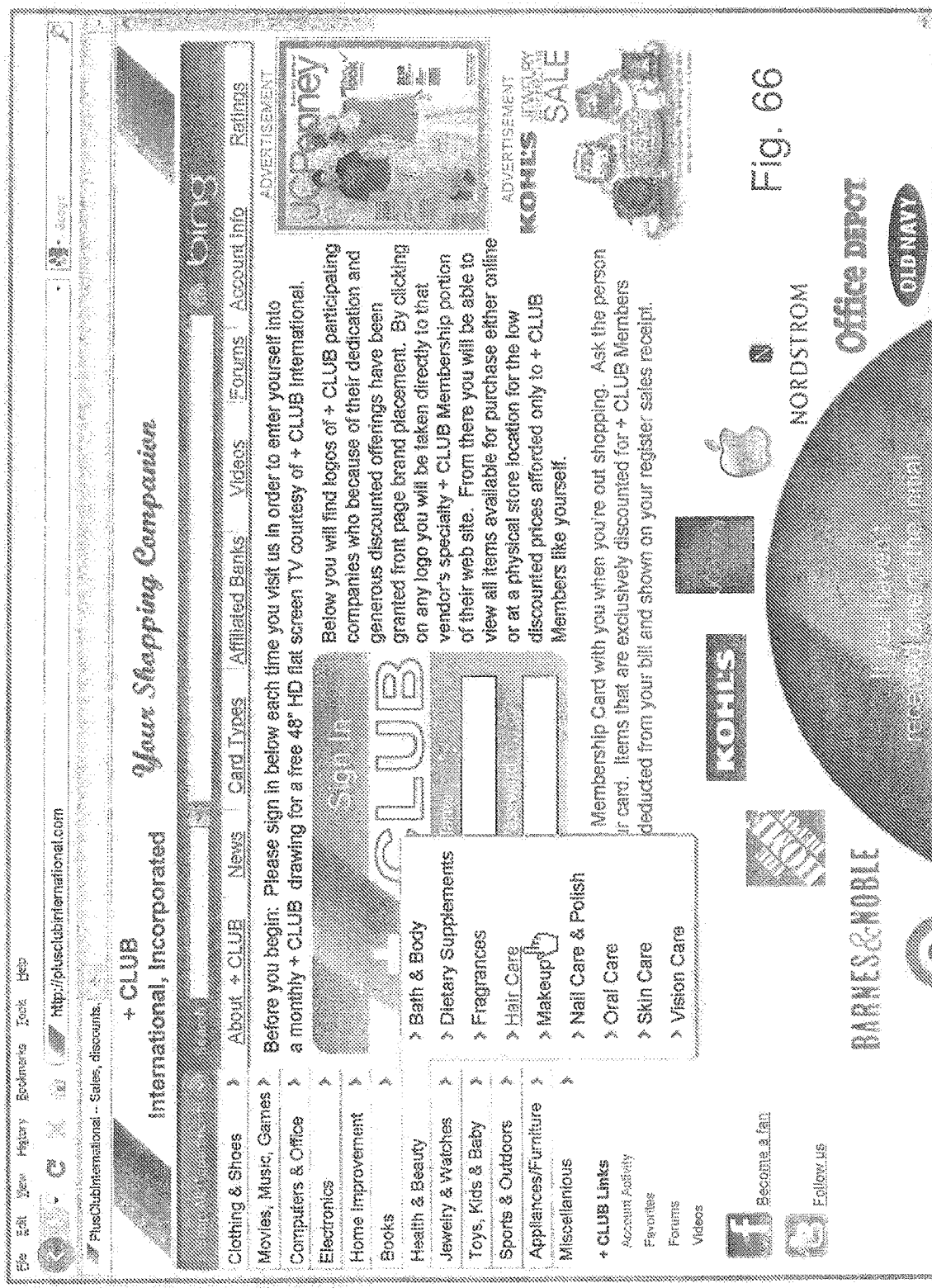
FIG. 66 shows an alternate exemplary club Internet Home Page as in FIG. 64 showing an additional shopping department indexing detail listing under Health & Beauty. Each of these areas can also have further indexed detail listings to direct a member to a specific area of interest as compared to that shown in prior FIG. 16 and FIG. 21.

The club discount and super discount participating corporate retailer and manufacturer logos page, selected by the club for their generous and consistent product and service discounted offerings provided to club members, will be rewarded with prominent positions surrounding a circular club membership/card information access link with full Internet screen (See FIG. 65), as compared with that shown in the prior submitted FIG. 13, which shows an exemplary (AOLTW) D & SD corporate logos page with full Internet screen (P). Clicking on these logo will give one direct access to the individual retailer's or manufacturer's products and services discounted for club members;

The club Internet Home Page as seen in FIG. 64 shows the additional shopping department indexing detail listing (e.g. Health & Beauty) (See FIG. 66). Each of these areas can also have further indexed detail listings to direct a member to a specific area of interest as compared to the additional detailed indexing shown in prior FIG. 16 and FIG. 21.

Figure 67:
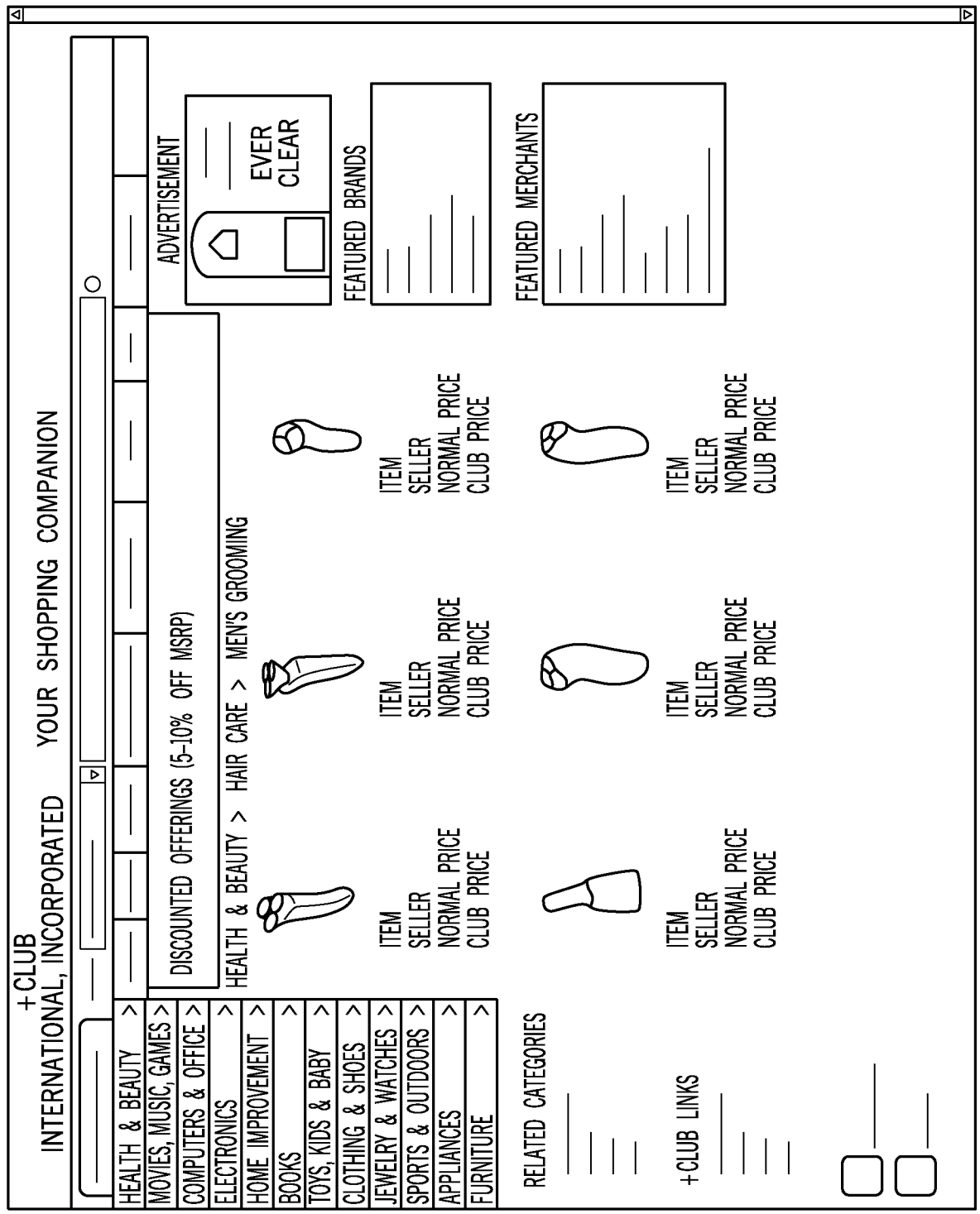
FIG. 67 shows an exemplary Men's Grooming page, arrived at by first selecting Health & Beauty along with Hair Care in FIG. 66, showing six (6) different electric razors, five of which are discounted and available at retailers (e.g. Wal*Mart, Kohl's & Target) and one which is available directly from a manufacturer (e.g. Remington)

A Men's Grooming page can be arrived at by first selecting Health & Beauty along with Hair Care in FIG. 66, showing six (6) different electric razors, five of which are discounted and available at retailers (e.g. Wal*Mart, Kohl's & Target) and one which is discounted and available directly from a manufacturer (e.g. Remington) (See FIG. 67).

Figure 68:
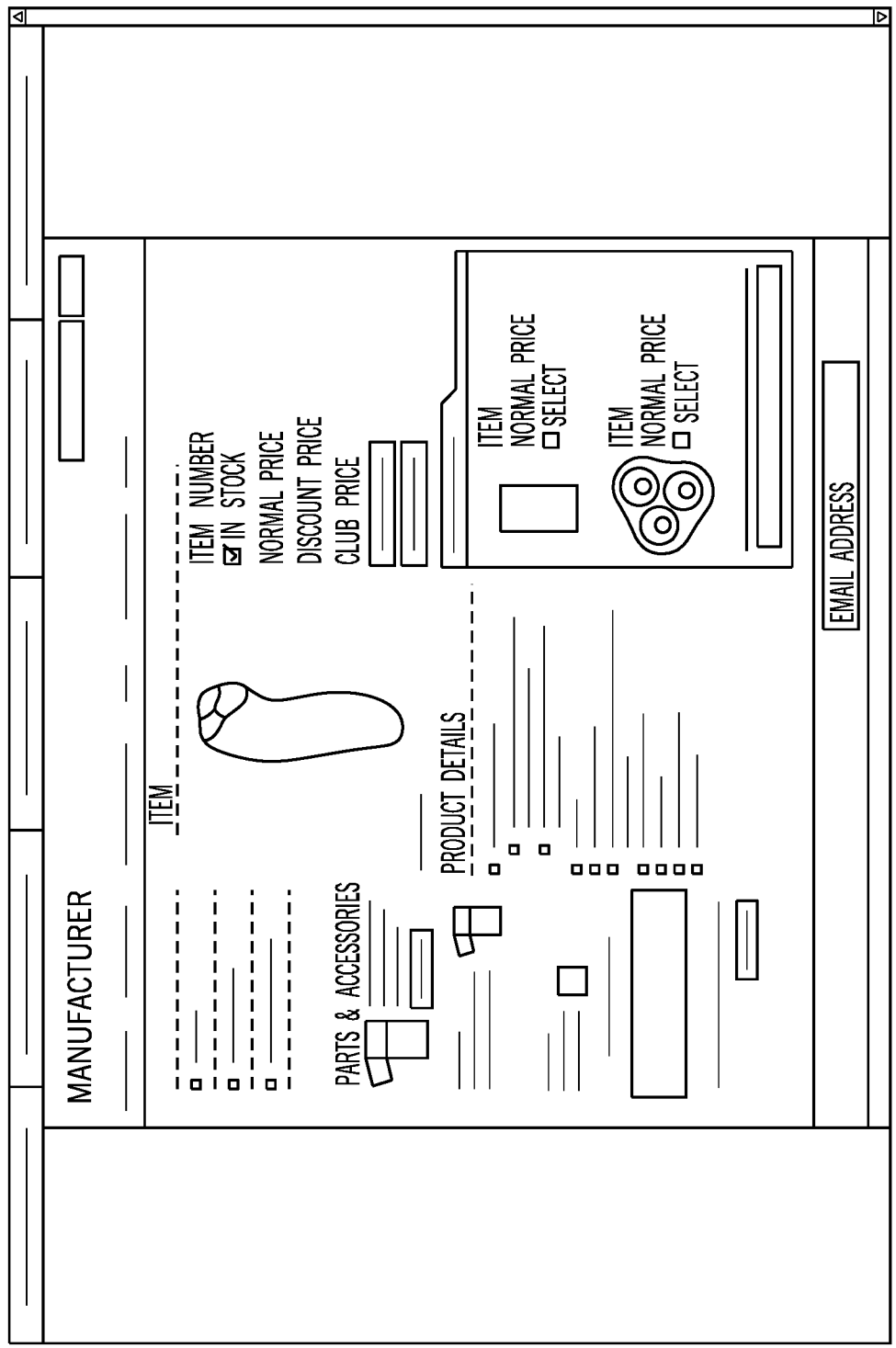
FIG. 68 shows an exemplary manufacturer page (e.g. Remington), arrived at by a "click" on Remington in FIG. 67, showing a discounted electric razor along with a product description and pricing information. This will allow manufacturers to sell directly to the public, bypassing retailers.

A manufacturer page (e.g. Remington), can be arrived at by a "click" on Remington in FIG. 67, showing a discounted electric razor along with a product description and pricing information (See FIG. 68). This will allow manufacturers to sell directly to the public, bypassing retailers.

Figure 69:
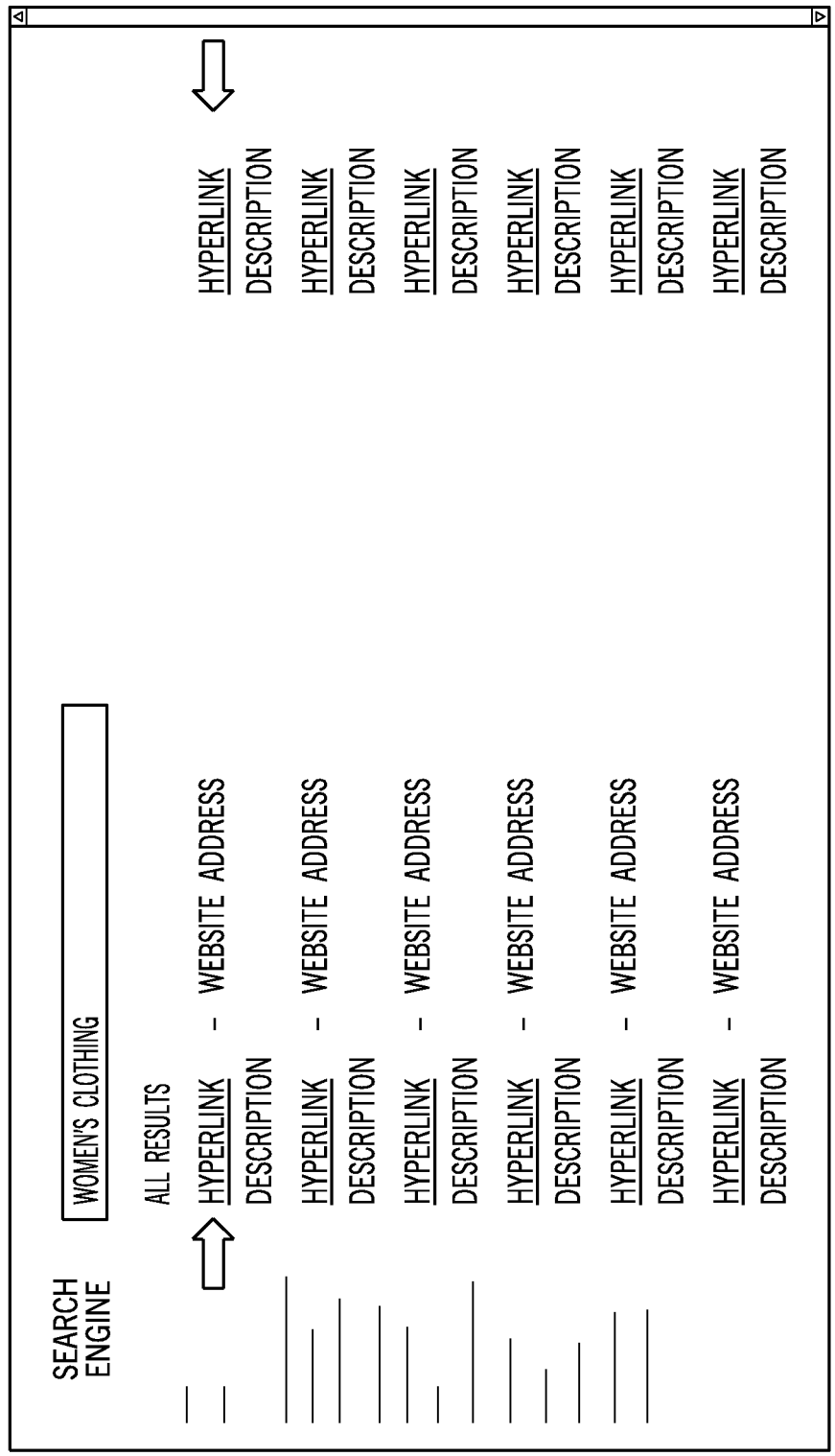
FIG. 69 shows an exemplary Microsoft Bing search engine results page advertising by retailers along with club discounts under two areas of sponsored results for Women's Clothing (Shop and find all brands of Women's Clothing at discounted prices) and Shop Women's Clothing (Shop all Styles and Brands in Ladies Fashion at Discounted Prices), both at http://www.plusclubinternational.com.

The participating club merchants and manufacturers will also be marketing and advertising on the host's search engine sites (e.g. Microsoft) in banner and text formats to be eligible for greater prominent placement exposure gifted by the host for marketing, advertising and sales access to the club site and its large buying membership audience (FIG. 69). The shows an exemplary Microsoft Bing search engine results page advertising by retailers along with club discounts under two areas of sponsored results for Women's Clothing (Shop and find all brands of Women's Clothing at discounted prices) and Shop Women's Clothing (Shop all Styles and Brands in Ladies Fashion at Discounted Prices), both at http://www.plusclubinternational.com.

Figure 70:
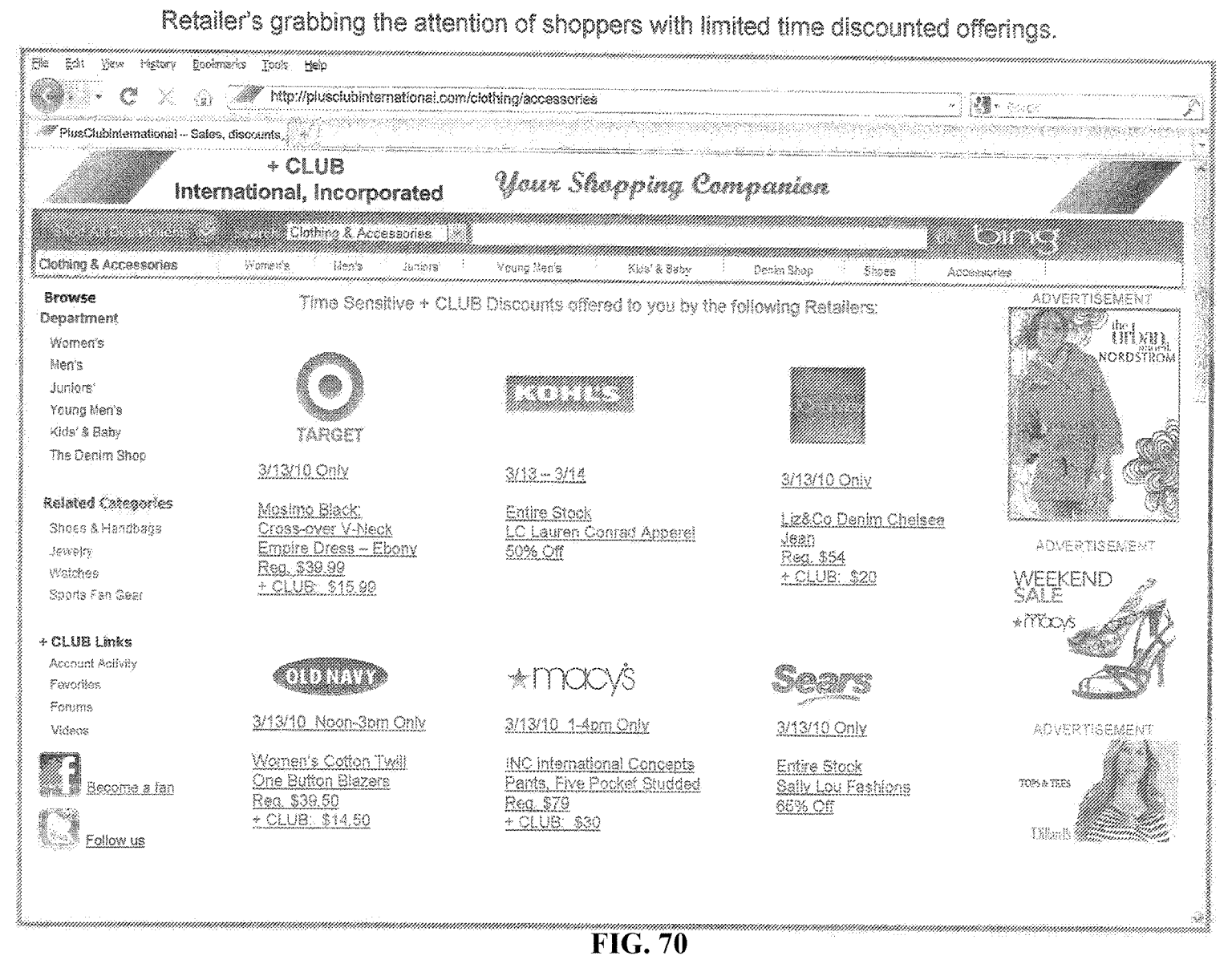

The club shopping page illustrated indicates a special placement of merchants by those shown advertising on one of the host's shopping pages being rewarded by being given additional prominence in the club venue (See FIG. 70). This shopping page (e.g. Women's Clothing) shown as being hosted by an Internet search engine (e.g. Microsoft's Bing) with six (6) merchants given a free listing "gifted" by the club and the Internet search engine provider for retailers and manufacturers with possible optional requirements including that, in turn, the determination for names/logos positioning placement within the club portal be decided in part by the consistency of the retailers and manufactures in placing discounts and super discounts for the club members, and to a lesser degree, along with their placing paid advertising on the host Internet search engine provider's (e.g. Microsoft) main Internet venue(s); however, in the latter case, required only if the individual retailers and manufacturers place paid advertise on other competitive major search engine providers' venues (e.g. Google, Yahoo, Ask or AOL).

Figure 71:
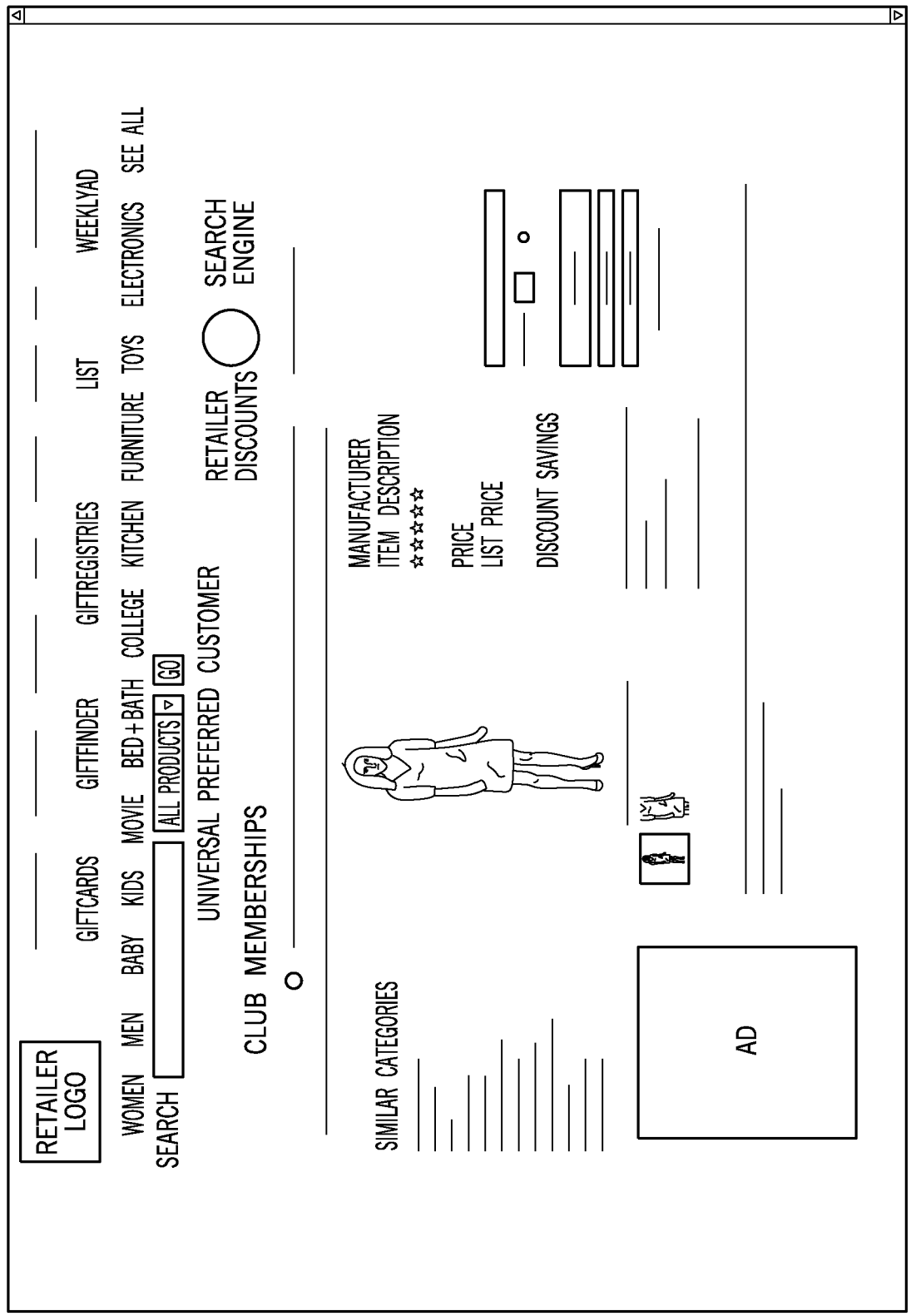
FIG. 71 shows an exemplary club Internet merchant (e.g. Target) page, arrived at by a "click" on Target on FIG. 70, offering a discounted product (e.g. V-Neck Dress) to club members describing the product and indicating savings and instructions to purchase, headed with a club banner and Internet search engine provider (e.g. Microsoft's Bing)

A club Internet merchant (e.g. Target) page, arrived at by a "click" on Target on FIG. 70, offering a discounted product (e.g. V-Neck Dress) to club members describing the product and indicating savings and instructions to purchase, headed with a club banner and Internet search engine provider (e.g. Microsoft's Bing) (See FIG. 71).

Figure 72:
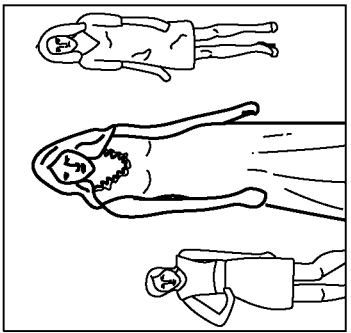
FIG. 72 shows an alternate exemplary club Internet web site banner link on a merchant's Internet Site Home Page (e.g. Target) showing the Internet search engine provider (e.g. Microsoft's Bing). A "click" on this banner would take one to the merchant's present specially selected club product or service discounts and super discounts. This alternate banner is compared to those shown in the prior submitted FIG. 23 (e.g. Sears), FIG. 42 (e.g. Sears) and FIG. 43 (e.g. The Home Depot) as individual retailer home pages.

Merchants and manufacturers presently have Internet web sites promoting their organizations, products and services. Each of these sites has a Home Page that acts as a directory from which viewers can access different pages and areas within their web sites. The club would have a club Internet web site banner link on merchant's or manufacturer's Internet Site Home Pages (e.g. Target) showing the Internet search engine provider (e.g. Microsoft's Bing) (See FIG. 72). A "click" on this banner would take one to the merchant's present specially selected club product or service discounts and super discounts, viewable by club members and non-club members, but only offered to club members. Using this link one can then only return to this merchant's site and not to the sites showing other merchants' club product or service discounts. This feature prevents other competing merchants or manufacturers from using the club to pull viewers away from the initial merchant or manufacturer who has allowed the club banner link to be placed on their home page. This is compared to those retailer examples shown in the prior submitted FIG. 23 (e.g. Sears), FIG. 42 (e.g. Sears) and FIG. 43 (e.g. The Home Depot) as individual retailer home pages. However, viewers can address all of the other merchants' and manufacturers' Internet web sites when the viewer initially accesses the club Internet web site directly through the club Internet home page—be it by entering it via the club web site address on their own or by being linked to the club home page from other search, text or banner links on the Internet.

Figure 73:
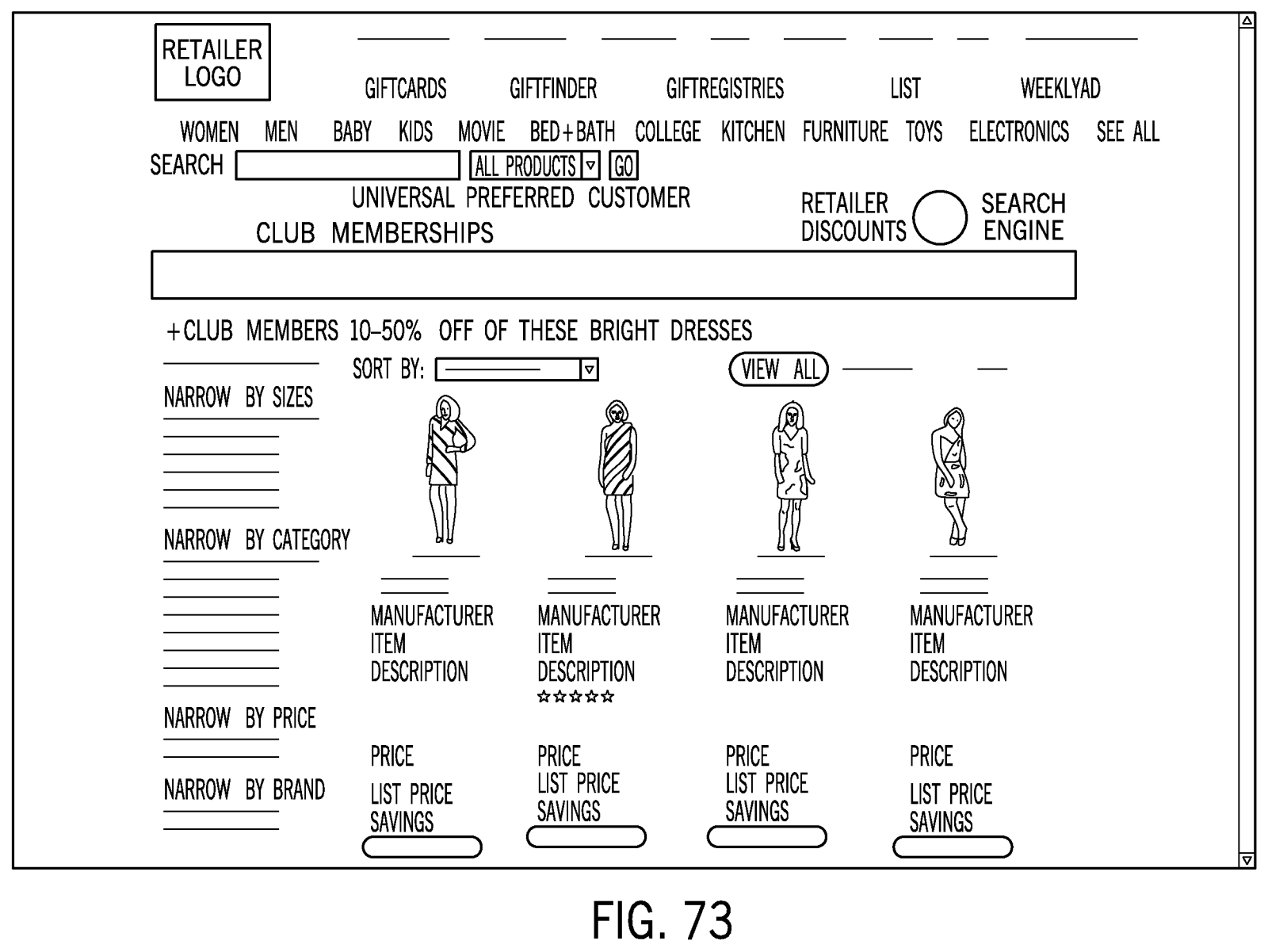

A retailer's (e.g. Target) women's dress page is shown with four (4) dress offers along with club discounts off the retail price and with the percentage saved (See FIG. 73).

One of many manufacturers (e.g. Proctor & Gamble, P&G) Internet Beauty & Grooming site pages is shown listing their brands. The inclusion of club logos placed at the individual brands would be one optional method to indicate those brands providing product discounts for the club's members, selling directly to the public, bypassing retailers (See FIG. 74).

The typical tracking of merchants' and manufacturers' advertising effectiveness presently offered by Internet search engine provider advertising approaches is seriously lacking in providing advertisers the needed information to make informed decisions relative to ads as well as ad placement. Not only are the ads and ad information presently Internet based, which according to industry statistics accounts for only 6% of actual product and service purchases as compared to 94% of purchases being made in real world environments like brick-and-mortar store locations, many questions such as: Where exactly their ad will get placed?, Why exactly they shut them down?, What are the network-level ad performance figures?, How overall click rates have changed over time?, Who clicked on the ads?, What leads to higher placement among ads?, How does one evaluate the quality of a text ad?, From what countries do the users come?, On what basis are publishers paid? and What is the research on ad effectiveness? are either not fully addressed or not addressed at all. In a stark contrast, the method and system, marketing, advertising and sales approach of this applicant provides the tracking of Internet viewing by club members of merchants' and manufacturers' discounted product and service offerings along with being able to then relate that activity to actual purchases of products and services both on the Internet as well as at point-of-sale checkout registers in physical brick-and-mortar store locations that will be used by the member consumers. This unparalleled tracking capabilities of club members' shopping interests and actions, will be possible through the use of club member numbers and passwords, which the members will enter on the club Internet Home Page sign-in card, allowing retailers to judge the true effectiveness of their Internet marketing and advertising offers by following individual club member's viewing of specific retailer (e.g. Target) products on the Internet and then seeing those same products being purchased by that individual club member in that specific retailer's physical store location—or in some cases, even in a competitive retailer's store location. This tracking aspect will allow for fact based analysis as opposed to the more arbitrary typical data collection via cookies, search queries, ad words, text and display ads or the number of "clicks" on any given offerings. Such tracking will be able to inform the merchants and manufacturers of the true effectiveness of their marketing and advertising programs resulting in actual sales (See FIG. 75). The use of an all encompassing Internet web site shopping portal concept incorporating marketing, advertising and sales in one location as opposed to arbitrary or selective text, word, banner ad placement throughout arbitrary Internet pages answers many of the aforementioned concerns and invites buyers to peruse merchants' and manufacturers' offerings worldwide with one site access, creating convenience and time savings along with the product and service discount and super discount offerings. The individual buyer profile information data relating consumer Internet product and service viewing to the resulting actual purchases both online and offline developed via this concept is available no where else and will be truly invaluable to merchants and manufacturers when developing and budgeting ad programs to garner the best return on their creative efforts and advertising dollar expenditures. To be able to finally track advertising and resulting purchasing both virtually and in the real world.

Figure 76:
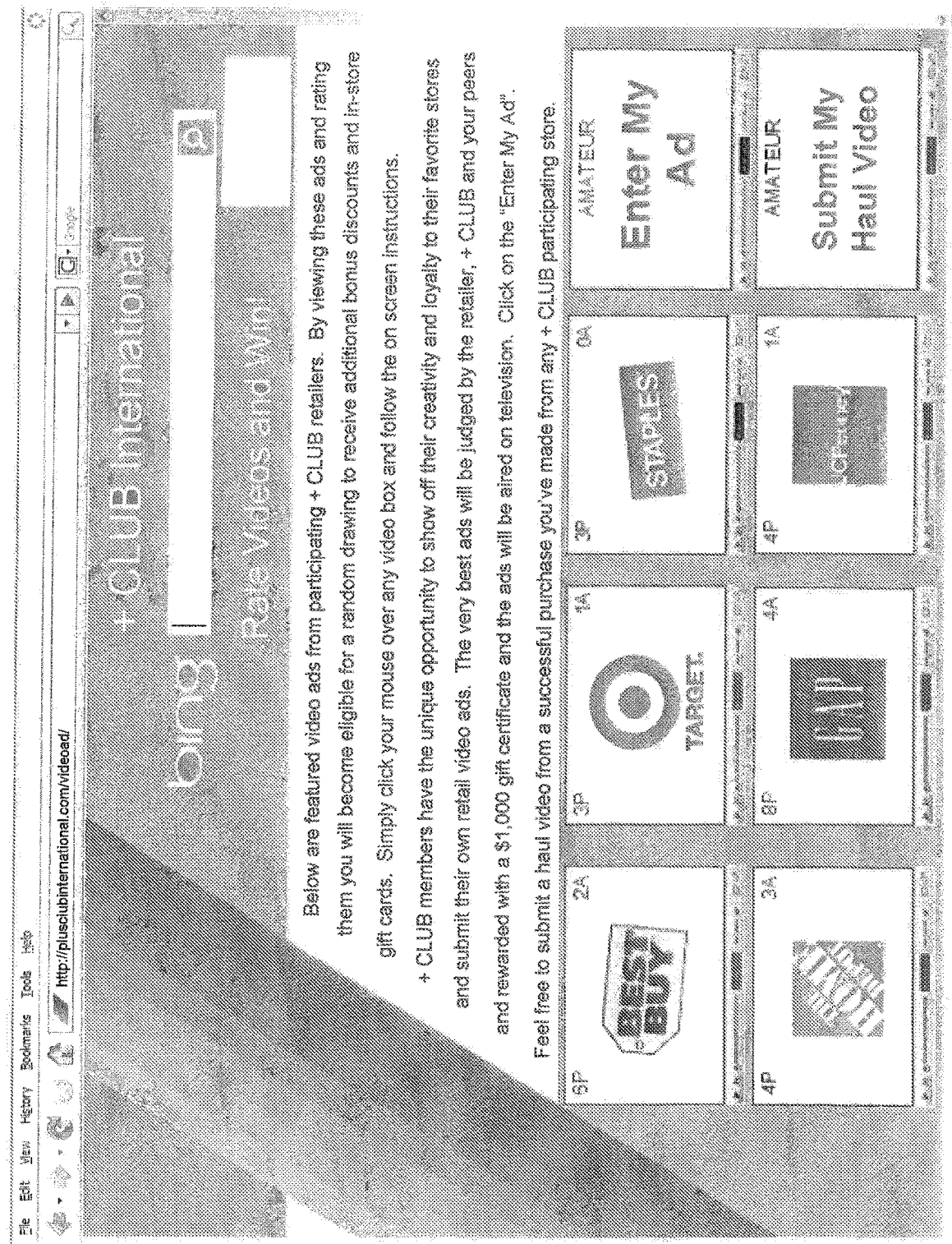
FIG. 76 shows an exemplary participating club merchants' (e.g. Best Buy, Target, Staples, The Home Depot, GAP and J C Penney) selections of advertising videos Internet web site page. Each participating merchant indicates the number of professional videos (e.g. 4P), amateur videos (e.g. 2A) and amateur Haul Videos along with permitting amateurs to submit ads they have created to the individual merchants for their review and determination of whether that merchant desires to then post those amateur video ads on this site for viewing by club members and non-club members; however, only club members can rate and comment on both the professional and amateur videos.

A listing of all participating merchants and manufacturers who have submitted advertising videos for viewing, either or both professionally or amateur prepared, will be shown on the club merchant and manufacturer selection advertising video Internet web site page (See FIG. 76). Participating club merchants' (e.g. Best Buy, Target, Staples, The Home Depot, GAP and J C Penney) selections of advertising videos Internet web site page. Each participating merchant indicates the number of professional videos (e.g. 4P), amateur videos (e.g. 2A) and amateur Haul Videos along with permitting amateurs to submit ads they have created to the individual merchants for their review and determination of whether that merchant desires to then post those amateur video ads on this site for viewing by club members and non-club members; however, only club members can rate and comment on both the professional and amateur videos. A selected amateur ad video will garner its creator a financial reward and will be shown on the individual merchant's or manufacturer's club video ad site as well as on television, should it be considered by the merchant or manufacturer to be of that quality. This gives amateurs a unique opportunity to display their talents as well as provides a social networking venue directly focused on product and service, marketing and advertising.

Figure 77:
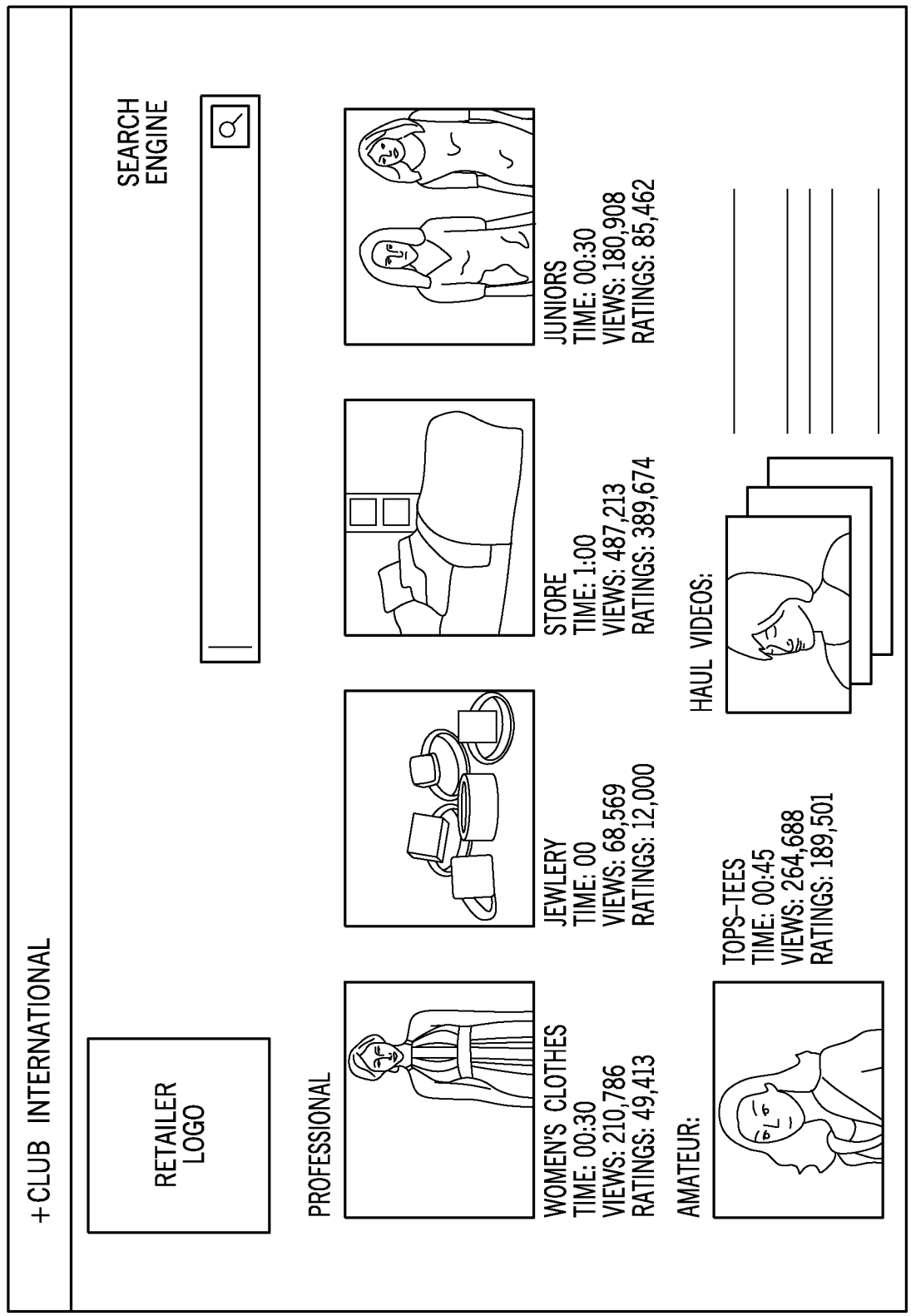
FIG. 77 shows an exemplary club individual merchant's (e.g. J C Penney) professional (e.g. 4P) and amateur (e.g. 1A) advertising video and Haul Videos selection page showing what the ad videos are about, the length of the videos, the number of views, the number of ratings along with one to four stars for video quality and popularity. "Click" on the video and you would go to the video-viewing page.

"Click" on a merchant's or manufacturer's name and you would go to that merchant's or manufacturer's ad video selection page. The club individual merchant's (e.g. J C Penney) or manufacturer's professional (e.g. 4P) and amateur (e.g. 1A) advertising video and Haul videos selection page showing what the ad videos are about, the length of the videos, the number of views, the number of ratings along with one to four stars for video quality and popularity (See FIG. 77).

Figure 78:
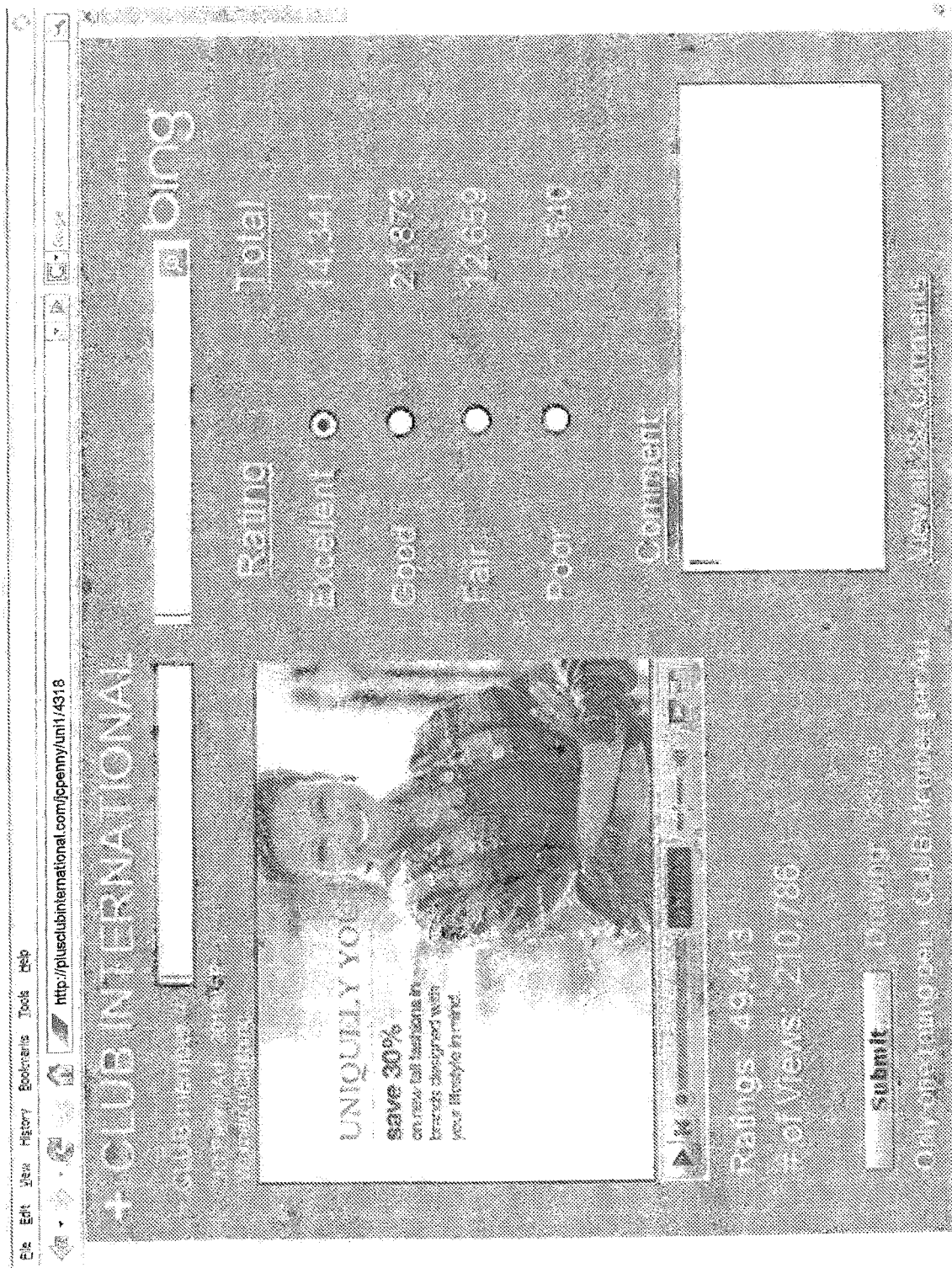
FIG. 78 shows an exemplary club Internet web site merchant's (e.g. J C Penney) advertising video-viewing page. Club members and non-club members can view the ads, but only club members can rate the videos (e.g. excellent, good, fair, poor), after entering the club member's number for identification—the running totals for each of these ratings are indicated. The subject matter of the video, the number of views and the number of ratings are shown. Also, a club member may comment on the video as well as view the comments of others.

"Click" on the video and you would go to the video-viewing page. The club Internet web site merchant's or manufacturer's advertising video viewing page allows both club members and non-club members to view the ads, but only club members can rate the videos as excellent, good, fair or poor, after entering the club member's number for identification—the running totals for each of these ratings are indicated (See FIG. 78). As before, the subject matter of the video, the number of views and the number of ratings are shown. Also, a club member may comment on the video as well as view the comments of others. Submitting a rating on a video, only one rating per club member per ad, allows a club member to be part of a drawing on a specified date shown for a chance to win monetary, product or additional product or service discount rewards provided by the relative merchant or manufacturer.

Three (3) possible areas for marketing of the Internet search engine provider (e.g. Microsoft's Bing), the card issuing banks (e.g. CapitalOne), individual retailers (e.g. Target) or manufacturers and the club itself both online by way of the club Internet home page, on the retailers' Internet home pages and offline on the front or back of the club membership cards (See FIG. 79).

The club method and system provides a platform for marketing, advertising and sales by merchants and manufacturers both nationally and internationally. Merchants and manufacturers from counties other than the United States can participate in offering their products and/or services on the Universal Preferred Customer +Club International Internet Web Site Shopping Portal. Through the use of bonded warehouses and/or distributions centers located within the United States or within other countries from their individual consumers, merchants and manufacturers will be able to have a ready inventory of products or merchandise on hand enabling both these merchants and manufacturers to sell directly to club member buyers, optionally bypassing the retail store, third party sales environment, and give timely delivery of the purchased products or merchandise to be picked up at warehouses and distribution centers by the customers or have the purchased product or merchandise delivered to the addresses of the buyers' choosing. Merchants and manufacturers will be able to then gain access to new markets without the extended time frames and costly approaches required in setting up their individual products or merchandise sales initiatives with each individual retailer and stocking each location as is necessitated with the typical third-party sales concept. The club concept literally provides the largest worldwide virtual/real-world shopping mall ever, yet each merchant and manufacturer being able to operate totally remote from their consumers.

It is specifically intended that the present invention not be limited to the embodiments and illustrations contained herein, but include modified forms of those embodiments including portions of the embodiments and combinations of elements of different embodiments as come within the scope of the following claims.

We claim:

1. A computer implemented method of buying and selling using club memberships as a basis for buyers to receive discounts on purchases of products offered by sellers, the method comprising:

receiving, at a retail store, at least one product or service to be purchased by a user;

receiving, by a point of sale terminal, a club membership card associated with a previously purchased tiered-subscription by the user;

transmitting, by the point of sale terminal to a web server account associated with the received club membership card, purchase data including identification of the at least one product or service to be purchased by the user;

determining, by the web server, whether the transmitted purchase data matches one or more discounts or promotions that are currently offered and displayed products or services on a web page associated with the received club membership card, wherein the one or more discounts or promotions that are currently offered and displayed products or services on the web page associated with the received club membership card is dependent on a tier of the received membership card;

transmitting, by the web server to the point of sale terminal, the discounts or promotions that match the at least one product or service to be purchased by the user;

applying, by the point of sale terminal, the discounts or promotions displayed on the web page associated with the received club membership card to a price of the at least one product or service to be purchased by the user; and receiving, by the point of sale terminal, payment for the at least one product or service from the user minus the discounts or promotions applied using the received membership card.

2. The method of claim 1, further including in response to viewing at least one of a discounted product offers from the sellers participating on a club Internet web site, the buyers can choose to make purchases online using buyer discount club membership card authorizations and identifying numbers along with payment instruments following secure buying procedures including optional benefits of free shipping when provided by shippers or picking up purchased products at store locations, or at bonded warehouse/distribution centers, or use club member Internet site product discount information as shopping planning guide information, go to physical store locations of the sellers to make the purchases offline based upon the discounted product offers as advertised online, and immediately take the purchased products or have the purchased products shipped, free when provided by the sellers, due to size, weight or other considerations;

further comprising computers and computer networks and systems running software programs electronically transmitting seller product discount data from the Internet to points of sale at seller checkout registers in the physical store locations;

wherein, at the physical store locations, the buyers by using universal club membership cards accepted by the participating sellers, which are magnetic strip authorized and bar coded by scanning or using pass or mobile technology, to access the transmitted seller product discount data electronically, and wherein the seller product and discount data pertaining to the purchased products is automatically indicated on buyers' register receipts of purchase, along with annual savings to date, the seller product and discount data providing savings data for both total savings from the seller providing the purchased product and total savings from all sellers having provided discounts to a member and compiled into separate individual buyer's activity reports for club members showing each buying activity along with running totals of purchases and the discount savings by day, month and year to date so the buyer can compare actual savings with an annual club membership fee amount;

wherein, while on the Internet club members can purchase products worldwide directly from retailers, the club members can also purchase products worldwide directly from manufacturers, bypassing the retailers, and have items shipped directly, free or at a cost as offered by individual manufacturers, or the members can pick up items at individual manufacturers' outlets or at specific bonded warehouses or distribution centers storing individual or multiple manufacturers' products;

and stored in memory on and separate from the Internet host system is an overall club Internet site information including individual seller Internet discount product information along with individual member buyer Internet club site viewing information and Internet online and in-store offline as well as telephone product purchase information allowing tracking of these activities for participating sellers to address, in an informed manner, marketing and advertising effectiveness and subsequent advertising budgeting requirements.

3. The method of claim 1, further characterized in that the club memberships are multi-tier allowing for different product types to be discounted dependent upon the club memberships, and additionally characterized in that each successive higher tier offers additional product types to be discounted along with discounted product types that are offered by the tiers below successive higher tiers.

4. The method of claim 1, further characterized in that while membership cards are to be considered to be universal discount cards by offering access to discounting by a plurality of the sellers, the membership cards are not intended to be replacements for individual seller in-store discount cards but rather are additional to and intended to work in concert with the in-store discount cards.

5. The method of claim 1, further characterized in that the buyers can be credited for discounted products at brick-and-mortar store locations of the sellers in a semi-automatic method, which does not require integration of multiple level discounting software into electronic host networks and systems of the sellers, entailing the seller using separate product discount sheets with bar codes which the seller would electronically scan, by the seller using coupons which the seller would electronically scan or by the seller manually entering product discount amounts at and with sellers' POS terminals and electronic cash registers.

6. The method of claim 1, further characterized in that discounted product offers by the sellers to the buyers can be indicated to be valid only at specific times including at least one of on specific dates and during time periods selected from the group consisting of never-ending time periods, monthly time periods, weekly time periods, daily time periods and hourly time periods.

7. The method of claim 1, further characterized as a new marketing and advertising communication venue for sellers to attract very large club membership audience of buyers drawn through a brand named club and grow multi-channel purchasing by offering special product discounted money and time saving opportunities for the buyers and thereby expanding marketing and payment roles for financial institution card services, bringing online and offline communications and sales together with financial elements and by providing a venue to rate and/or comment on professional and amateur produced ad and haul videos as well as on individual discount product offerings;

wherein, club members can partake in a forum or social networking venue aspect addressing participating sellers' marketing, advertising and selling offerings while giving sellers an opportunity to gage their approaches;

wherein, club members can dialog directly with sellers, and rate, comment and make suggestions relative to individual sellers' products, brands, videos and service along with occasionally receiving special rewards directly for a submittal or via a drawing for specific prizes when offered by a club and the sellers; and wherein, club members can create personal membership profiles to be used while addressing online club activities.

8. The method of claim 1, further characterized that while the club membership card is intended as a discount access card only, not a payment card, both discount and payment on one card is an option.

9. The method of claim 1, further characterized in that type of payments for products is flexible and can be made by credit card with or without rewards, debit card with or without rewards, individual seller merchant card with or without rewards, gift card, reward card, coupons, points redemption, check card, check, money order or cash.

10. The method of claim 1, further characterized in that purchases can be paid in full, monthly payments until paid in full or layaway, being sent or picked up when paid in full.

11. The method of claim 1, further characterized in that products can be purchased as individual products, more than one of a product, combined or component products, out-of-stock products or waitlist products, and in that products purchased on the Internet can be shipped, shipped free when provided by the sellers or picked up at physical store locations.

12. The method of claim 1, further characterized in that along with a name of the club itself, individual financial institutions can be identified as issuers of the club membership cards with their name and logo appearing on a face of the cards;

wherein, having the club membership cards bank or association name branded dually markets both the club and an individual bank or association; wherein, temporary club cards can be distributed by the club free to the banks and associations, the cards to each individual entity being based upon the institutions' percent of total market share of active credit cards and debit cards;

wherein, in addition to club participation expanding use of bank and association credit cards and debit cards, the individual banks and associations can offer additional individual credit card and debit card use incentives to buyers when paying for purchases with their name branded cards and also when a buyer uses a club card with same bank name as the credit card or debit card at time of purchase; and wherein, the club can pay these institutions a percentage of an annual club membership fees for the banks' and associations' marketing of the club.

13. The method of claim 1, further characterized in that while a club member's name can appear on an initial free temporary card front, the name of a club member would appear on the front of a permanent paid membership card, which can be renewed annually for a fee, along with a member number and other identifying information and data.

14. The method of claim 1, wherein, the sellers, with computers and computer networks and systems running software programs along with their host networks and systems, can market, advertise and sell their discounted products to the buyers via a club Internet web site without payment of listing charges, per click charges, keyword charges, cost per action charges and percentage of final sale charges, for club revenue is substantially derived from buyer-paid memberships, not seller-paid advertising.

\* \* \* \* \*